United States Patent [19]
Hoshi et al.

[11] Patent Number: 5,691,794
[45] Date of Patent: Nov. 25, 1997

[54] LIQUID CRYSTAL DISPLAY DEVICE

[75] Inventors: Junichi Hoshi, Hadano; Shigetoshi Sugawa, Atsugi; Shunsuke Inoue, Yokohama; Osamu Hamamoto, Hiratsuka; Yoshihiko Fukumoto, Atsugi; Yutaka Genchi, Tokyo; Masaru Kamio, Kawasaki; Mamoru Miyawaki, Isehara, all of Japan

[73] Assignee: Canon Kabushiki Kaisha, Tokyo, Japan

[21] Appl. No.: 189,169

[22] Filed: Jan. 31, 1994

[30] Foreign Application Priority Data

| Feb. 1, 1993 | [JP] | Japan | 5-033958 |
| Feb. 1, 1993 | [JP] | Japan | 5-033962 |
| Feb. 1, 1993 | [JP] | Japan | 5-033969 |
| Feb. 1, 1993 | [JP] | Japan | 5-033970 |
| Feb. 1, 1993 | [JP] | Japan | 5-033971 |
| Feb. 1, 1993 | [JP] | Japan | 5-033972 |
| Dec. 24, 1993 | [JP] | Japan | 5-345940 |

[51] Int. Cl.$^6$ ............ G02F 1/1333; G02F 1/136
[52] U.S. Cl. ............ 349/158; 349/122; 349/153; 349/160
[58] Field of Search ............ 359/54, 58, 59, 359/74, 82, 83; 349/122, 153, 158, 160, 143, 95, 58, 57

[56] References Cited

U.S. PATENT DOCUMENTS

| 4,182,553 | 1/1980 | Sheridon | 359/87 |
| 4,580,876 | 4/1986 | Stolov et al. | 350/339 R |
| 5,513,028 | 4/1996 | Sono et al. | 359/59 |

FOREIGN PATENT DOCUMENTS

| 0358142 | 3/1990 | European Pat. Off. |
| 0530972 | 3/1993 | European Pat. Off. |
| 2462991 | 6/1976 | Germany |
| 4-125615 | 4/1992 | Japan | 359/63 |
| 299317 | 10/1992 | Japan |
| 4299317 | 10/1992 | Japan |
| 2204980 | 11/1988 | United Kingdom |
| WO 22849 | 12/1992 | WIPO |

OTHER PUBLICATIONS

Patent Abstracts of Japan, vol. 12, No. 341 (Sep. 1988) (P-758).

Patent Abstracts of Japan, vol. 17, No. 112 (Mar. 1993) (P-1498).

*Primary Examiner*—William L. Sikes
*Assistant Examiner*—Tai V. Duong
*Attorney, Agent, or Firm*—Fitzpatrick, Cella, Harper & Scinto

[57] ABSTRACT

A liquid crystal display device comprised of picture element electrodes provided on a first plane of a substrate and an opposed electrode placed oppositely to the picture element electrodes, between which a liquid crystal is carried, characterized in that in a region of the substrate corresponding to the picture element electrodes is formed a concave portion from the second plane opposite the first plane of the substrate, the region being light translucent, and the concave portion having a translucent material enclosed therein.

20 Claims, 41 Drawing Sheets

SECTION ALONG X₁-X₁'

LIQUID DISPLAY DEVICE BEFORE POTTING

SECTION ALONG $X_1 - X_1'$

SECTION ALONG $X_2 - X_2'$

SECTION ALONG $X_3 - X_3'$

LIQUID CRYSTAL DISPLAY DEVICE

BACKGROUND OF THE INVENTION

1. Field of the Invention

The present invention relates to liquid crystal display devices capable of providing high quality image display.

2. Related Background Art

In recent years, liquid crystal display devices have widely spread which comprise a translucent circuit substrate (e.g., active matrix circuit substrate) formed with a drive circuit and a translucent opposed substrate, between which a liquid crystal is enclosed, whereby the image is displayed by driving this enclosed liquid crystal.

To enhance the image quality of such liquid crystal display devices, it is necessary to reduce the area of one picture element which is equal to several tens microns square in the state of the art and arrange a greater number of pixels.

Accordingly, as the increased number of picture element electrodes or transistors are arranged in the display area and the larger screen is used, the wiring length per line for driving the vertical and horizontal shift registers is longer, resulting in a greater drive power required for the vertical and horizontal shift registers. Also, the transistors for use in the display area must have small leak current, because the potential of picture element electrodes is necessary to be held for longer time.

FIG. 1 shows a typical view for explaining an active matrix type liquid crystal display device as conventionally used. 1 is a picture element switch, 5 is a liquid crystal picture element, 6 is a transparent substrate, 2 is a buffer section, 3 is a horizontal shift register section, and 4 is a vertical shift register section. Luminance signal or sound signal of the television is compressed in a certain band and sent to the buffer section 2 driven by the horizontal shift register 3 which has a driving capability of following its frequency. Then, a signal is sent to the liquid crystal during the period while the picture element switch 1 is turned on by the vertical shift register 4.

The performance required for each circuit is as follows. For high-definition televisions, the frame frequency is 60 Hz, the number of scanning line is about 1000 lines, the horizontal scanning period is about 30 μsec (the effective scanning period is 27 μsec), and the number of horizontal picture element is about 1500, wherein the television signal is transferred to the buffer section at a frequency of about 45 MHz. Also, the period permitted for the signal transfer per scanning line is from 1 to 2 μsec. Accordingly, the performance required for each component circuit is such that:

1) the driving ability of the horizontal shift register is 45 MHz or greater
2) the driving ability of the vertical shift register is 500 kHz or greater
3) the driving ability of the transfer switch which is driven by the horizontal shift register to transfer a television signal to the buffer section is 45 MHz or greater
4) the driving ability of the picture element switch is 500 kHz or greater.

The term "driving ability" as referred to herein means that when a certain number of gradations N is to be produced for a liquid crystal picture element, the voltage equal to or greater than the value $$V_m - (V_m - V_t)/N \; [V]$$

is transferred during the above-mentioned period, where $V_m$ is a voltage providing the maximum or minimum transmittance of liquid crystal, and $V_t$ is a threshold voltage of liquid crystal obtained from the curve V-T (voltage-transmittance).

As will be clear from the above, the picture element switch and the vertical shift register may have relatively small driving ability, while the horizontal shift register and the buffer section are required to have faster driving ability. Therefore, in current liquid crystal display elements, the picture element switch and the vertical shift register are formed from polycrystalline Si or amorphous SiTFT deposited on the glass substrate, monolithically with the liquid crystal, while other peripheral circuits are formed by packaging IC chips from the outside. In order to obtain a bright display image in this case, the quantity of light transmitted through the liquid crystal picture element section must be increased. On the other hand, the glass substrate must have a strength exceeding a certain value to package IC chips, for which the glass substrate having a large thickness was used. Hence, it was a cause of raising the manufacturing costs to sufficiently increase the quantity of transmitted light and use the thick glass substrate.

On the other hand, attempts have been made to form peripheral circuits in a monolithic manner by polycrystalline silicon TFT, but because of small driving ability of individual TFTs, some complicate measures for the circuit are required such as increasing the size of transistors.

Also, to construct the picture elements (pixels) of display device at higher density, higher resolution, and higher definition, higher performance driving elements are necessary.

Further, the present inventors previously proposed a liquid crystal display device as described in EP application number 92307010.6, on the basis of the idea that from the requisite, industrial demand of higher performance products to be fabricated, semiconductor devices provided on the translucent substrate are necessary to be fabricated using the single crystal layer having the most excellent crystallinity.

The liquid crystal display device proposed by the present inventors in the above-cited EP application is a liquid crystal image display device fabricated on the non-transparent substrate with respect to the light in the region of visible light, wherein the liquid crystal picture element section is made transparent to the light by removing the non-transparent substrate under the liquid crystal image section.

This will be briefly described below. FIGS. 2A to 2D show a manufacturing process of such a liquid crystal display device.

In FIG. 2A, 7 is a non-translucent substrate, 8 is a translucent insulating layer, and 9 is a semiconductor single crystal layer. This substrate structure is well known as an SOI structure, wherein two semiconductor substrates are bonded via the insulator layer, with one substrate made thinner, and is suitable in the respect of allowing the free selection of the insulating layer. Using a well-known integrated circuit process technique for the SOI substrate as shown in FIG. 2A, semiconductor active devices necessary for the liquid crystal image display device, such as a picture element switching element 10, a driving circuit 11 and a peripheral circuit are made as shown in FIG. 2B. Thereafter, a liquid crystal 14 is enclosed using a cover glass 15 and a sealing member 13 as shown in FIG. 2C. Though this liquid crystal portion of course requires an oriented film, an opposed electrode, a filter and a polarization plate, they are well-known technical items and the explanation thereof is omitted. In this state, the substrate is not transparent to the visible light, and therefore unusable as the projection-type display device which has a light source disposed behind the substrate. Finally, the non-translucent substrate 7, corresponding to a lower portion 16 of liquid crystal picture element section, is removed from the back side thereof up to the translucent insulating layer 8, as shown in FIG. 2D, so that the substrate is made substantially transparent to the light, whereby a projection-type liquid crystal image display device is fabricated.

In the liquid crystal display device as shown in FIGS. 2A to 2D, extremely high quality display images can be obtained, especially because the picture element switching element 10, the driving circuit 11 and the peripheral circuit 12 are made using the semiconductor single crystal layer 9.

The present inventors have made careful researches to further improve the liquid crystal display device as proposed in the above-cited EP application, and noticed that there is a possibility of causing the following drawback. This will be described with reference to FIG. 3. In the above liquid crystal display device, there is a possibility that when a membrane portion 7a adjacent to a hollow portion 10 of the SOI (Silicon On Insulator) substrate 6, i.e., the central area of a thin layer (single crystal Si layer or single crystal Si layer and insulating layer) 7 where electronic devices are incorporated on the surface of the area made translucent has a thickness up to approximately 3 μm as shown in FIG. 3, its strength becomes relatively lower. Therefore, there is a possibility that due to the dead weight of the liquid crystal 5 enclosed between liquid crystal sealing regions 4, 4 with a transparent electrode 1, a light shielding layer 2 and a common electrode 3, the membrane portion 7 is flexed, as shown in the figure, so that the liquid crystal gap thickness may vary. In such an instance, upper or lower irregular color and retardation difference (void color) may be caused, possibly degrading the image quality, whereby it is desirable to eliminate such possibility.

SUMMARY OF THE INVENTION

An object of the present invention is to provide a liquid crystal display device wherein the above-cited liquid crystal display device as described in EP Application No. 92307010.6 is further improved.

It is another object of the present invention to provide a liquid crystal display device wherein the display image is quite stable.

It is a further object of the present invention to provide a liquid crystal display device comprised of picture element electrodes provided on the first plane of a substrate and an opposed electrode placed oppositely to said picture element electrodes, between which a liquid crystal is carried, characterized in that in a region of said substrate corresponding to said picture element electrodes is formed a concave portion from the second plane side opposite the first plane of said substrate, said region being light translucent, and said concave portion having a translucent material enclosed therein.

DETAILED DESCRIPTION OF THE PREFERRED EMBODIMENTS

Figure 1:
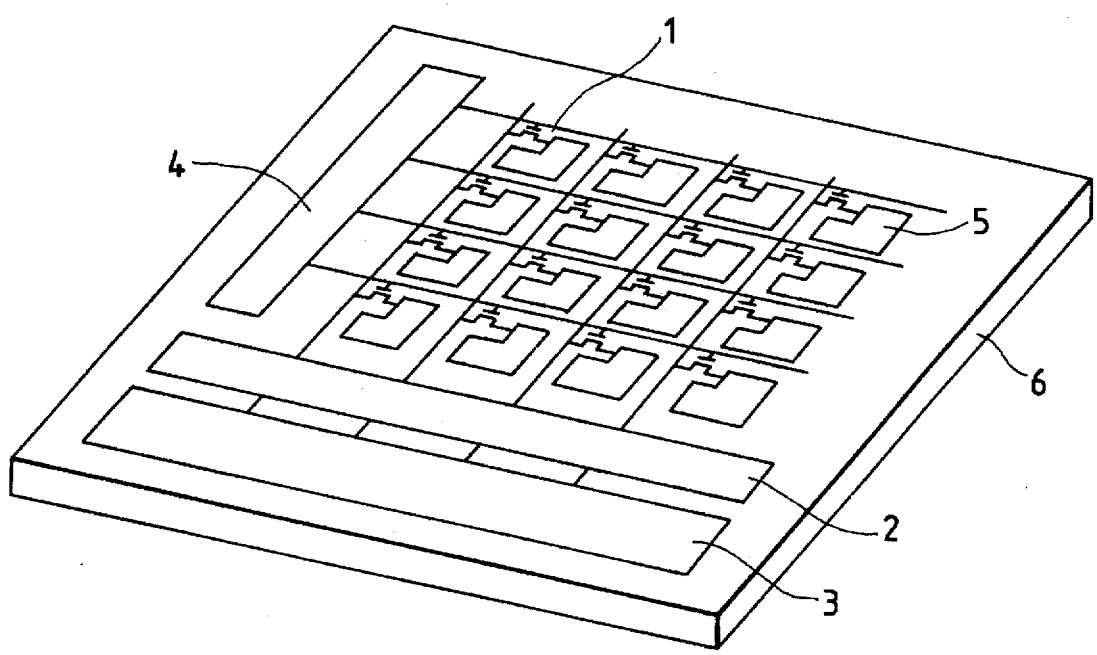
FIG. 1 is a typical view showing a conventional active matrix-type liquid crystal display device.
Figure 2A:
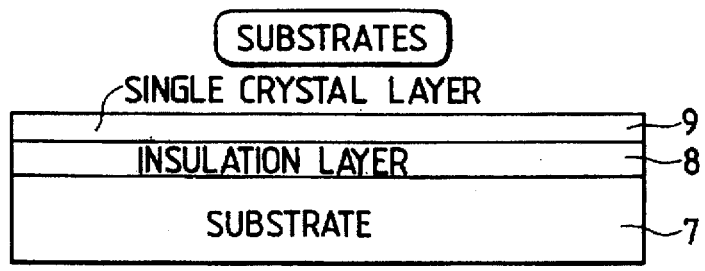
FIGS. 2A to 2D are typical views showing a liquid crystal display device as previously proposed by the present inventors.
Figure 2B:
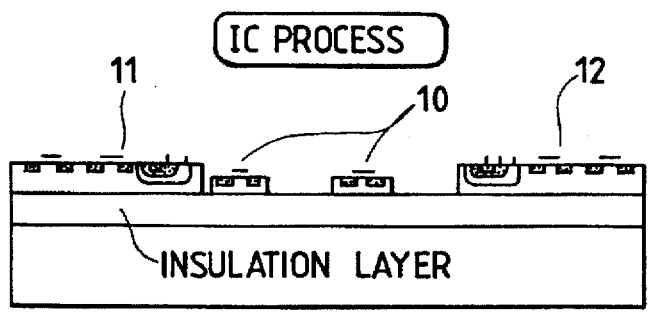
Figure 2C:
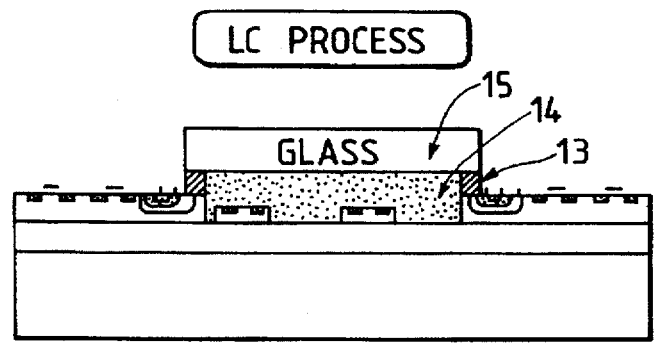
Figure 2D:
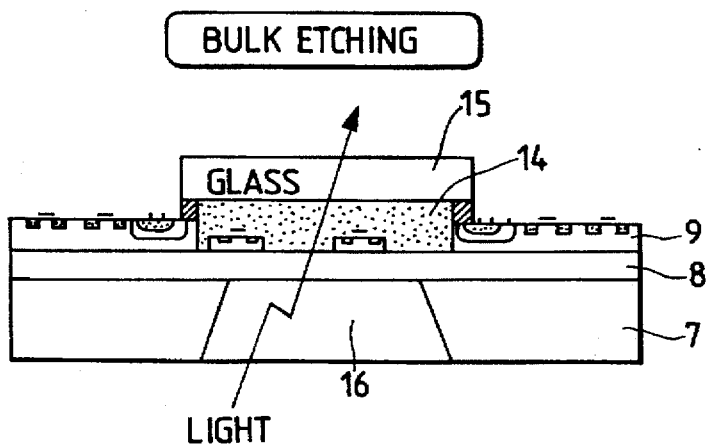
Figure 3:
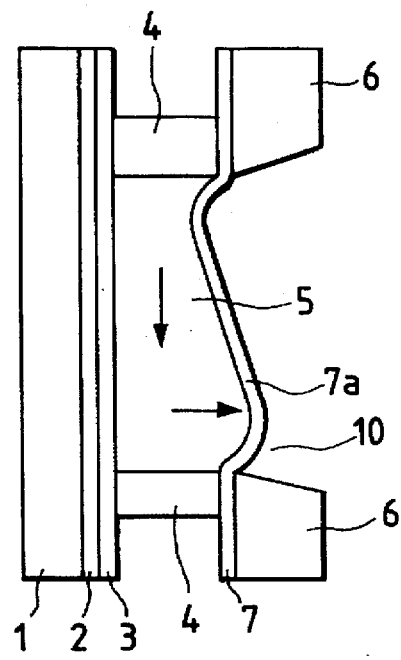
FIG. 3 is a typical view showing a possible variation in liquid crystal phase for the liquid crystal display device of FIGS. 2A to 2D.

A liquid crystal display device of the present invention is comprised of picture element electrodes provided on the first plane of a substrate and an opposed electrode placed opposedly to said picture element electrodes, between which a liquid crystal is carried, characterized in that in a region of said substrate corresponding to said picture element electrodes is formed a concave portion from the second plane side opposite the first plane of said substrate, said region being light translucent, and said concave portion having a translucent material enclosed therein.

Among the liquid crystal display devices of the present invention are also included the appropriately improved liquid crystal display devices of the above constitution.

In the present invention, a light transparent material enclosed into the concave portion or cavity prevents the variation in the thickness of liquid crystal gap. That is, because the pressure equivalent to the internal pressure of liquid crystal is exerted on the thin film being translucent from the opposite side, the membrane portion composed of the thin film is prevented from flexing due to dead weight of liquid crystal, so that there is no difference in the cell gap amount of liquid crystal between sites. Also, because of no thermal stress acting on the thin film, driving elements on the thin film undergo no thermal stress, thereby causing only minimum variation in the characteristics, and resulting in less degradation in the display quality of liquid crystal. Hence, the quite high quality display image can be obtained stably.

In the liquid crystal display device of the present invention, it is possible to adjust the volume change of the translucent material enclosed into the concave portion due to temperature change to be substantially equivalent to that of the concave portion.

The liquid crystal display device of the present invention may be configured to reinforce the thin film layer provided with liquid crystal driving elements by filling a flowable material in the concave portion, and enhance the environment resistance by providing a region for absorbing volume changes of the flowable material reinforcing the thin film layer which occur due to varying temperature or atmospheric pressure, outside of the image display portion.

Also, the liquid crystal display device of the present invention may be configured to enclose a resin in a certain thickness or below on the surface of thin film which is the bottom of the concave portion, and enclosing an inert gas into remaining portion.

The liquid crystal display devices of the present invention also include a liquid crystal display device in which two substrates have a thin film layer provided with liquid crystal driving elements sandwiched therebetween, one of the substrates having a liquid crystal material and the other having a flowable material, wherein the two substrates are transparent, and a transparent electrode is provided on the surface of the transparent substrate enclosing a liquid crystal material, and a light shielding layer and color filters are provided on the surface of the transparent substrate enclosing a flowable material.

The liquid crystal display devices of the present invention also include a liquid crystal display device in which there are provided two substrates having a liquid crystal driving element layer sandwiched therebetween, with a liquid crystal material provided between one substrate and the liquid crystal driving element layer, and a flowable material provided between the other substrate and the liquid crystal driving element layer, wherein the two substrates are transparent, and the volume of the liquid crystal material is equal to or greater than that of the flowable material.

The liquid crystal display devices of the present invention also include a liquid crystal display device in which a liquid crystal panel has a liquid crystal carried between a liquid crystal driving element substrate having a liquid crystal driving element layer via a transparent insulating layer on an opaque substrate, and a transparent opposed substrate having a transparent electrode on a transparent substrate, the opaque substrate corresponding to a display area of the liquid crystal panel is hollowed up to the transparent insulating layer, a deformable transparent filler is disposed in a hollow portion, and enclosed via the elastic sealing member by a transparent sealing substrate. The present invention can exhibit the excellent effect in the liquid crystal display device having mounted the driving elements composed of single crystal Si but is not limited to such liquid crystal display devices employing single crystal Si, and the present invention may be applicable to the conventional liquid crystal display devices employing polycrystalline Si, amorphous Si or other semiconductors.

With such a constitution of the liquid crystal display device, the volume change of transparent filler can be absorbed by the resiliency of sealing member used for the sealing of the transparent filler, preventing the influence on the liquid crystal layer or driving elements.

The present invention will be further described below in connection with the specific examples.

[Example 1]

Figure 4:
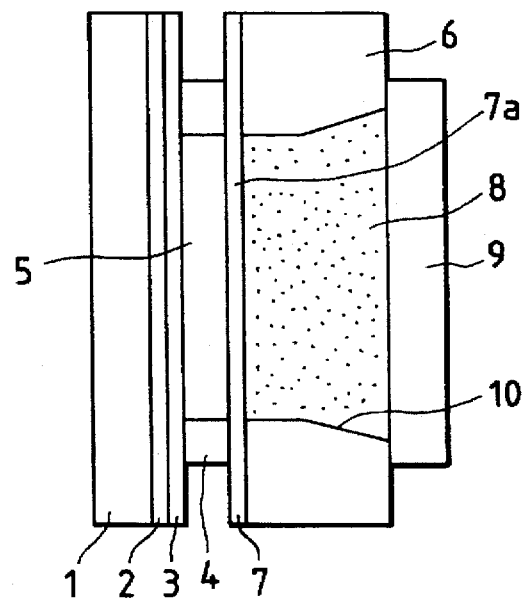
FIG. 4 is a typical view illustrating a liquid crystal display device of the present invention.

In FIG. 4, 1 is a transparent substrate, 2 is a light shielding layer for shielding light between a color filter layer corresponding to each picture element and the picture element, 3 is a common electrode for applying a voltage to the liquid crystal, 4 is a liquid crystal seal area, and 5 is a liquid crystal, the seal area 4 defining the layer thickness of the liquid crystal 5. 6 is a silicon SOI substrate where picture element area is hollowed out to be translucent (i.e., a concave portion is formed), and 7 is a thin film provided with an electrode for applying a voltage to liquid crystal, a transistor and a driving circuit for each picture element, wherein the portion residing on the upper side of a hollow portion 10 is a membrane portion 7a.

In this example, in order to prevent the membrane portion 7a from flexing due to dead weight of the liquid crystal 5 to cause the thickness change of liquid crystal gap, a translucent liquid 8 having a specific weight equal to that of liquid crystal, as the light transparent material, is filled in the hollow portion 10, and enclosed by covering the hollow portion 10 with a transparent substrate 9. By causing this translucent liquid 8 to exert a pressure equal to or greater than the internal pressure of the liquid crystal layer from the opposite side, the forces pressing on the membrane portion 7a from left and right sides are equalized for each section to cause the force of the liquid crystal 5 pressing on the membrane portion 7a to be balanced for each section, so that no flexure of the membrane layer 7 occurs. This liquid crystal display device is of a sealed structure which excludes any contaminant such as alkali, giving rise to a higher reliability. It should be noted that the transparent substrate 9 is favorably composed of an inorganic material such as glass which allows no water to percolate thereinto to provide a better temperature resistance.

Figure 5:
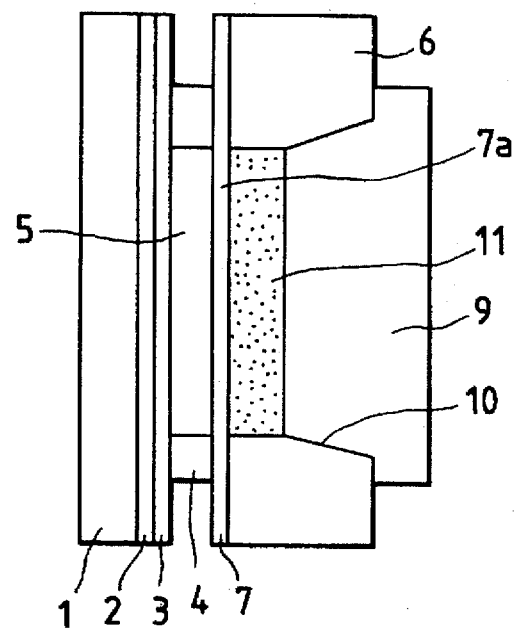
FIG. 5 is a typical view illustrating another liquid crystal display device of the present invention.

FIG. 5 is an example wherein a liquid crystal 11 identical to liquid crystal 5 within the liquid crystal cell is filled by the same volume into the hollow portion 10 to balance the pressing forces from left and right sides onto the membrane 7. A transparent substrate 9 sealing the liquid crystal 11 is attached to partially enter the hollow portion 10. In this example, the forces pressing on the membrane portion 7a from left and right sides for each portion can be exactly equalized, despite the environmental changes such as changes in temperature or atmospheric pressure, so that the membrane portion 7a causes no flexure.

Figure 6:
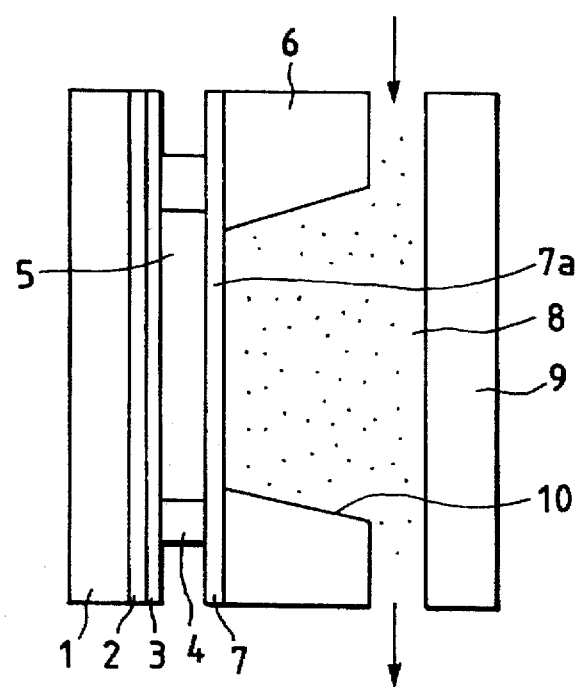
FIG. 6 is a typical view illustrating another liquid crystal display device of the present invention.

FIG. 6 is an example in which a liquid 8 with the same dead weight filled in the hollow portion 10 is circularly flowed. The force of the liquid crystal pressing on the membrane portion 7a is balanced for each section, and the heat generated in the panel portion is absorbed by virtue of the circular flow to maintain the temperature constant. Therefore, it is suitable for usages such as a projection TV which has high brightness and causes significant temperature elevation.

While in this example, the translucent liquid 8 having a specific weight equal to that of liquid crystal and the same liquid crystal 11 are provided, it will be appreciated that other materials can be also used.

Figure 7:
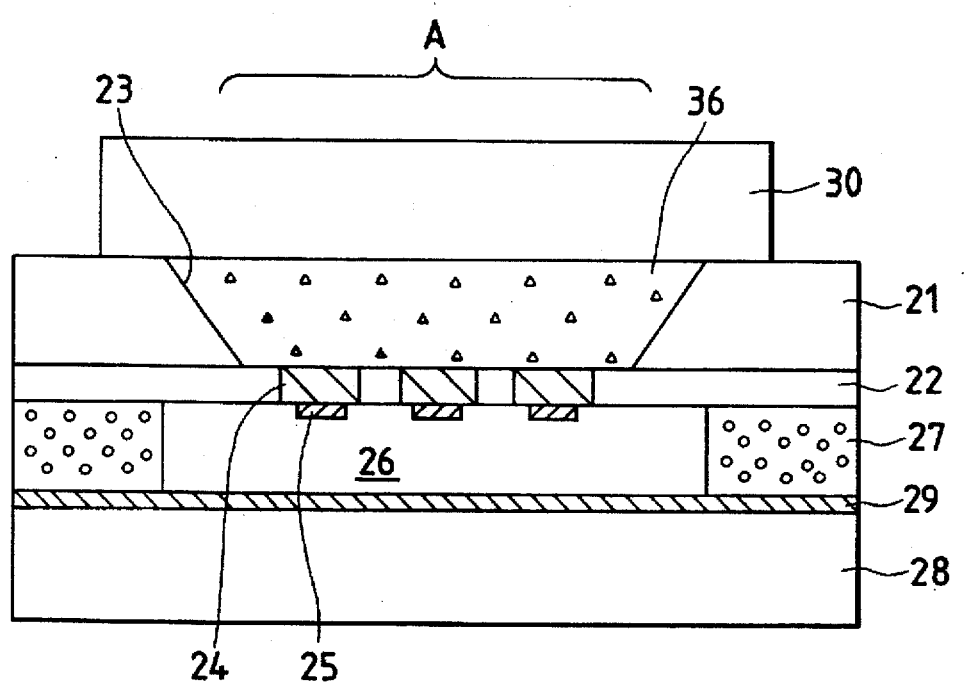
FIG. 7 is a typical view illustrating another liquid crystal display device of the present invention.

FIG. 7 is an example in which a potting resin 36 as the light transparent material is filled in the hollow portion 23.

The manufacturing method of a display device as shown in FIG. 7 is as follows. A thin film is formed on a substrate 21 made of single crystal silicon as the main component which is an SOI substrate or semiconductor substrate. The thin film 22 is composed of an insulating layer as well as an active layer of the SOI substrate 21, and a deposited layer formed in the postprocess, whereby driving elements 24 for driving the liquid crystal and electrodes 25 are formed in this thin film 22 to fabricate an active matrix circuit substrate. Then, a glass substrate 28 having an opposed electrode 29 is bonded by the sealing member 7, and thereafter a liquid crystal 26 is transferred into the gap between both substrates and sealed by a well-known method.

A liquid crystal display portion A is necessary to be made transparent, and thus is formed into the hollow portion 23 by removing a single crystal silicon portion of the SOI substrate by anisotropical etching with an alkaline etching liquid, until a portion of the thin film 22 is exposed. Thereafter, a transparent potting resin 36 is filled into the hollow portion 23 to provide reinforcement. The potting resin 36 for use may be gel-type silicon resin such as KJR-9010 made by The Shin-Etsu Chemical Co., Ltd., for example.

Thereafter, a glass plate 30 is bonded thereto in a dry air or dry nitrogen of the semiconductor grade not containing water after curing. Adhesive for use may be a UV curable resin (epoxy type, unsaturated polyester type, acrylate type, thiol type, salt type) which is curable at temperatures practically used, or an instantaneous adhesive of two liquid mixture type.

Thereby, a liquid crystal cell filled with resin can be obtained as shown in FIG. 7. By making the surface of resin flat, the optical scattering can be prevented to improve the visibility. Also, by employing a resin having a refractive index approximating that of the thin film and a transparent substrate, a brighter liquid crystal display device with lowered interfacial scattering and better transmittance can be provided.

Figure 11:
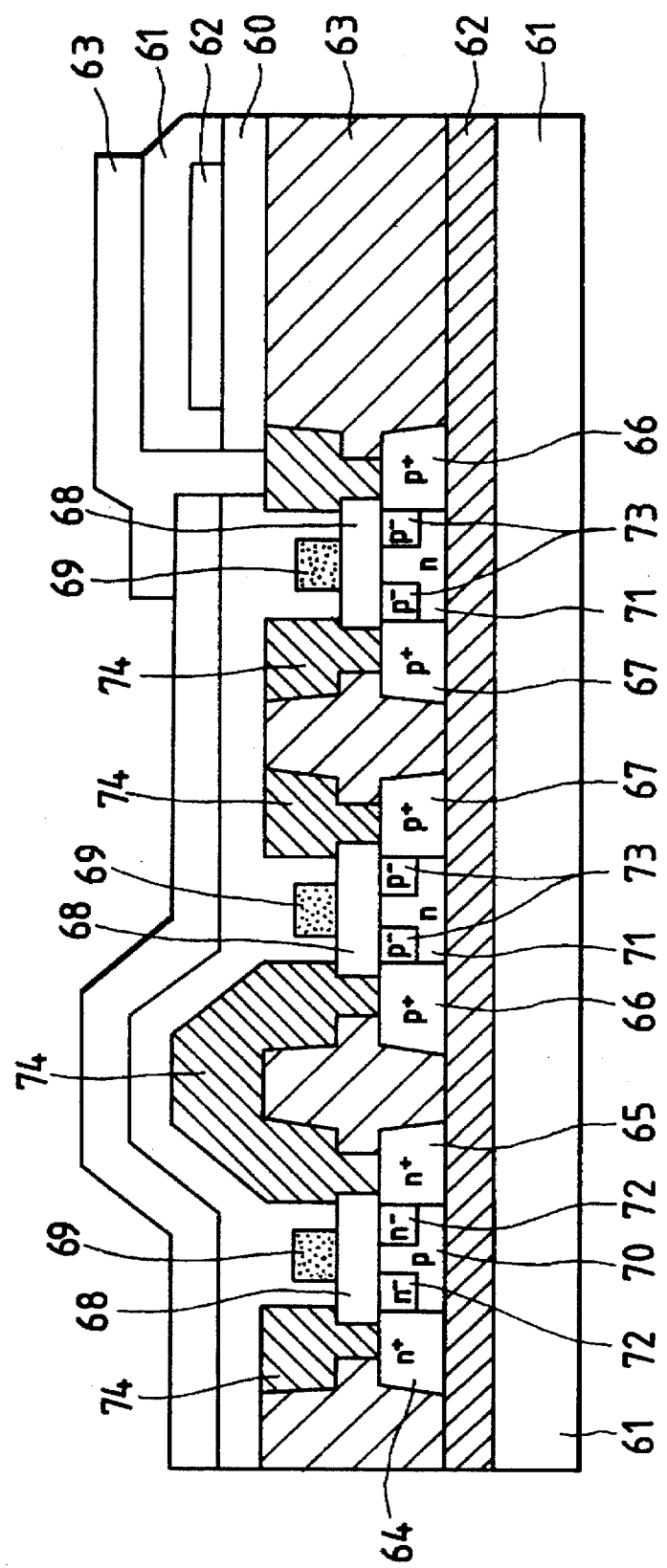
FIG. 11 is a typical view illustrating an active matrix substrate useful in the liquid crystal display device of the present invention.

FIG. 11 illustrates an active matrix circuit substrate usable in this example.

In FIG. 11, a CMOS converter is used for the peripheral driving circuit, and a PMOS transistor is used for the switching element of picture element electrode. In the figure, 61 is a supporting substrate, 62 is a backing insulating layer, 63 is an element separating oxide film, 64 is a source region of NMOS transistor, 65 is a drain region of NMOS transistor, 66 is a drain region of PMOS transistor, 67 is a source region of PMOS transistor, 68 is a gate oxide film, 69 is a gate electrode, 70 is a channel region of NMOS transistor, 71 is a channel region of PMOS transistor, 72 is an N-type electric field relaxation region, 73 is a P-type electric field relaxation region, 74 is an Al (wiring) electrode, 75 is an NMOS transistor, 76, 77 is a PMOS transistor, 78 is a holding capacitor, 79 is a CMOS inverter, 80, 81 is an interlayer insulating film, 82 is a common electrode and 83 is a picture element electrode.

Figure 8:
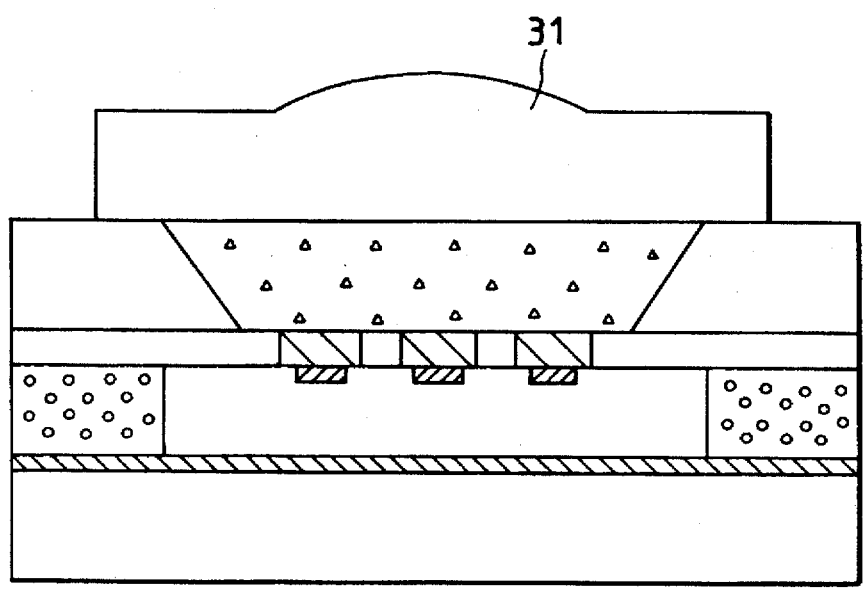
FIG. 8 is a typical view illustrating another liquid crystal display device of the present invention.

As a variation of this example, an optical element, e.g., a lens 31 may be incorporated in a package member, as shown in FIG. 8. Thereby, an illumination system used in the liquid crystal cell or optical system on the visual field side can be simplified, allowing the system to be smaller with its costs reduced.

Figure 9:
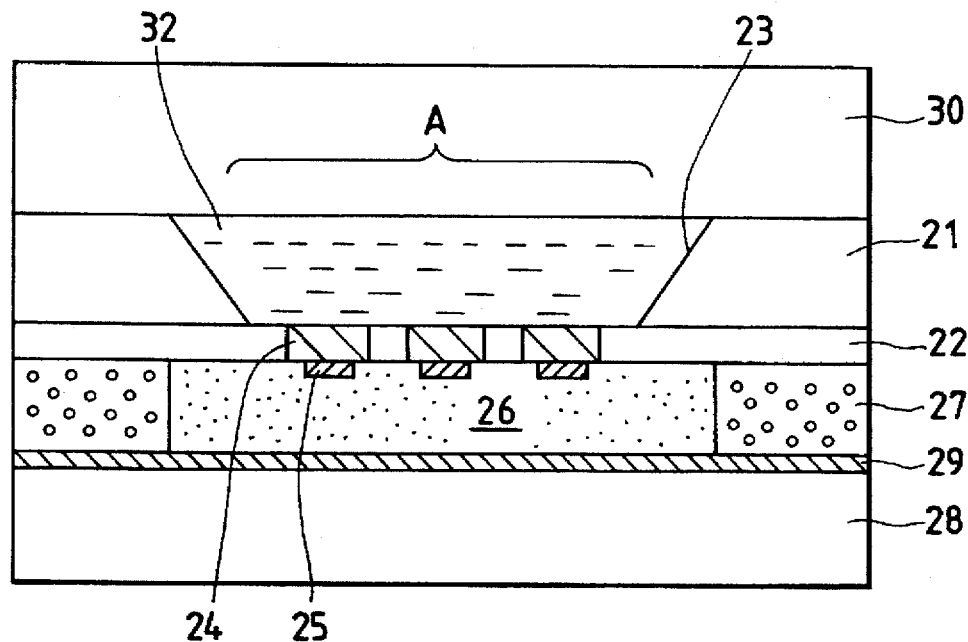
FIG. 9 is a typical view illustrating another liquid crystal display device of the present invention.
Figure 10:
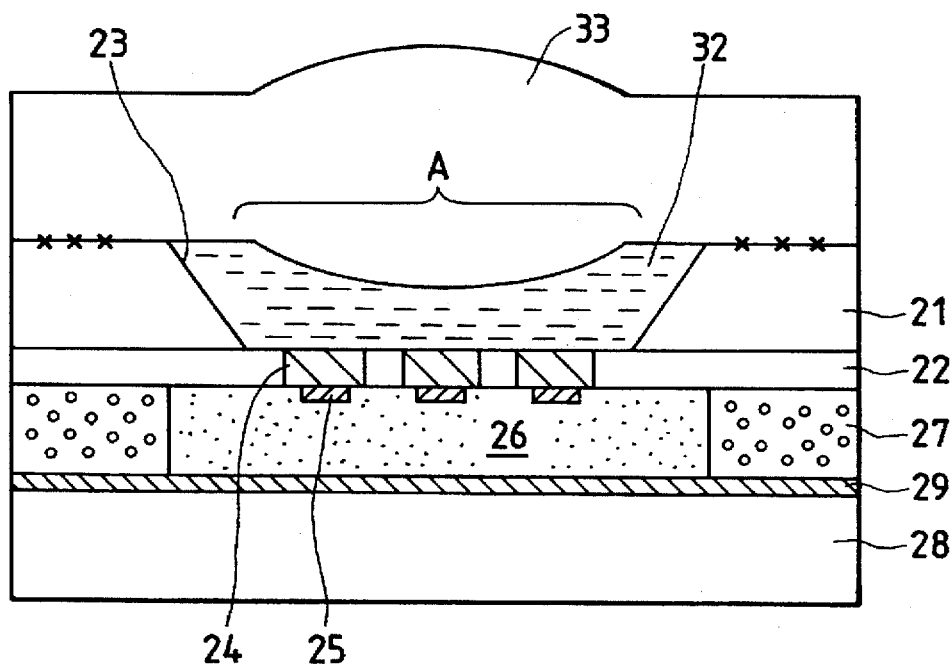
FIG. 10 is a typical view illustrating another liquid crystal display device of the present invention.

As shown in FIG. 9, for the light transparent material 32 other than the potting resin 36, an inert gas having a rare gas such as nitrogen, helium, neon, or argon as the main component or a liquid crystal may be filled in the same manner as shown in FIG. 7, whereupon the flexure of membrane portion 7a can be similarly eliminated and the variation in thickness of the liquid crystal gap is prevented. Also, as shown in FIG. 10, the light transparent material 32 composed of such inert gas or liquid crystal may be sealed by a glass plate with a convex lens 33. In these cases, the sealing member is not limited to glass, but may be sufficient with a member which can transmit the light such as a plastic plate.

With the above constitution of this example, the following action effects can be obtained.

(1) There is no thermal stress exerted on the thin film 7, 22. Also, since a pressure equal to or greater than the internal pressure of liquid crystal 5, 26 is always applied to the thin film, there occurs no flexure of the thin film 7, 22, resulting in no difference in the cell gap amount of liquid crystal 5, 26 between sites.

(2) Since there is no thermal stress exerted on the thin film 7, 22, the driving element 24 on the thin film undergoes no thermal stress, with minimum variation in characteristic, so that the display quality of liquid crystal is not changed.

(3) Since the liquid crystal or inert gas which is light transparent material is a semiconductor grade, there occurs no variation in characteristic of the driving element 24 due to mixture of mobile ions. Likewise, the back face of light transparent material is carried by the transparent substrate 31, whereby there is no risk that water contents are mixed thereinto.

(4) The optical characteristic is very excellent because of the use of light transparent material and the transparent substrate 31.

(5) By using a lens 31, 33 on the transparent substrate, the illumination system used in the liquid crystal cell or optical system on the visual field side can be simplified, whereby the system of liquid crystal display device results in smaller size and lower costs.

With this example, the reliability of the liquid crystal display device having one electrode formed on the thin film is significantly improved. Also, for this reason, the display quality will not degrade and the decrease in manufacturing yield can be prevented, whereby it is possible to lower the price of products. Since other optical system can be also incorporated, the total system can be made smaller with its costs reduced.

[Example 2]

Figure 12:
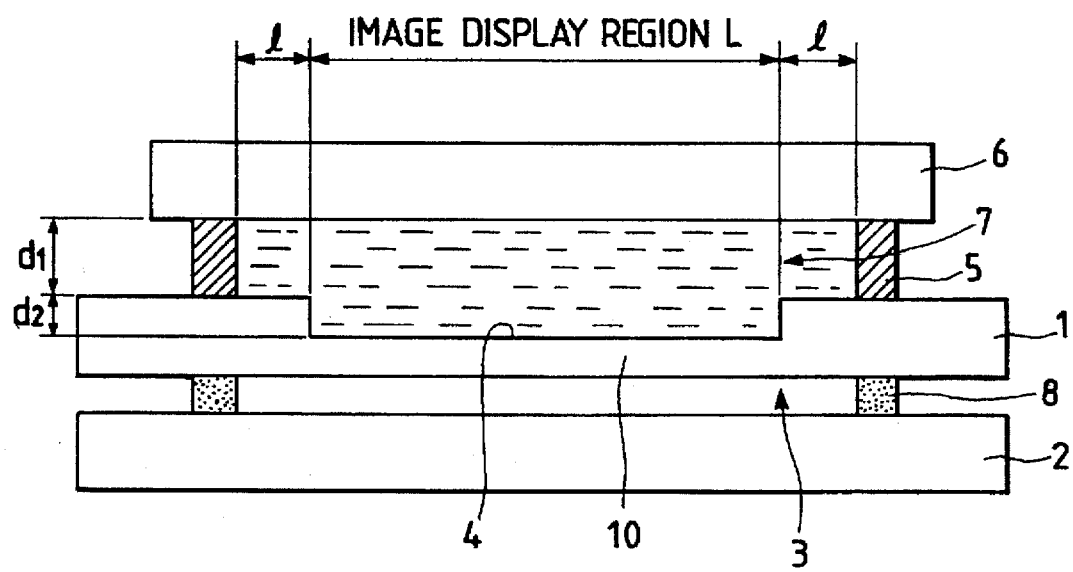
FIG. 12 is a typical cross-sectional view illustrating the liquid crystal display device of the present invention.

FIG. 12 is a cross-sectional view showing a liquid crystal display device of this example. In the same figure, a circuit substrate 1 is non-translucent, and has Tufts and other driving circuit formed via an insulating layer on the surface thereof. Also, on the side of this circuit substrate 1 where driving circuit is formed, an opposed substrate 2 which is translucent such as glass is attached by a seal member 8, and a liquid crystal 3 is enclosed between them.

The term "translucent" as used in this specification means to allow visible light to pass through.

On the other hand, on the opposite side of the circuit substrate 1 from the liquid crystal enclosing side, a hollow portion 4 is formed to thereby afford a translucent nature to the region of the circuit substrate 1 corresponding to the display area.

On the side of the hollow portion 4, a sealing substrate 6 which is translucent such as glass is attached via the seal member 5, and a potting material 7 is enclosed between the circuit substrate 1 and the sealing substrate 6. This potting material 7 has a less stiffening, flowable nature in the temperature range in which the liquid crystal display device is practically used, and serves as the translucent material.

The seal member 5 may be silicon resin or epoxy resin, for example, and the potting material 7 may be polyethylene glycol, a transparent liquid crystal material or silicon-type gel.

Figure 13:
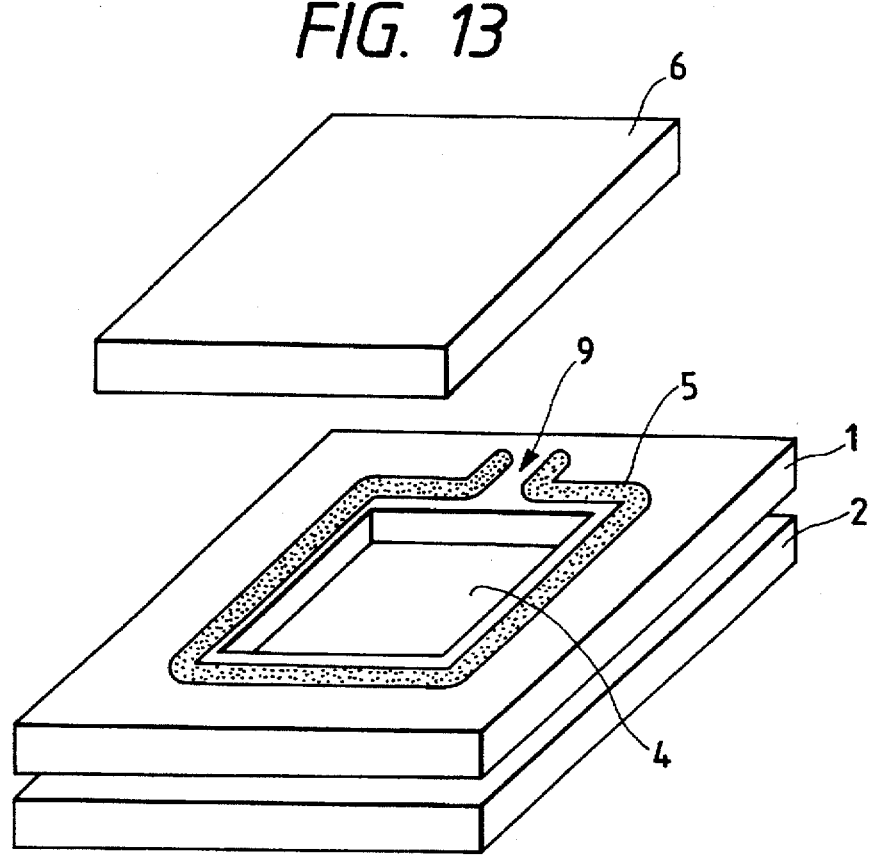
FIG. 13 is a perspective view showing the state before enclosing a potting material 7, with a sealing substrate for the liquid crystal display device of FIG. 12 removed.

FIG. 13 is a perspective view showing the state before enclosing the potting material 7, with the sealing substrate 6 removed.

As shown in the figure, the seal member 5 for bonding the sealing substrate 6 with the circuit substrate 1 is laid to surround the outside of the hollow portion 4. Also, on one side of the area surrounded by the seal members 5 is formed an inlet port 9 for transferring the potting material 7.

The potting material 7 is transferred through the inlet port 9 between the circuit substrate 1 and the sealing substrate 6, after bonding the sealing substrate 6 via the seal member 5 to the circuit substrate 1, and hermetically enclosed by sealing the inlet port 9 with a sealing material as will be described later.

And by enclosing the potting material 7, a membrane portion 10 left behind by formation of the hollow portion 4 is covered with the potting material 7 and the sealing substrate 6, and protected from the variation in humidity or atmospheric pressure.

By the way, the practical use of the liquid crystal display device is normally effected in the temperature range from about −20° to +60° C. Accordingly, it is necessary not to apply any excessive pressure to the membrane portion 10 left behind by formation of the hollow portion 4 in this temperature range.

To this end, in this example, the volume change of potting material due to temperature variation is set to be substantially equal to the volume change between the circuit substrate 1 and the sealing substrate 6, which is caused by the volume change of the seal member 5 varying the spacing between the circuit substrate 1 and the sealing substrate 6.

That is, if $d_1$ and $d_2$ are defined as shown in FIG. 12, and assuming that the length of one side for the display region corresponding to the width of hollow portion 4 is L, the interval from the side edge of hollow portion 4 to the seal member 5 is 1, the coefficient of linear expansion for the seal member 5 in the longitudinal direction is $\rho(K^{-1})$, the coefficient of cubic expansion for the potting material 7 is $\alpha(K^{-1})$, and the temperature variation is $T(K)$, wherein $1 \ll L$ is supposed, $$d^1 \rho L^2 \cong (d_1 + d_2) \alpha L^2 T \ldots (A)$$

In the above expression (A), the left side indicates the volume change regarding the potting material 7 enclosing region due to expansion (shrinkage) of the seal member 5, while the right side indicates the volume change of potting material 7.

The above expression (A) is transformed into $d_1 \rho \cong (d_1 + d_2) \alpha \ldots$ (B)

One instance of satisfying the above expression (B) occurs when the potting material 7 is ethylene glycol and the seal member 5 is silicon resin.

For example, it is assumed that $d_2$ is equal to 600 μm and $d_1$ is equal to 5 mm. The coefficient of cubic expansion α for ethylene glycol is $0.64 \times 10^{-3} (K^{-1})$. A variety of silicon resins are made wherein the coefficient of linear expansion in its longitudinal direction can be selected in a range from 0.1 to $10 \times 10^{-3}$ ($K^{-1}$). Herein, $\rho = 0.7 \times 10^{-3} (K^{-1})$ is selected, so that the above expression (B) can be satisfied.

In practice, each of ρ and α slightly varies with the temperature, but as the design value, the average value in the temperature range for practical use may be adopted.

A manufacturing method of the liquid crystal display device of this example will be described below.

First, the opposed substrate 2 and the circuit substrate 1 are bonded via the seal member 8, and after a liquid crystal 3 is transferred between them and then sealed, the hollow portion 4 is formed in the circuit substrate 1 to leave behind the membrane portion 10.

Next, the transfer and sealing of the potting material 7 is performed, and this is divided into three processes including laying the seal member 5, transferring the potting material 7 and sealing the inlet port 9 (see FIG. 13).

(1) Laying process of the seal member 5

First, the seal member 5 is applied around the hollow portion 4. This application can be effected by tracing a shape discharged through the tip end of needle from the dispenser, or by squeegee printing. In making this application, the inlet port 9 is formed as shown in FIG. 13.

The sealing substrate 6 such as glass is placed on the seal member 5 applied, a pressure is exerted so that the circuit substrate 1 and the sealing substrate 6 may be overlapped with a desired gap, and by burning (e.g., in an oven for two hours at 80° C.), the filling region of the potting material 7 is formed.

The gap between the circuit substrate 1 and the sealing substrate 6 can be controlled by disposing a gap member having a desired thickness, for example, a glass or a needle, between the circuit substrate 1 and the sealing substrate 2. Also, when a very narrow gap (e.g., about 10 μm) is required, beads having a diameter roughly corresponding to this gap may be mixed into the seal member 5, when applied, to thereby provide the desired gap.

(2) Transfer process of potting material 7

The filling of potting material 7 can be effected by a conventionally well-known vacuum transfer method.

The potting material 7 is subjected to vacuum degassing (e.g., for twelve hours at $10^{-3}$ Torr) before transfer to exclude any mixture of bubbles.

The liquid crystal display device (liquid crystal cell) having formed the filling area of the potting material 7 between the circuit substrate 1 and the sealing substrate 2 and the potting material 7 placed in a Petri dish are set within a vacuum apparatus to draw a vacuum to a degree of vacuum of about $10^{-3}$. The time of drawing vacuum is about one to twenty-four hours after having reached $10^{-3}$ Torr.

Thereafter, the liquid crystal display device is immersed in the Petri dish containing the potting material 7 still in vacuum state. Thus, the potting material 7 enters the filling region to some extent due to capillary phenomenon.

After the transfer with the capillary phenomenon arrives at an equilibrium state, the vacuum apparatus is gradually leaked for a period from twenty minutes to one hour to allow the potting material 7 to be sufficiently transferred into the filling region.

Since the transfer of the potting material 7 is easy to make by the vacuum transfer method as above noted, the potting material 7 is preferably a material having low vapor pressure.

(3) Sealing process of inlet port 9

The liquid crystal display device is taken out from the vacuum apparatus, and after the inlet port 9 is cleanly wiped with acetone and degreased, the sealing of the inlet port 9 is effected by mounting a sealing material. The sealing material may be epoxy resin when the potting material 7 used is polyethylene glycol.

Thereafter, by curing fully the sealing material, the transfer and sealing of the potting material 7 is completed.

Figure 14:
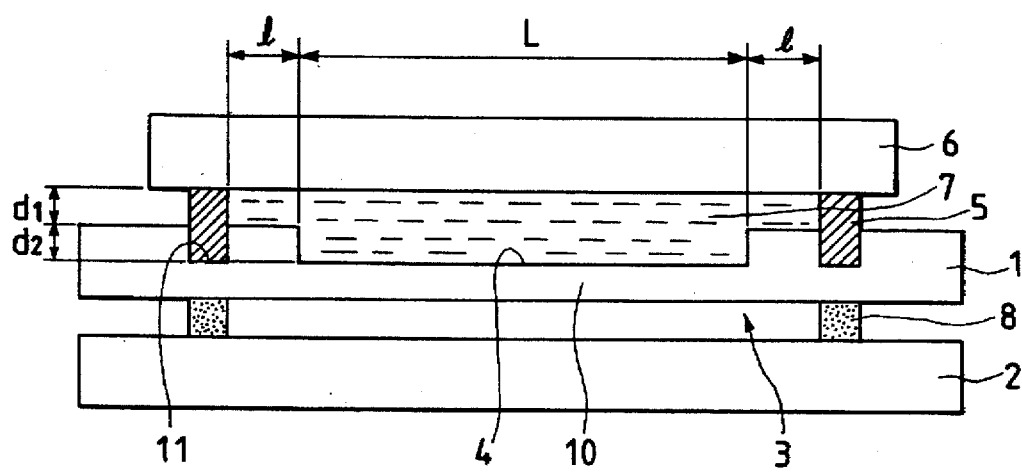
FIG. 14 is a typical view illustrating another liquid crystal display device of the present invention.

FIG. 14 is a variation of FIG. 12. This variation of FIG. 14 is similar to FIG. 12, except that a groove 11 is formed in the site of laying the seal member 5 to the circuit substrate 1, and the seal member 5 is laid within this groove, whereby the substantially thicker application of the seal member 5 can be made without increasing the interval between the circuit substrate 1 and the sealing substrate 6.

That is, the volume change of the seal member 5 can be larger than that of FIG. 12, whereby this variation can follow the instance where the volume change of the potting material 7 is large.

Also, if the formation of groove 11 is performed simultaneously with the formation of hollow portion 4 (normally by etching), the increase in the number of processes can be avoided.

While the depth of groove 11 is equal to that of hollow portion 4 in this example, it should be noted that this depth of groove 11 may be selected in accordance with the quality of potting material 7 for use and the quality of seal member 5.

In this example, the condition that the volume change of the potting material 7 with temperature change may be substantially equal to the volume change 25 between the circuit substrate 1 and the sealing substrate 6 caused by the volume change of the seal member 5 with temperature change is, when $1 \ll L$, $(d_1 + d_2) \rho L^2 T \cong (d_1 + d_2) \alpha L^2 T \ldots$ (C)

namely $\rho \cong \alpha \ldots$ (D)

Figure 15:
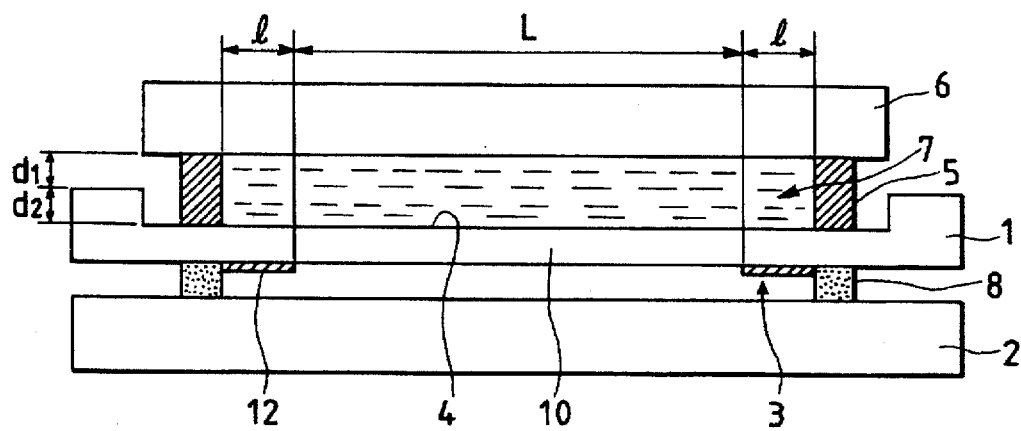
FIG. 15 is a typical view illustrating another liquid crystal display device of the present invention.

FIG. 15 is a typical view showing a further variation. This variation as shown can exhibit the same effects as that of FIG. 14 by making the hollow portion 4 a wider area including the range for laying the seal member 5.

In the case, light (visible ray) is also transmitted through the outside of the display region because the circuit substrate 1 is translucent therein, but the provision of a light shielding layer 12 in the circuit substrate 1 can prevent troubles associated therewith from occurring. This light shielding layer 12 may be provided on the opposite plane of the circuit substrate 1 or the sealing substrate 6.

It should be noted that the condition that the volume change of the potting material 7 with temperature change is substantially equal to the volume change between the circuit substrate 1 and the sealing substrate 6 caused by the volume change of the seal member 5 with temperature change is represented by the expression (D), even if the value of 1 is not negligible relative to the value of L.

Figure 16:
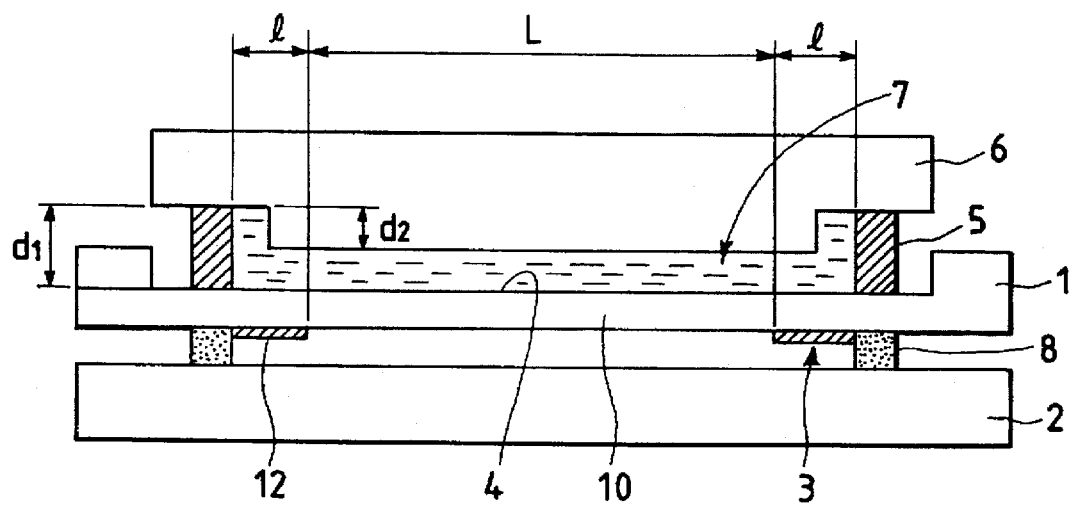
FIG. 16 is a typical view illustrating another liquid crystal display device of the present invention.

FIG. 16 is a typical view showing another variation. This variation as shown in equivalent to that of FIG. 15, except that the sealing substrate 6 is of a convex shape in cross section in which its central portion protrudes toward the hollow portion 4 so that the display region is thick and the peripheral seal region is thin.

In this case, since the sealing substrate 6 is thick in the display region, the volume of potting material 7 can be reduced, and the selection width of the seal member 5 can be widened.

In this example, the condition that the volume change of the potting material 7 with temperature change may be substantially equal to the volume change between the circuit substrate 1 and the sealing substrate 6 caused by the volume change of the seal member 5 with temperature change is $$(d_1+d_2)\rho \cong (d_1-d_2)\alpha$$

when $1 \ll L$, and using $d_1$ and $d_2$ as shown in FIG. 16, whereby $\rho$ can be set smaller than that of the examples of FIGS. 12 to 15 for the same a.

Figure 17:
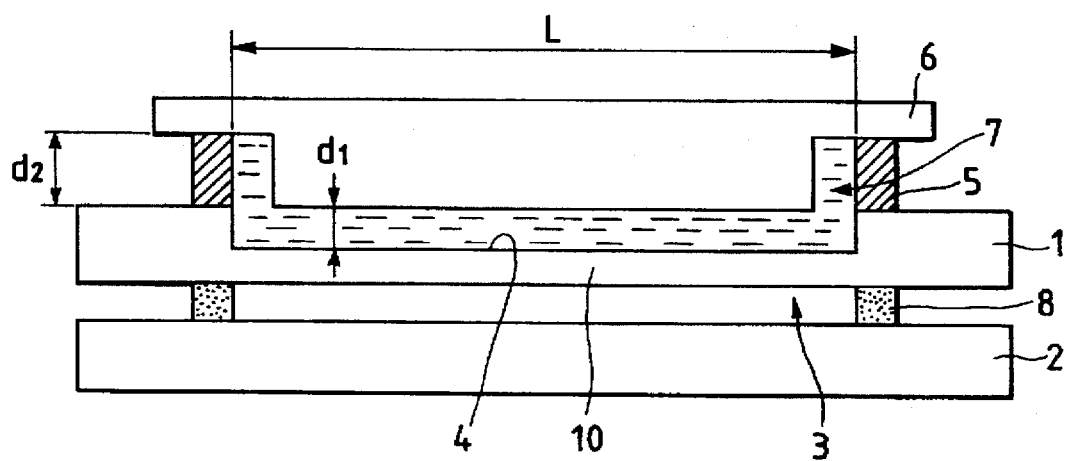
FIG. 17 is a typical view illustrating another liquid crystal display device of the present invention.

FIG. 17 is a typical view of another variation. This variation uses a sealing substrate 6 of convex shape in cross section, like the example of FIG. 16, instead of the sealing substrate 6 in the example of FIG. 12.

In this example, the coefficient of cubic expansion for the potting material 7 is necessary to be smaller than in the example of FIG. 16, wherein there is the advantage that the mounting state of the seal member 5 is stabler than in the example of FIG. 16.

In this example, the condition that the volume change of the potting material 7 with temperature change may be substantially equal to the volume change between the circuit substrate 1 and the sealing substrate 6 caused by the volume change of the seal member 5 with temperature change is $$d_2\rho \cong d_1\alpha$$

when $1 \ll L$, and using $d_1$ and $d_2$ as shown in FIG. 17.

[Example 3]

Figure 18A:
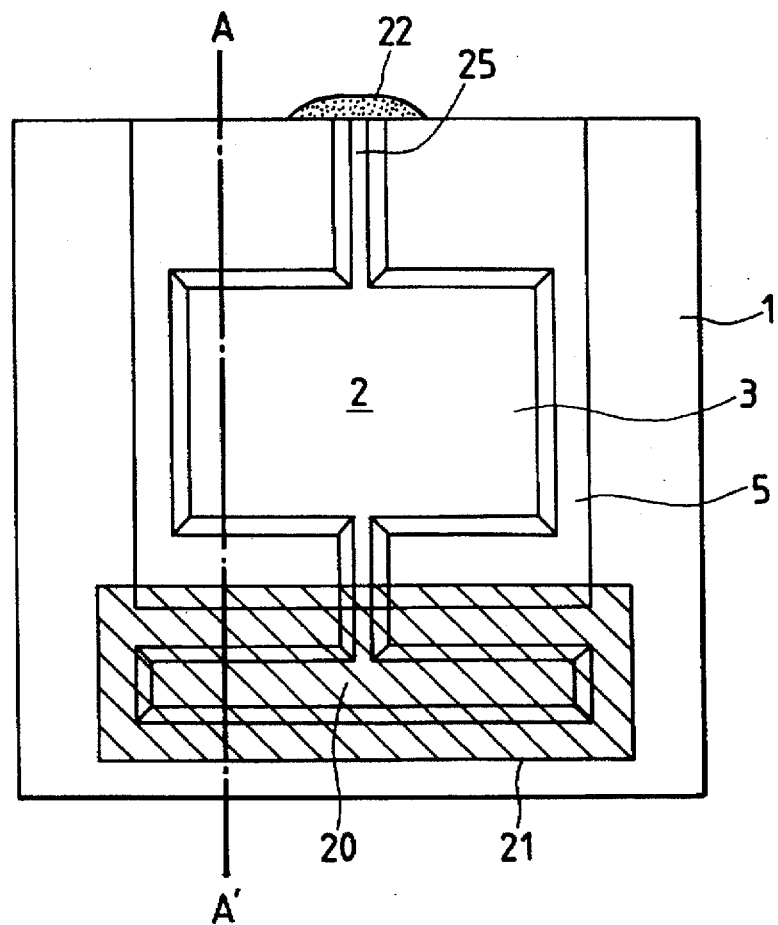
FIGS. 18A and 18B are typical views illustrating another liquid crystal display device of the present invention.
Figure 18B:
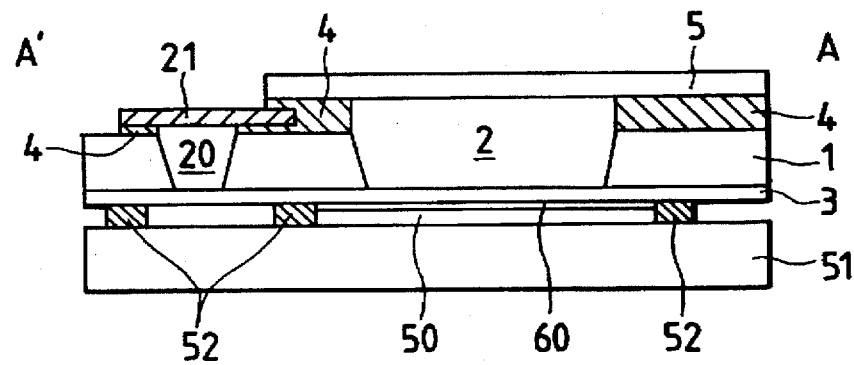

FIG. 18A is a plan view of a liquid crystal display device in this example, and FIG. 18B is a cross-sectional view taken along the line A–A'.

The liquid crystal display device of this example consists of an image display liquid crystal cell portion and a potting cell portion for reinforcing the liquid crystal cell portion by transferring the potting material. The liquid crystal cell portion is comprised of a liquid crystal 50 transferred into a portion surrounded by a transparent substrate 51, a liquid crystal driving element layer 60, and a frame member 52. The transparent substrate 51 is provided with a light shielding layer for shielding light between color filters, a transparent electrode for applying a voltage to liquid crystal, and an oriented film for orienting the liquid crystal in a fixed direction. The liquid crystal driving element layer 60 is comprised of a picture element electrode, a thin film transistor (TFT) for applying a signal to the electrode, a signal line for sending the signal to TFT, a TFT driving line, for each picture element section, and horizontal and vertical shift registers for driving the picture element Tufts.

Figure 35A:
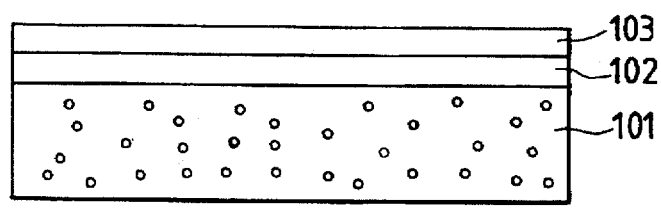
FIGS. 35A to 35C are typical views showing a manufacturing method of the Si substrate applicable to the liquid crystal display device of the present invention.
Figure 35B:
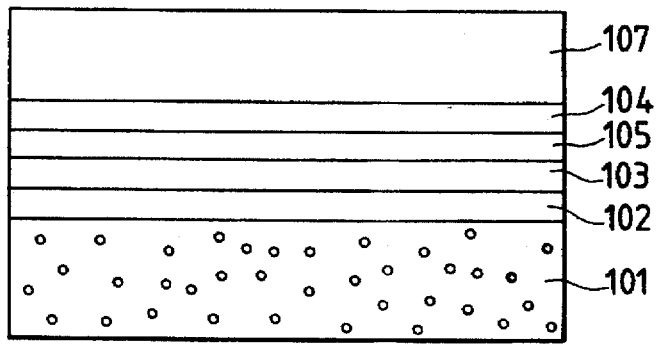
Figure 35C:
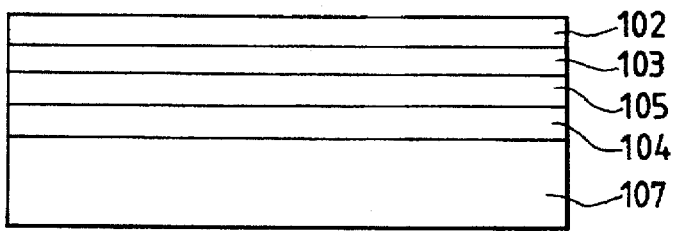

The liquid crystal driving element layer 60 is made on an Si substrate manufactured by the method as shown in FIGS. 35A to 35C. The Si substrate is an Si single crystal substrate which is superior in economical aspect and has extremely excellent crystallinity to be uniformly flat over the large area. The semiconductor active elements are made on the Si single crystal layer having significantly less defects, so that the floating capacity of semiconductors is reduced, whereby it is possible to provide high performance liquid crystal display devices wherein the elements and circuits capable of effecting high speed operation, no latch-up phenomenon, and excellent radiation resistance characteristic are integrated on the same substrate as that of the liquid crystal image display picture elements.

A manufacturing method of the Si substrate will be exemplified below with reference to FIGS. 35A to 35C.

As shown in FIG. 35A, a porous Si substrate is formed by anodizing a P-type (100) monocrystalline Si substrate having a thickness of 300 microns in an HF solution.

The anodization conditions are as follows.

| | |
|---|---|
| Applied voltage: | 2.6 (V) |
| Current density: | 30 (mA · cm$^{-2}$) |
| Anodizing solution: | HF:H$_2$O:C$_2$H$_5$OH = 1:1:1 |
| Time: | 2.4 hours |
| Thickness of porous Si: | 300 (μm) |
| Porosity: | 56 (%) |

An Si epitaxial layer 102 with a thickness of 1.0 micron is grown on the P-type (100) porous Si substrate 101 thus obtained by low-pressure CVD. Deposition is conducted under the following conditions:

| | |
|---|---|
| Source gas: | SiH$_4$ |
| Carrier gas: | H$_2$ |
| Temperature: | 850° C. |
| Pressure: | $1 \times 10^{-2}$ Torr |
| Growth rate: | 3.3 nm/sec |

Next, a 1000 Å thick oxide layer 103 is formed on the surface of the epitaxial layer 102, and on its oxide surface is placed another Si substrate 107 formed with a 5000 Å thick oxide layer 104 and a 1000 Å thick nitride layer 105, as shown in FIG. 35B. The whole structure is then heated at 800° C. in an nitrogen atmosphere for 0.5 hours to firmly join the two substrates to each other.

Thereafter, selective etching is conducted on the bonded substrates in a mixture solution (10:6:50) of 49% hydrofluoric acid, alcohol and 30% hydrogen peroxide solution, without stirring. In 65 minutes, only the non-porous Si layer will remain without etching, while the porous Si substrate 101 is selectively etched with the single-crystal Si as a material for etching stopper and then completely etched, as shown in FIG. 35C.

The etching rate of the non-porous Si single-crystal with the etching solution is extremely low, such that the etching layer is 50 angstroms thick or less even 65 minutes later, and the selective ratio of the etching rate of the porous layer to that of the non-porous Si single-crystal is as large as $10^5$ or more, as shown in FIG. 35C. The etched amount in the non-porous layer (several tens angstroms) is a practically negligible decrease. Thus, the Si substrate 101 having a thickness of 200 microns, rendered porous, is removed, and a single-crystal Si layer 102 having a thickness of 1.0 μm is formed on the SiO$_2$ 103. When SiH$_2$Cl is used as the source gas, the growth temperature has to be higher by several tens of degrees. However, high-speed etching characteristic peculiar to the porous substrate is maintained.

TFT is formed on the single crystal silicon thin film 102 to provide a liquid crystal driving element layer 60, which is opaque to visible light because the liquid crystal driving element layer 60 is made on the Si substrate 1. Thus, in order to be transparent to visible light, an opening portion 2 is hollowed out by etching. The etching solution used is tetramethyl ammonium hydride (TMAH) aqueous solution. The etching conditions are 22% TMAH aqueous solution, 90° C. and ten hours. It is desirable to use the Si substrate 1 of a structure where a thin insulating layer resides on the Si substrate and a single crystal Si layer is laid on its upper portion (Silicon On Insulator structure, SOI), because the insulating layer 3 serves as the etching stop layer to be effective for the uniform etching. Herein, the etching solution is not particularly limitative as far as the selection ratio of Si to $SiO_2$ can be sufficiently attained such as KOH.

Next, a fabrication method of the potting cell portion will be described below. This method is largely divided into three processes including making the potting material filling region, transferring the potting material and sealing the inlet port. In the following, these processes will be described in this order.

The Si substrate 1 is hollowed by etching to provide a region 20 for absorbing potting material volume change, a passageway for connecting the opening portion 2 to the region 20 for absorbing potting material volume change, and a passageway for connecting the opening portion 2 to the potting material inlet port 25 at the same time while the opening portion 2 is being etched. Then, an adhesive (frame member 4) is applied onto the Si substrate 1 around the region 20 for absorbing potting material volume change. The frame member used was epoxy resin (Structbond EH454NF made by Mitsui Toatsu Chemicals, Inc.). The frame member 4 with adhesive may be formed either by discharging adhesive through the tip of needle to trace a pattern, or by squeegee printing. An elastic membrane for absorbing the volume change of potting material with temperature or atmospheric pressure, such as a rubber membrane 21, was laid thereon, then the frame member 4 was similarly formed around the opening portion 2 and on a part of the rubber membrane 21, and a glass substrate 5 was laid thereon. And the whole structure was pressurized to a desired gap, and burned in an oven at 80° C. for two hours to form the potting material filling region.

Herein, it is desirable to use the glass substrate 5 made of a material having a thermal expansion coefficient approximating that of the Si substrate 1, because it is effective to suppress the warpage of liquid crystal display device. In this example, the glass substrate 5 used was AL glass made by Asahi Glass Co., Ltd., having a thermal expansion coefficient relatively approximating that of Si (thermal expansion coefficient of $36 \times 10^{-7}$ for AL glass, and $32 \times 10^{-7}$ for Si). The gap was suppressed by carrying a gap member (glass or needle) having a desired thickness between the glass substrate 5 and the Si substrate 1. Also, when the very narrow gap (about 10 µm wide) is required, the frame member 4 is formed into a desired gap thickness by mixing beads (Micropeal SP made by Sekisui Fine Chemical) having a diameter of about 10 µm in the epoxy resin.

Next, the transfer process for filling the potting material in the potting cell formed in the above way will be described below. The potting material is subjected to vacuum degassing (e.g., for twelve hours at $10^{-3}$ Torr) before transferring to exclude any mixture of bubbles. The liquid crystal display device (liquid crystal cell) having formed the frame and the potting material placed in a Petri dish are set within a vacuum apparatus to draw a vacuum to a degree of vacuum of about $10^{-3}$ Torr. The time of drawing vacuum is from about one to twenty-four hours after having reached $10^{-3}$ Torr. Thereafter, the liquid crystal cell is immersed in the potting material by placing it in the Petri dish containing the potting material still in vacuum state. After the transfer with the capillary phenomenon reaches an equilibrium state, the vacuum apparatus is gradually leaked for a period from twenty minutes to one hour to sufficiently transfer the potting material into the frame.

The potting material is transferred in a vacuum of about $10^{-3}$ Torr as above described. Therefore, the potting material is necessary to be a liquid which has a low vapor pressure, is transparent and is neither solidified nor gasified in a temperature range from −20° C. to 80° C. Specifically, the potting cell used contained liquid crystal, polyethylene glycol (Polyethylene glycol #200 made by Kanto Chemical), silicone oil (Shinetsu Silicone made by The Shin-Etsu Chemical Co., Ltd.).

The sealing of the opening is performed in the following way. The liquid crystal cell is taken out from the vacuum apparatus, and the inlet port 25 is cleanly wiped with acetone and degreased. Then, the sealing of the inlet port 25 for potting material is effected by mounting sealing material 22. The sealing material used was epoxy resin (Structbond ES280 made by Mitsui Toatsu Chemical) or ultraviolet curable resin when the potting material was liquid crystal and polyethylene glycol, while it was Silicone Bond (Shinetsu Silicone made by The Shin-Etsu Chemical Co., Ltd.) when the potting material was silicone oil. The curing was made at room temperature for twelve hours when epoxy resin was used. In the case of silicon resin, the curing was made at 80° C. for two hours. On the contrary, the sealing time for ultraviolet curable resin is as short as one minute for applying ultraviolet radiation, so that the sealing is very effectively made firmly and rapidly.

The liquid crystal display device of this example makes the display in the opening portion 2 by driving the liquid crystal 50 of the opening portion 2 by means of the liquid crystal driving elements fabricated in the liquid crystal driving element layer 60. Since the distance between the glass substrate 51 and the liquid crystal driving element layer 60 defined by the frame member 5 (hereinafter referred to as the gap) affects the transmittance of light, it is desirable that the cell gap is uniform over the entire face of the opening portion 2 to effect even display over the entire face. In this example, the thickness of liquid crystal driving element layer 60 is as thin as one-thousandth or less the opening area, so that the liquid crystal driving element is liable to deformation and cracks. Therefore, the structure as reinforced by potting as shown in this example can enhance the durability and reliability in this liquid crystal display device, and is very effective to provide higher image quality.

Also, the liquid crystal display device of this example has a structure of absorbing the volume change of potting material with the temperature or atmospheric pressure variation by virtue of the deformation of rubber film 21, and is strong to variations in environment.

[Example 4]

Figure 19:
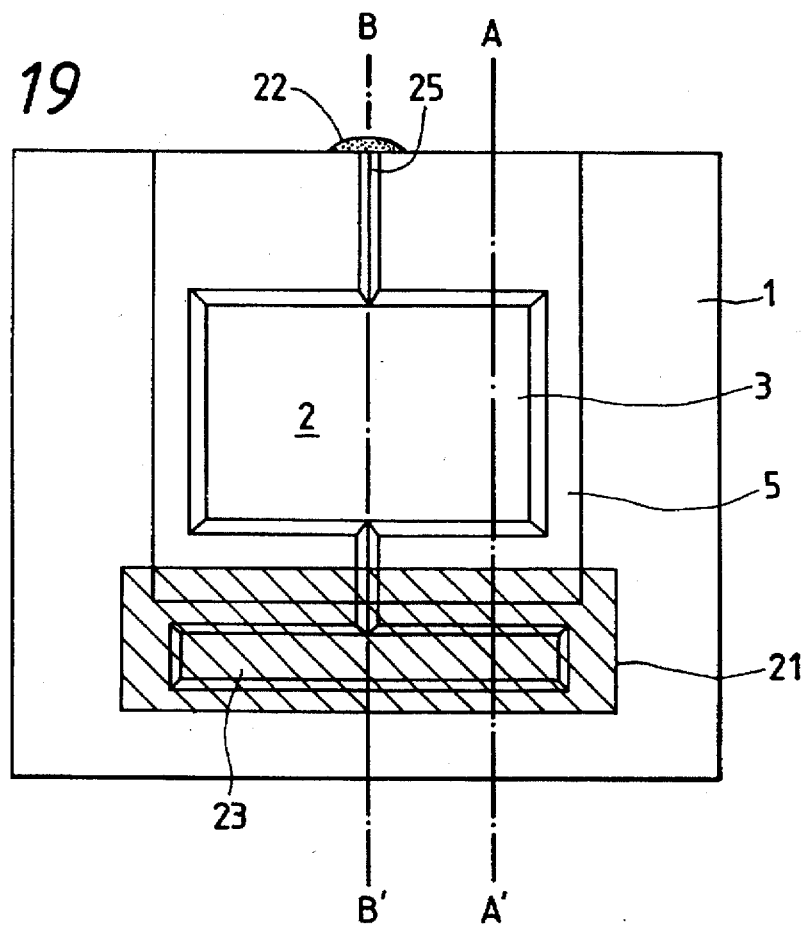
FIG. 19 is a typical view illustrating another liquid crystal display device of the present invention.
Figure 20A:
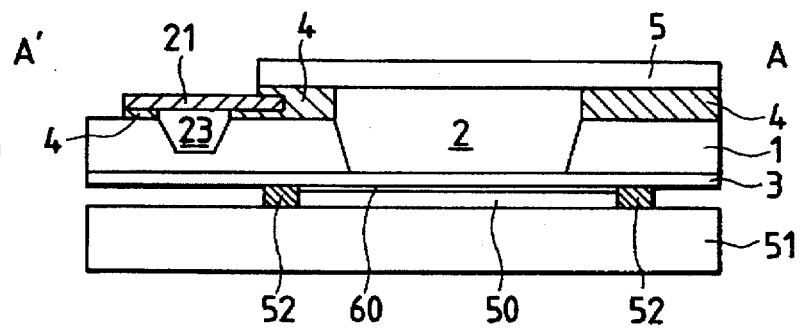
FIGS. 20A and 20B are typical cross-sectional views illustrating the liquid crystal display device of FIG. 19.
Figure 20B:
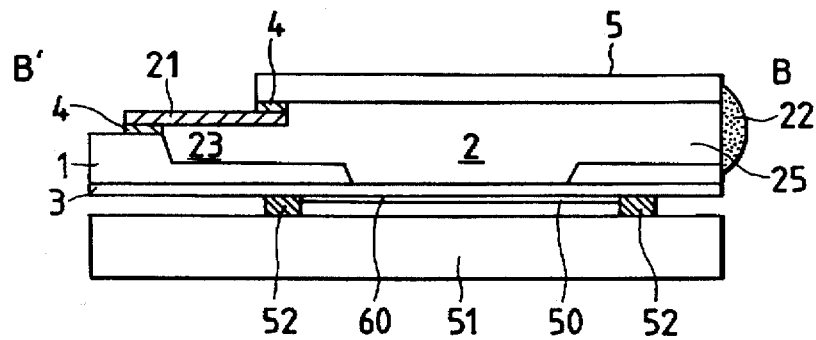

FIG. 19 is a plan view of a liquid crystal display device of this example. FIG. 20A is a cross-sectional view taken along the line A–A', and FIG. 20B is a cross-sectional view taken along the line B–B'. The liquid crystal display device of this example is a variant of the liquid crystal display device of the example 13. This example has a feature that the depth of hollow by etching the region 23 for absorbing potting material volume change and the depth of hollow by etching the passageway connecting the opening portion 2 to the region 20 for absorbing potting material volume change and the passageway connecting the opening portion 2 to the potting material inlet port 25 are shallower than that of the opening portion 2.

A formation method therefor will be described hereinafter. In hollowing out the opening portion 2, the region of shallower hollow other than the opening portion 2 is masked with a material having a masking effect against TMAH such as a Teflon tape or silicon resin. After the opening portion 2 is etched to a desired depth, the mask is removed, and the opening portion 2 is further etched until it reaches an insulating layer 3. In this manner, the above structure can be realized.

[Example 5]

Figure 21:
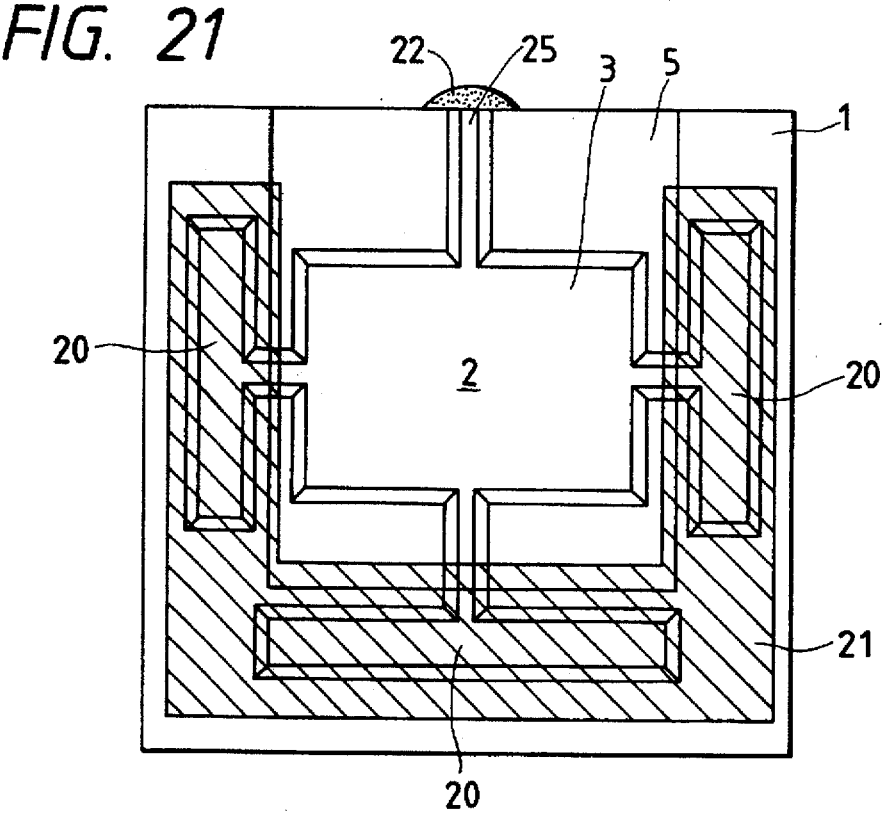
FIG. 21 is a typical plan view illustrating another liquid crystal display device of the present invention.

Reference is now made to FIG. 21. The feature of this example resides in that there are formed a plurality of regions 20 for absorbing potting material volume change. The depth of hollow for the region 20 for absorbing potting material volume change is equal to the depth of hollow for the opening portion 2. As a developed type of this example, a structure can be realized in which at least one of the plurality of regions 20 for absorbing potting material volume change is shallower than the depth of hollow for the opening portion 2.

[Example 6]

Figure 22:
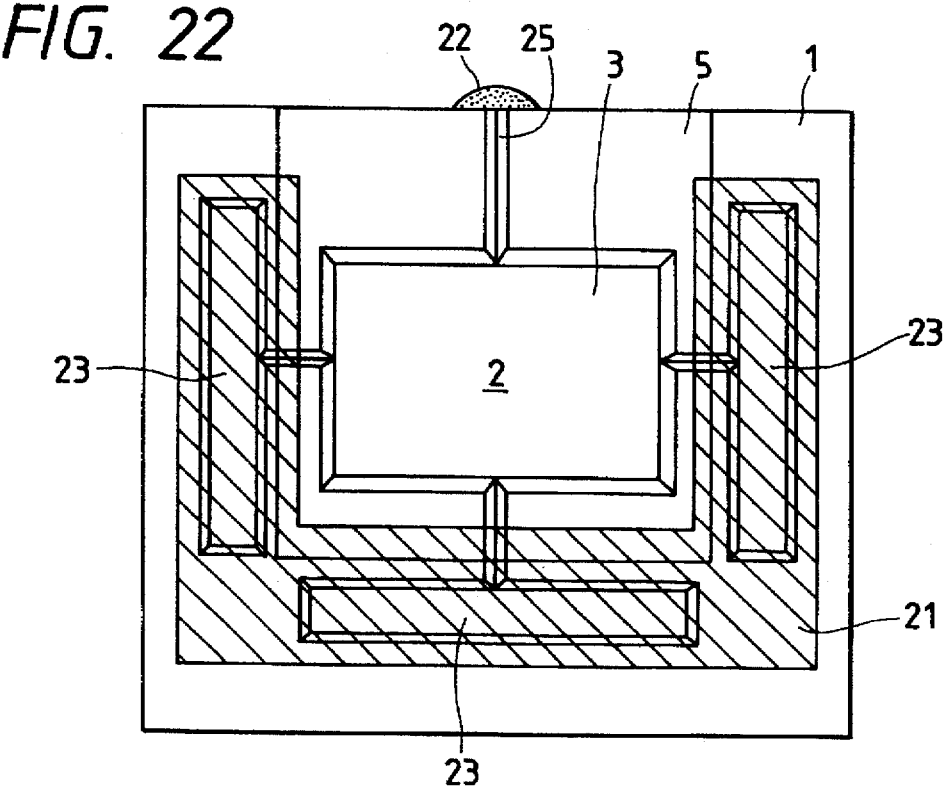
FIG. 22 is a typical plan view illustrating another liquid crystal display device of the present invention.

Reference is now made to FIG. 22. The feature of this example resides in that there are formed a plurality of regions 20 for absorbing potting material volume change which have a shallower hollow than the opening portion 2. There is also a possible structure in which the regions 23 for absorbing potting material volume change are all equal depth of hollow, or except for at least some hollows.

[Example 7]

Figure 23A:
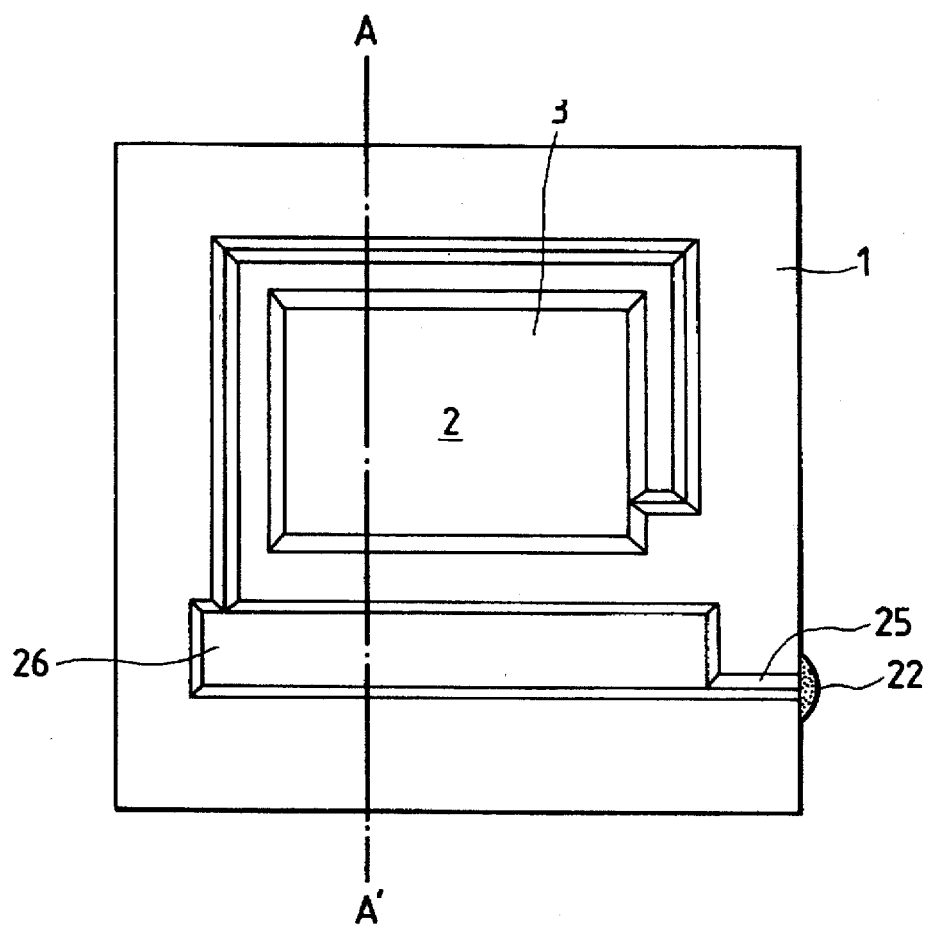
FIGS. 23A and 23B are typical views illustrating another liquid crystal display device of the present invention.
Figure 23B:
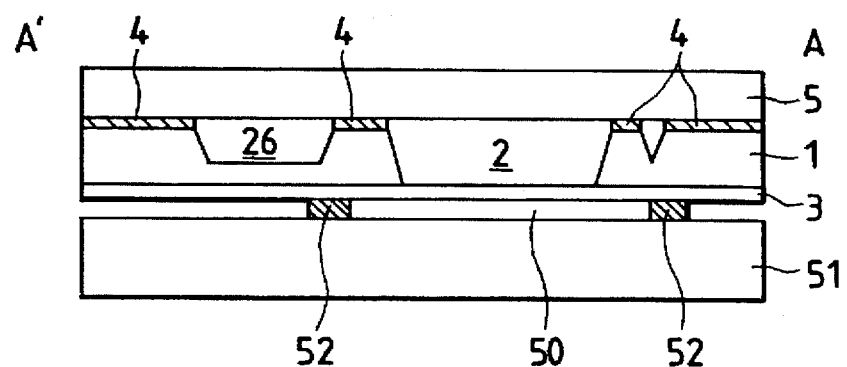

FIG. 23A is a plan view of a liquid crystal display device of this example, and FIG. 23B is a cross-sectional view taken along the line A–A'. The feature of this example resides in that there is provided a region 26 for absorbing potting material volume change which has a gas enclosed. The enclosed gas may occupy a part or a whole of the region 26 for absorbing potting material volume change. A forming method of the potting cell and an enclosing method of gas will be described below.

A potting cell is formed in such a way that after hollowing into a desired pattern by etching, a frame member 4 is applied around the hollow portion, and a glass plate 5 is placed thereon. After the potting material is transferred by the vacuum transfer method, the whole structure is heated up to about 100° C. in a desired gas atmosphere, and held for about one hour. Thereafter, it is gradually cooled down to room temperature, and the potting material inlet port 25 is sealed with a sealing material. Also, another sealing method is possible in which after the potting material is transferred, a vacuum is drawn again, a desired amount of potting material is extracted from within the cell, and a desired gas is leaked to restore the cell to an ordinary pressure, whereby the sealing is effected.

[Example 8]

Figure 24A:
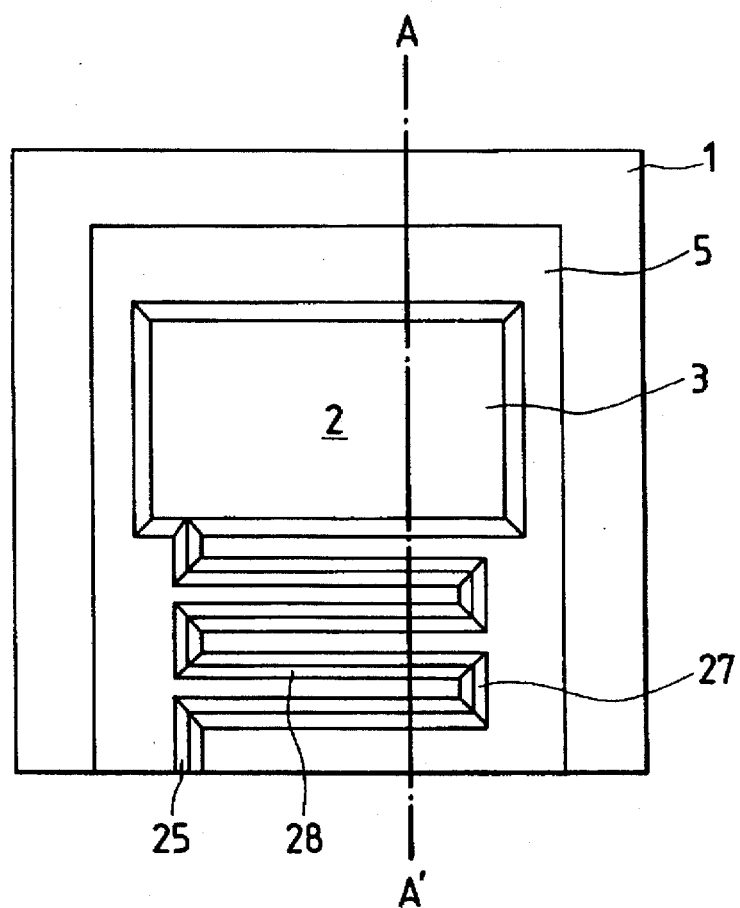
FIGS. 24A and 24B are typical views illustrating another liquid crystal display device of the present invention.
Figure 24B:
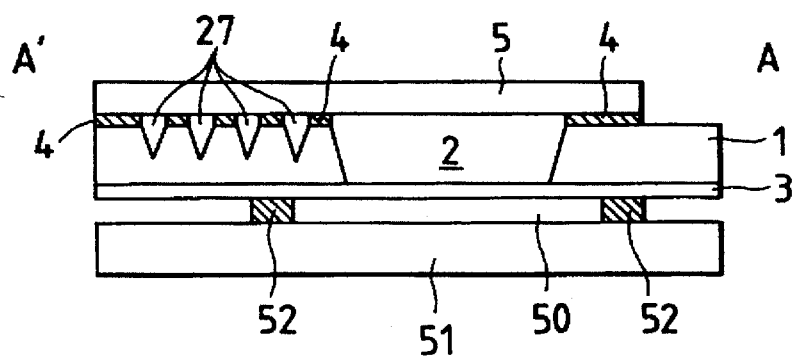

FIG. 24A is a plan view of a liquid crystal display device of this example, and FIG. 24B is a cross-sectional view taken along the line A–A'. The feature of this example resides in that the potting material inlet port 25 is sealed, the distance of a passageway 27 from the potting material inlet port 25 to the opening portion 2 is lengthened, with its cross section made smaller. The length 1 of a passageway 27 and its cross section S are defined as follows. First, the cross section S is 1 mm² or less. When the distance from the potting material inlet port 25 to a potting material liquid plane 28 under which the potting material is filled is $l_1$, $Sxl_1 > V_p(80°\ C.) - V_p(Room)$ $Sx(l-l_1) > V_p(Room) - V_p(-20°\ C.)$ Hence, $l_1 > (V_p(80°\ C.) - V_p(Room))/S$ $l > ((V_p(Room) - V_p(-20°\ C.))/S) + l_1$ Where $V_p(Room)$ is the volume of potting material transferred into the cell at room temperature, $V_p(80°\ C.)$ is the volume of the same potting material at 80° C., and $V_p(-20°\ C.)$ is the volume of the same potting material at -20° C. With this structure, the volume change of potting material with the environmental change can be absorbed by the potting material liquid plane 28 moving forward and backward within the passageway 27.

[Example 9]

Figure 25:
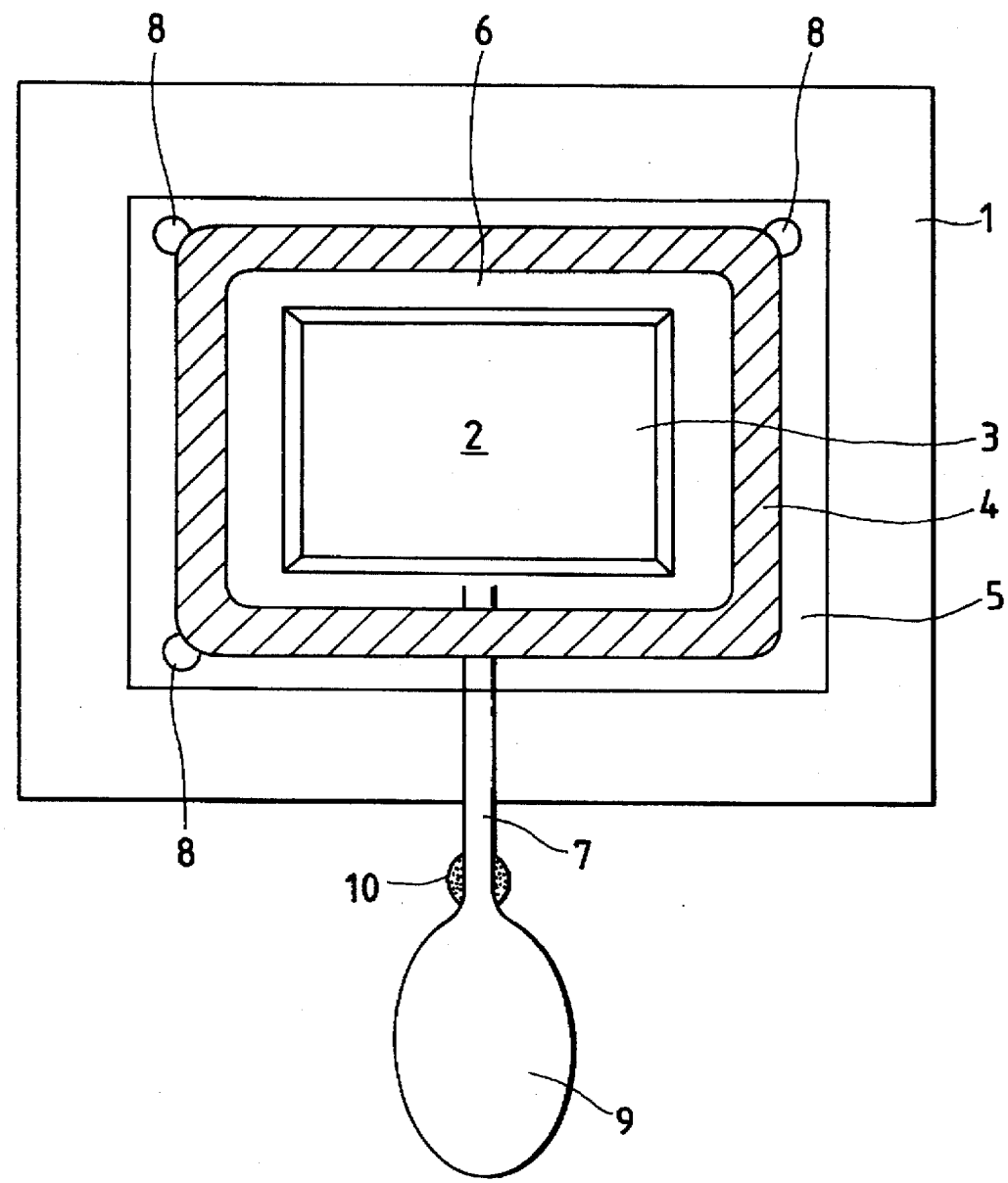
FIG. 25 is a typical view illustrating another liquid crystal display device of the present invention.

FIG. 25 is a typical view of a liquid crystal display device of this example. The feature of this example resides in that there is provided a rubber bag 9 for absorbing the potting material volume change at one tip of a needle 7. A forming method of the potting cell of this example will be described below.

A potting cell is formed in such a way that after the opening portion 2 is hollowed out by etching, a frame member 4 is formed, the needle 7 is installed to serve as a passageway between the inside and the outside of the frame member 4, and a glass plate 5 is placed thereon. In order to make the gap between the glass plate 5 and the Si substrate 1 uniform, a plurality of spacers 8 are disposed. The potting material is transferred to the end of the needle 7 outside the cell, and the rubber bag 9 entirely filled with the potting material is mounted to the end of the needle 7. The mounting portion is sealed with an epoxy type resin 10 curable at room temperature, and held at room temperature for the curing for twelve hours or more.

With this structure, the image display portion can be reinforced with potting material, resulting in the greater strength against the environmental changes. Also, it is possible to make a plurality of regions for absorbing potting material volume change comprised of the needle 7, the rubber bag 9 and the sealing member 10.

[Example 10]

Figure 26:
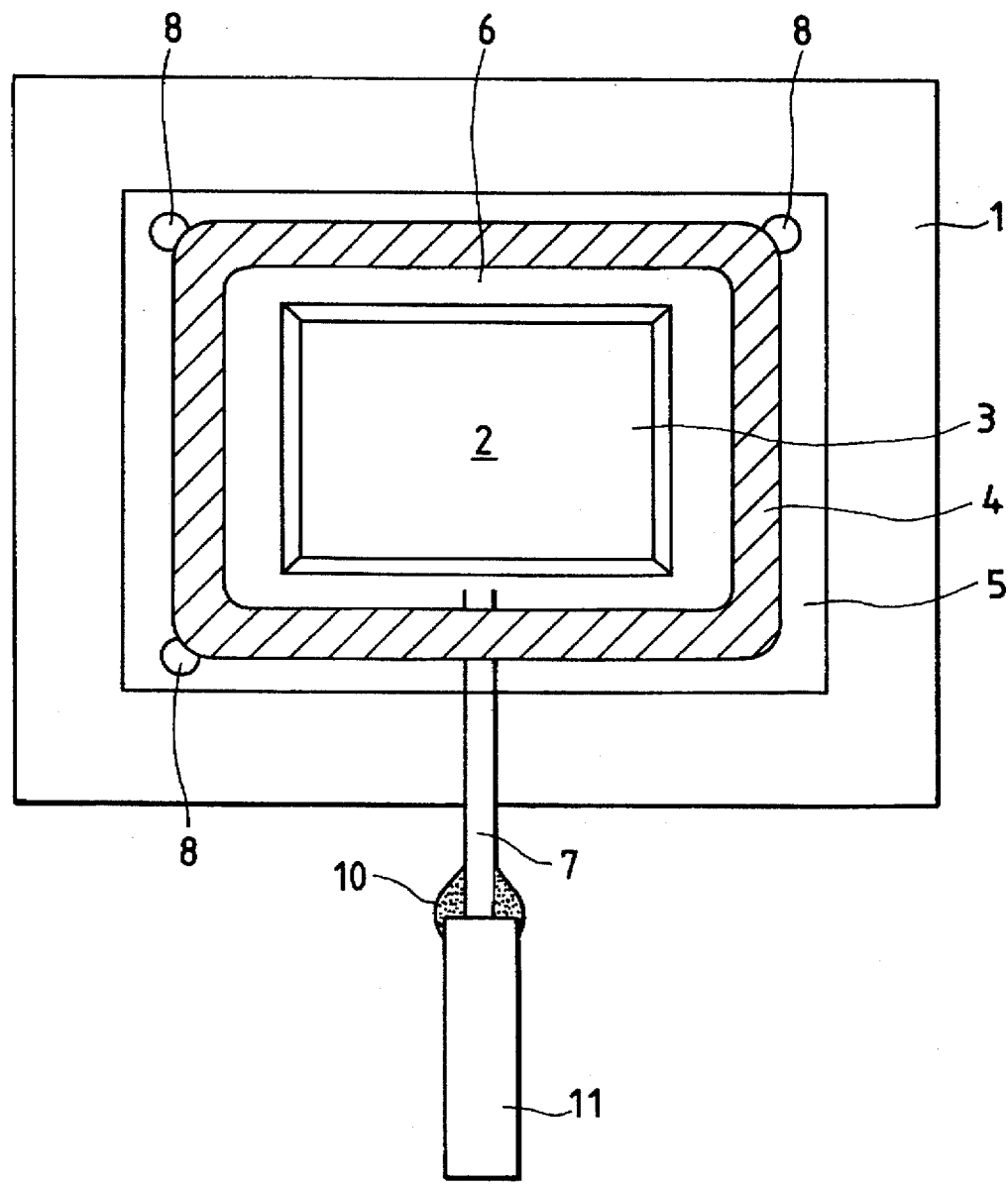
FIG. 26 is a typical view illustrating another liquid crystal display device of the present invention.

FIG. 26 is a typical view of a liquid crystal display device of this example. The feature of this example resides in that there is provided a flexible tube 11 made of vinylchloride. A forming method of the potting cell of this example will be described below.

A cell portion comprised of a frame member 4, a glass plate 5 and a spacer 8 is formed, and the tube 11 is attached to the end of needle 7 outside the cell, and sealed with a sealing member 10. Thereafter, the potting material is transferred in vacuum from another opening of the tube 11, the tube is then compressed to reduce the internal volume, and the inlet port is hermetically sealed by the use of a soldering iron. The internal volume V of tube and the volume V of deformed tube are defined as follows.

$V - V_1 > V_p(Room) - V_p(-20°\ C.)$ $V_1 > V_p(80°\ C.) - V_p(Room)$

Where $V_p(Room)$ is the total volume of potting material within the potting cell at room temperature, $V_p(-20°\ C.)$ is the volume of the same potting material at -20° C., and $V_p(80°\ C.)$ is the volume of the same potting material at 80° C. Herein, it is also possible to form a plurality of regions for absorbing potting material volume change comprised of the needle 7, the tube 11 and the sealing member 10.

[Example 11]

Figure 27:
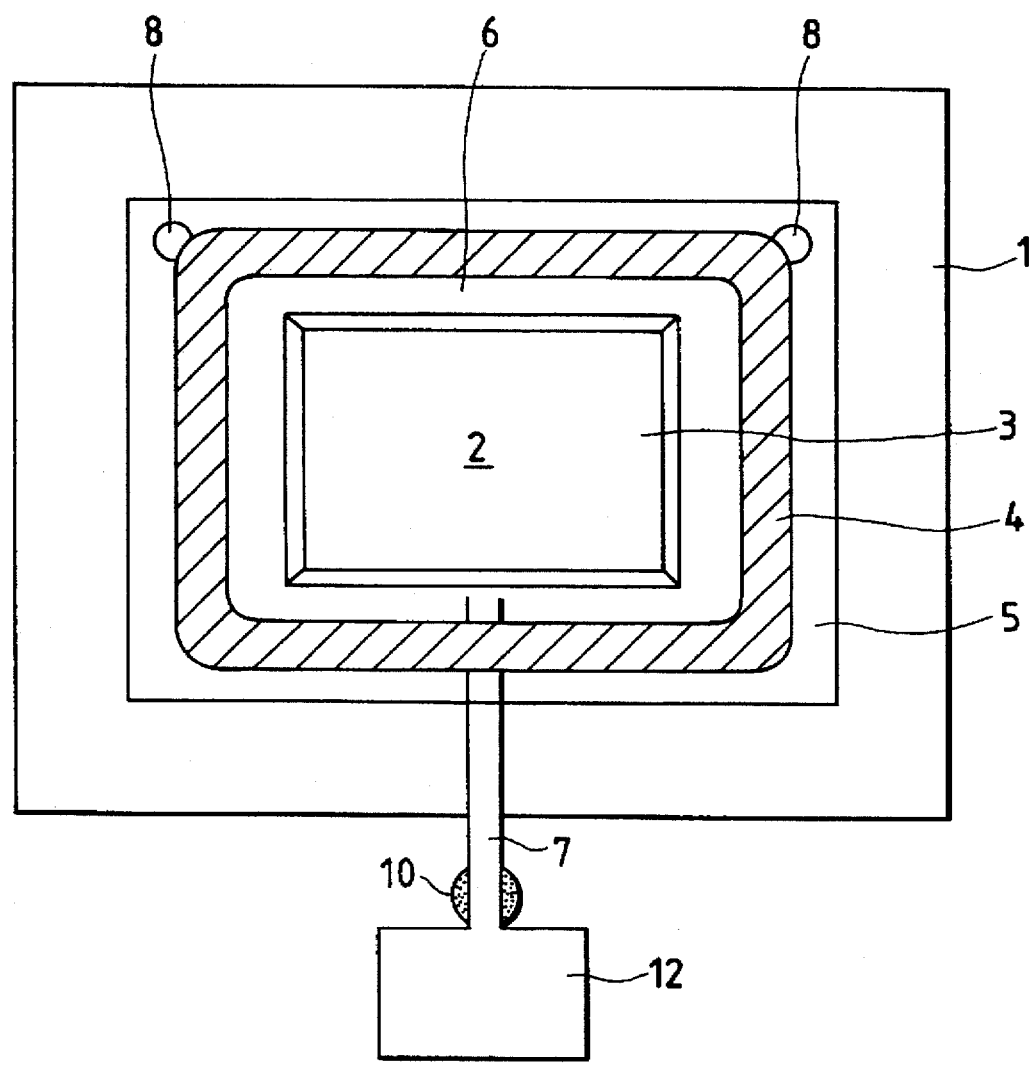
FIG. 27 is a typical plan view illustrating another liquid crystal display device of the present invention.

FIG. 27 is a typical view of a liquid crystal display device of this example. The feature of this example resides in that a gas is partially enclosed into a vessel 12. The volume $V_{GAS}$ of filler gas is defined as follows.

$$V_{GAS} > V_p(80°\text{ C.}) - V_p(\text{Room})$$

Where $V_p(\text{Room})$ is the total volume of potting material within the potting cell at room temperature, and $V_p(80°\text{ C.})$ is the volume of the same potting material at 80° C. The diameter of needle 7 is 0.5 mm or less. Herein, it is also possible to form a plurality of regions for absorbing potting material volume change comprised of the needle 7, the vessel 12 and the sealing member 10.

[Example 12]

Figure 28:
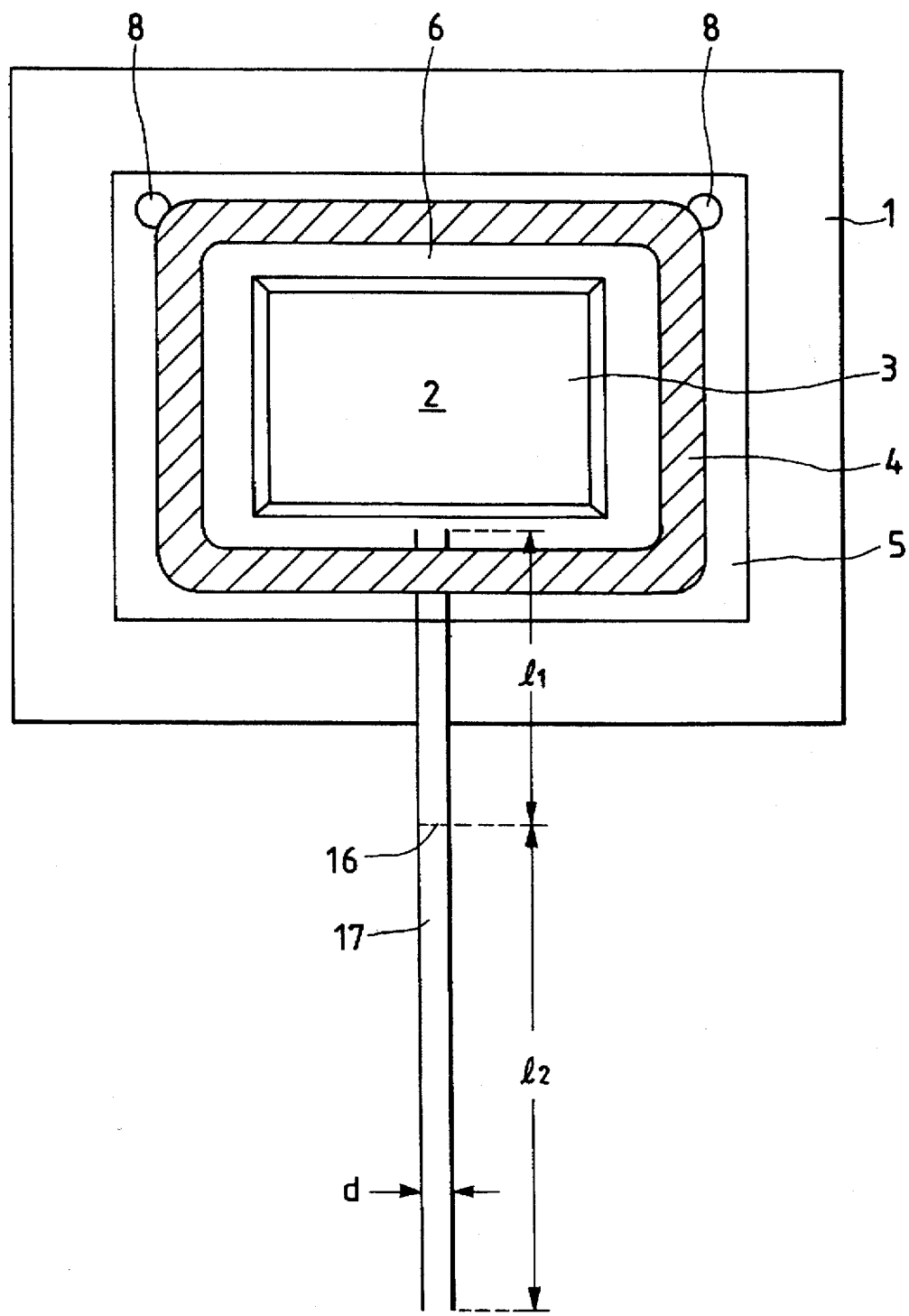
FIG. 28 is a typical plan view illustrating another liquid crystal display device of the present invention.

FIG. 28 is a typical view of a liquid crystal display device of this example. The feature of this example resides in that a needle 7 having an open end is provided. The diameter d of the needle 7 and the length 1 of the needle 7 are defined as follows.

d is 0.5 mm or less. When the distance from one end of the needle 7 within the potting cell to the potting material liquid plane 16 is $l_1$ and the distance from the potting material liquid plane 16 to the other end of the needle 7 is $l_2$, $$d \cdot l_1 > V_p(\text{Room}) - V_p(-20°\text{ C.})$$
$$d \cdot l_1 > V_p(80°\text{ C.}) - V_p(\text{Room})$$
$$l = l_1 + l_2$$

Where $V_p(\text{Room})$ is the total volume of potting material within the cell at room temperature, $V_p(80°\text{ C.})$ is the volume of the same potting material at 80° C., and $V_p(-20°\text{ C.})$ is the volume of the same potting material at $-20°$ C. The potting material liquid plane 16 is set by filling the potting material up to the end of the needle 7 outside the cell, holding the cell at 80° C. or higher for one hour, and then gradually cooling the cell. Or there is likewise a method in which the potting material is filled to the end of the needle 7, and a desired potting material is extracted out of the cell by drawing a vacuum. A plurality of needles 7 can be set, and when the number is n, the length of respective needle 7 is 1/n that of 1.

[Example 13]

Figure 29:
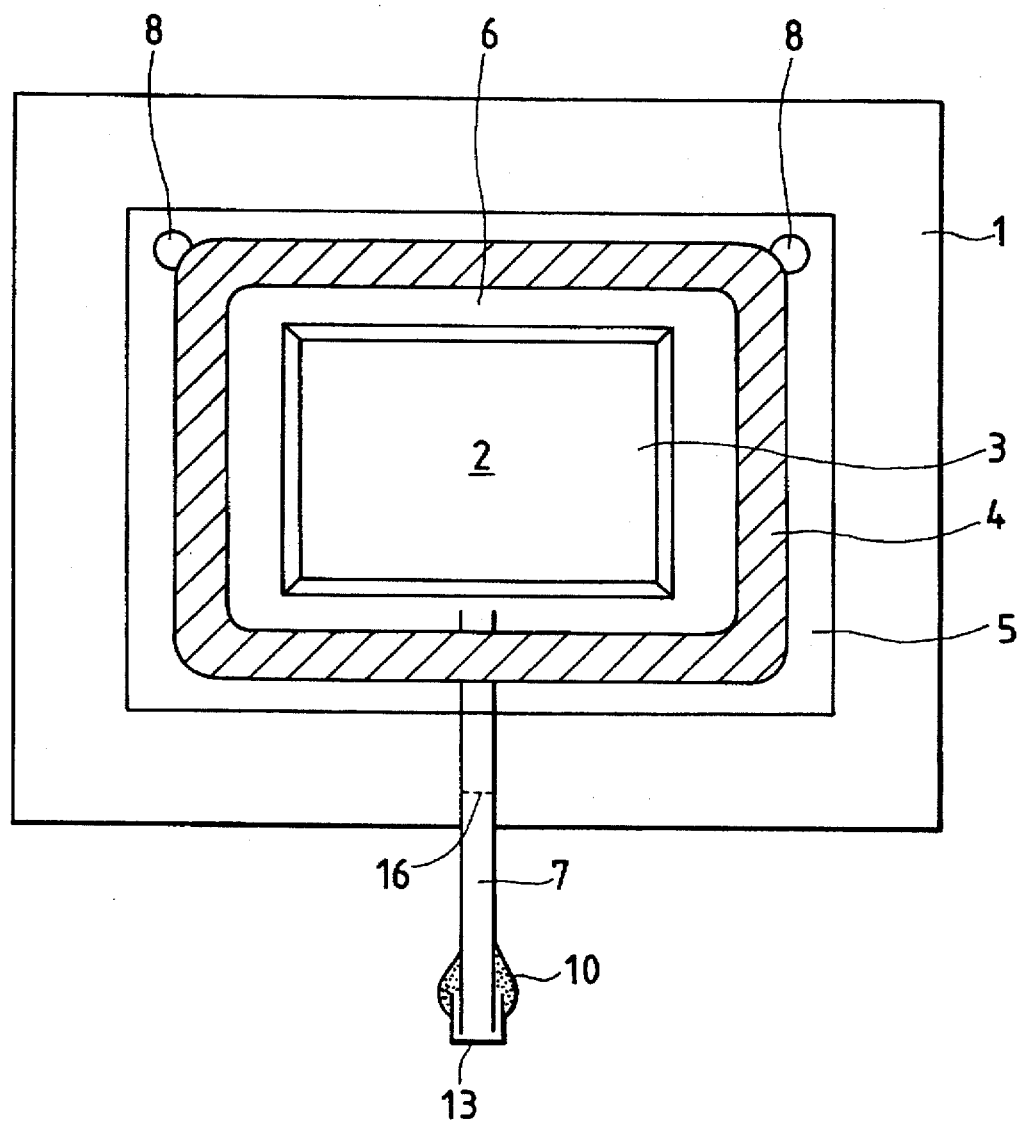
FIG. 29 is a typical plan view illustrating another liquid crystal display device of the present invention.

FIG. 29 is a typical view of a liquid crystal display device of this example. The feature of this example resides in that a film 13 such as Goatex which can transmit the gas but not the liquid is provided. The length of the needle 7 is the same as defined in the example 12. The film 13 is attached after transferring the potting material and setting a desired potting material liquid plane 16, and sealed with a sealing material. Herein, it is also possible to form a plurality of regions for absorbing potting material volume change comprised of the needle 7, the film 13 and the sealing material 10.

[Example 14]

Figure 30:
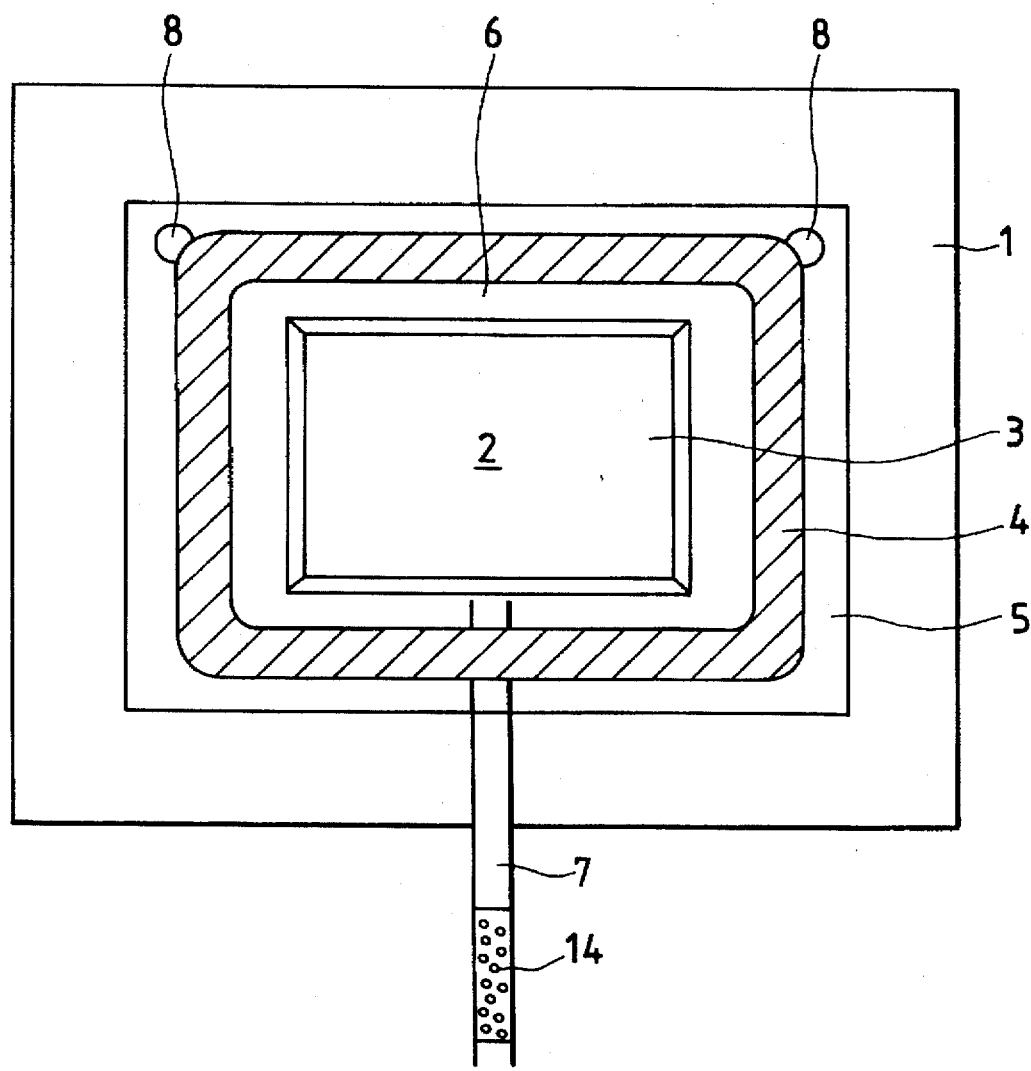
FIG. 30 is a typical plan view illustrating another liquid crystal display device of the present invention.

FIG. 30 is a typical view of a liquid crystal display device of this example. The feature of this example resides in that a padding 14 such as a sponge is provided in the needle 7. The length of the needle 7 is the same as defined in the example 12. Herein, it is also possible to form a plurality of regions for absorbing potting material volume change comprised of the needle 7, the padding 14 and the sealing material 10.

[Example 15]

Figure 31:
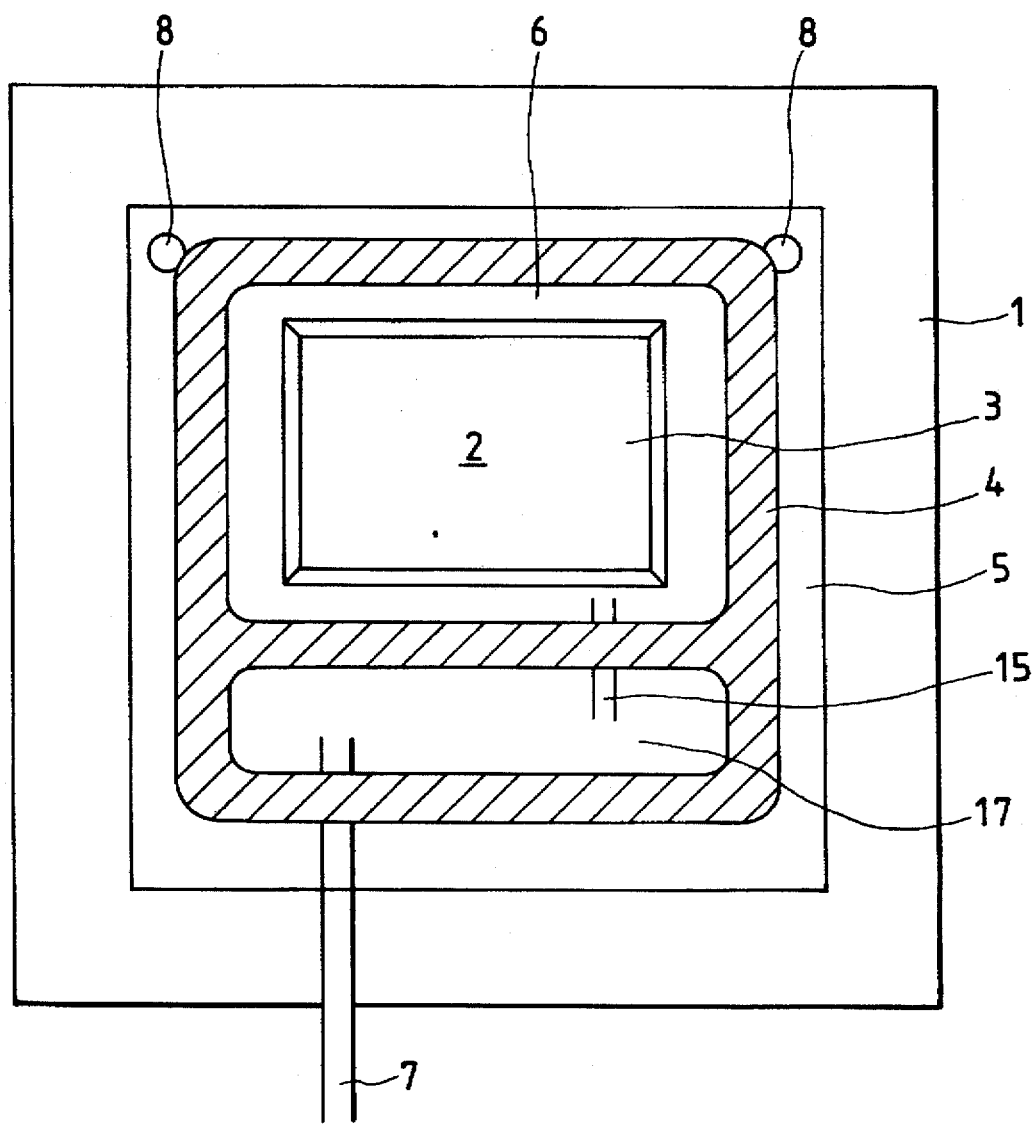
FIG. 31 is a typical plan view illustrating another liquid crystal display device of the present invention.

FIG. 31 is a typical view of a liquid crystal display device of this example. The feature of this example resides in that a bubble reservoir region 17 isolated from the opening portion 2 via the frame member 4 and connected through a needle 15 is formed. The diameter of the needle 15 is smaller than that of the needle 7. By providing the bubble reservoir region 17, bubbles are prevented from entering the opening portion 2 even if bubbles are passed through the needle 7. Herein, it is possible to provide a plurality of portions comprised of the needle 15, the needle 7 and the bubble reservoir region 17 around the opening portion 2.

[Example 16]

Figure 32A:
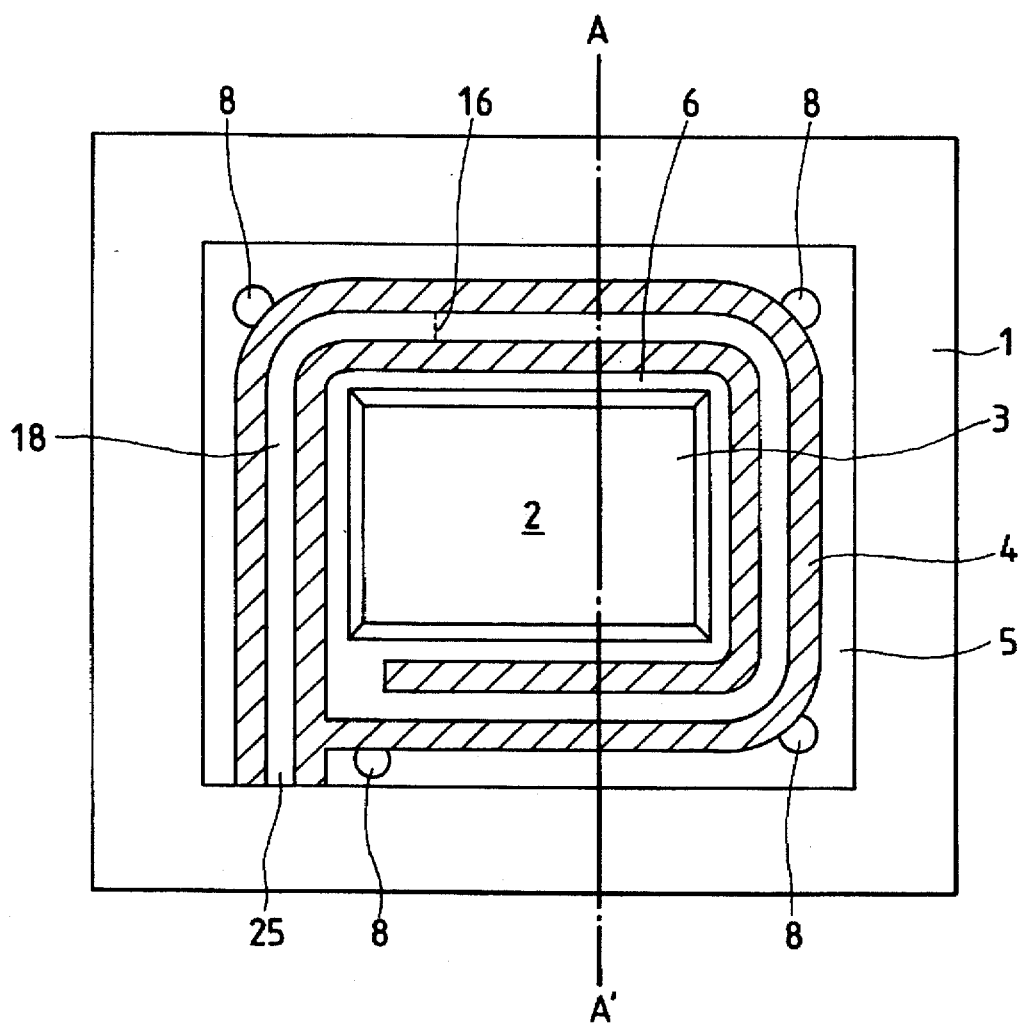
FIGS. 32A and 32B are typical views illustrating another liquid crystal display device of the present invention.
Figure 32B:
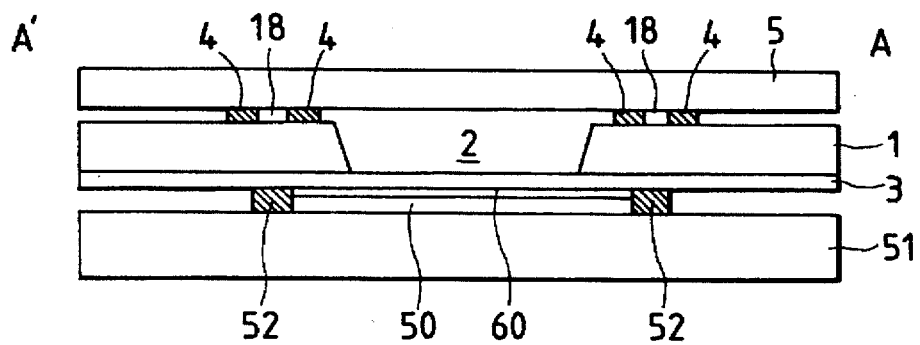

FIG. 32A is a plan view of this example and FIG. 32B is a cross-sectional view taken along the line A–A'. The feature of this example resides in that a passageway 18 for the potting material is formed by means of a frame member 4.

A potting cell is made by forming the frame member 4 into a desired pattern and placing a glass plate 5 thereon. Spacers 8 are provided to make uniform the gap between the glass plate 5 and an Si substrate 1. The diameter of spacers 8 is 0.5 mm or less. The length $l_5$ of the passageway 18 from opening portion 2 to potting material inlet port 25 is defined as follows.

When the width of passageway 18 is W, the height is h (which is equal to the diameter of spacer 8), the length of passageway 18 from the potting material inlet port 25 to the potting material liquid plane 16 is $l_6$, and the length of passageway 18 from the potting material liquid plane 16 to the opening portion 2 is $l_7$, $$l_6 \cdot W \cdot h > V_p(80°\text{ C.}) - V_p(\text{Room})$$
$$l_7 \cdot W \cdot h > V_p(\text{Room}) - V_p(-20°\text{ C.})$$

Hence, $$l_6 > (V_p(80°\text{ C.}) - V_p(\text{Room}))/W \cdot h$$
$$l_7 > (V_p(\text{Room}) - V_p(-20°\text{ C.}))/W \cdot h$$
$$l_5 = l_6 + l_7$$

The passageway 18 may consists of a plurality of passageways which are independent of one another. When n passageways in total are formed, the length of each passageway is 1/n that of $l_5$.

[Example 17]

Figure 33:
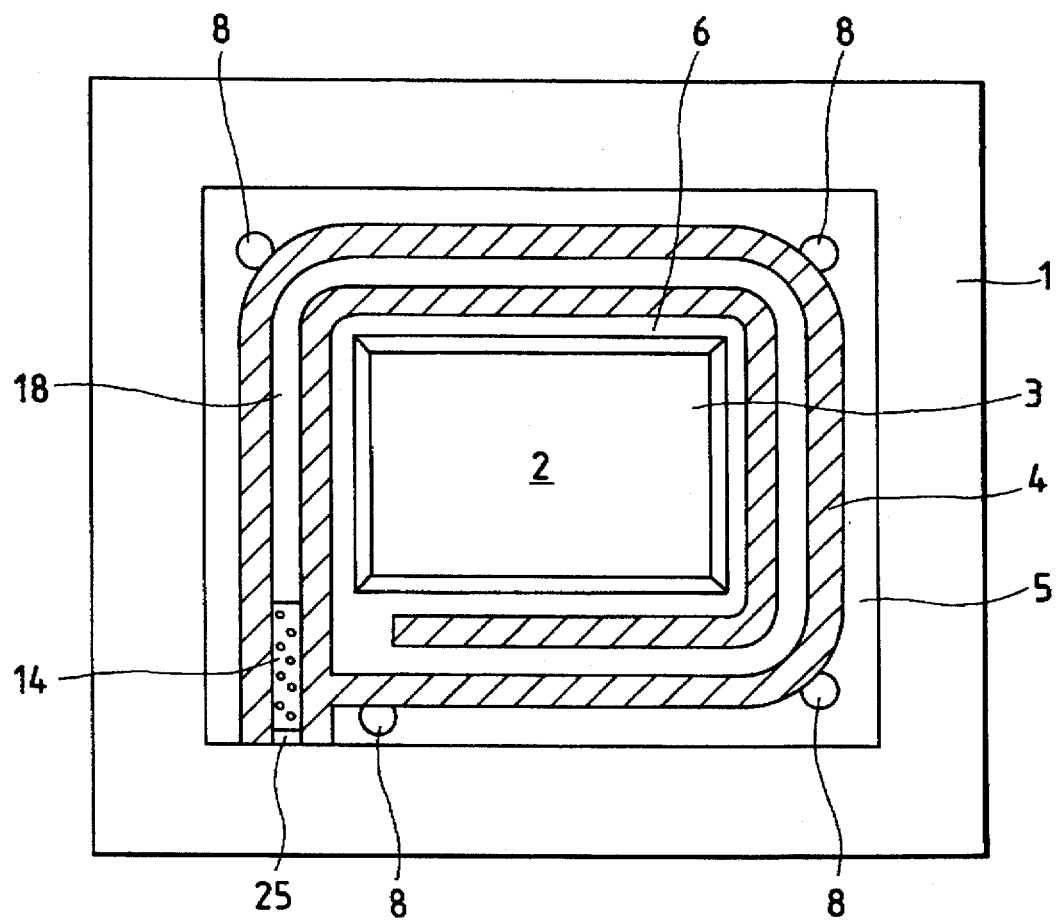
FIG. 33 is a typical plan view illustrating another liquid crystal display device of the present invention.

FIG. 33 is a typical view of a liquid crystal display device of this example. The feature of this example resides in that a padding 14 such as a sponge is provided in the passageway 18 inside the potting material inlet port 25. The length and height of the passageway 18 are the same as defined in the example 14. Herein, it is also possible to form a plurality of passageways 18 and a plurality of paddings 14 which are independent of one another.

[Example 18]

Figure 34:
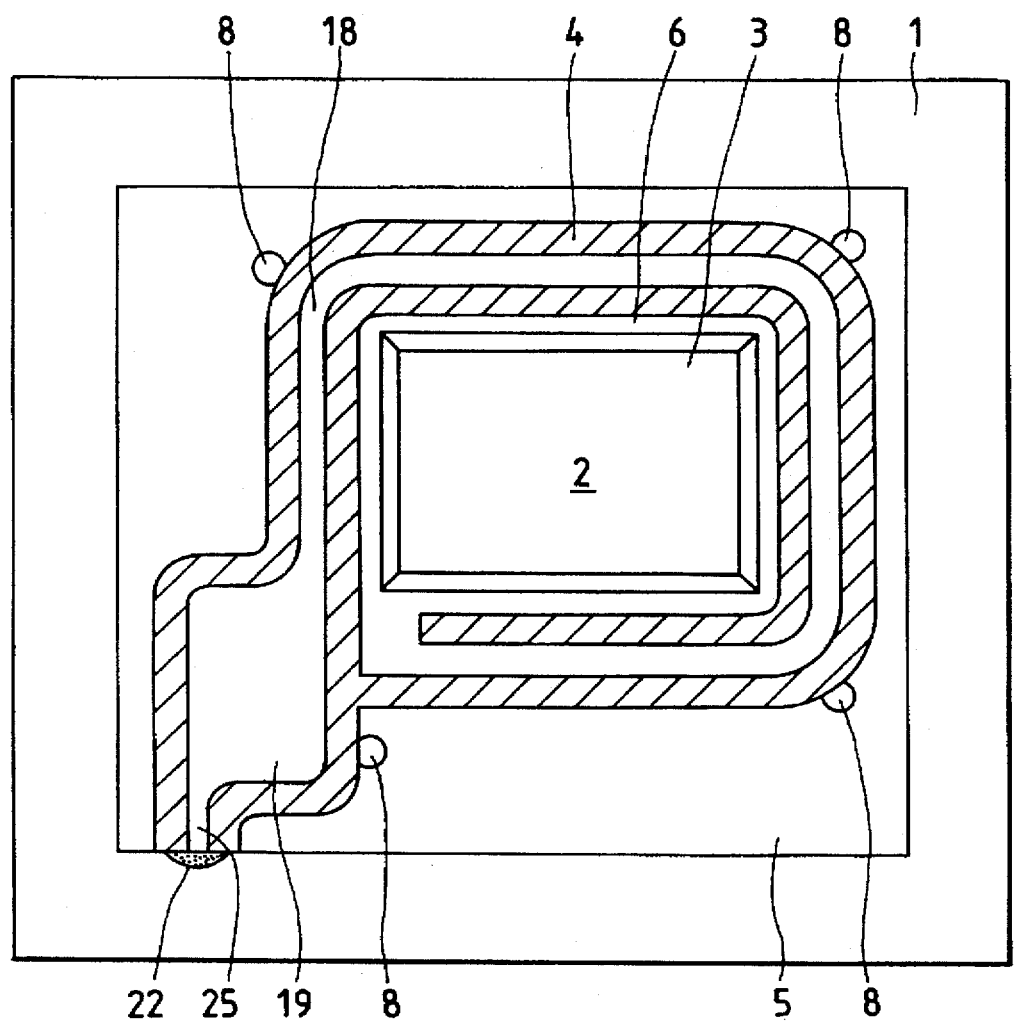
FIG. 34 is a typical plan view illustrating another liquid crystal display device of the present invention.

FIG. 34 is a typical view of a liquid crystal display device of this example. The feature of this example resides in that the region for absorbing potting material volume change is formed to enclose the gas therein.

A gas is introduced into a gas enclosing region 19 in such a manner that after the potting material is transferred through the potting material inlet port 25, the cell is held in a gas atmosphere at a temperature of 90° C. or greater for one hour, and gradually cooled, or that the cell is evacuated to extract a desired volume of potting material and a desired gas is leaked to restore the cell to an ordinary pressure. Then, the inlet port 25 is sealed with a sealing material 22 to form a potting cell. Herein, it is also possible to form a plurality of regions for absorbing potting material volume change comprised of the passageway 18 and the gas enclosing region 19.

As described in the above examples, a liquid crystal display device is realized having a liquid crystal material in one of the intervals between two substrates and a thin film layer provided with liquid crystal driving elements carried therebetween, wherein 1. a flowable material is filled in the other interval between the thin film layer and the substrate,
2. a region is provided for absorbing the flowable material volume change with variation in temperature or atmospheric pressure, and
3. a passageway connecting the image display region to the external air is provided, whereby the liquid crystal display device has not only enhanced durability and reliability but also is effective for the higher image quality.

[Example 19]

Figure 36:
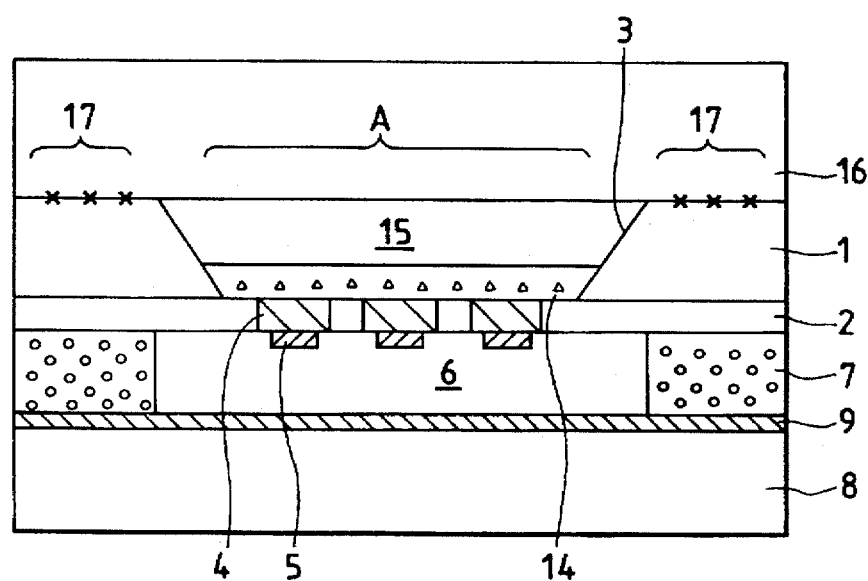
FIG. 36 is a typical cross-sectional view illustrating another liquid crystal cell of the present invention.

FIG. 36 is a cross-sectional view of a liquid crystal cell of this example. This liquid crystal display device has a hollow-type package structure that a thin film 2 is formed using a semiconductor substrate 1 and one electrode 5 is disposed on the surface of thin film, wherein a resin 14 having a thickness equal to or less than a certain value is laminated on the surface of the thin film 2, and an inert gas 15 is filled in remaining thickness portion.

Figure 39A:
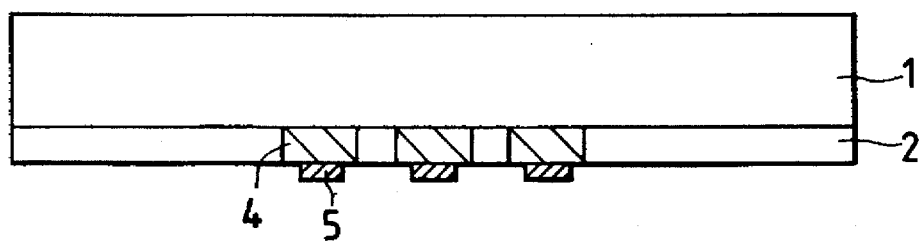
FIGS. 39A to 39C are typical views showing a manufacturing process of the liquid crystal cell of FIG. 36.
Figure 39B:
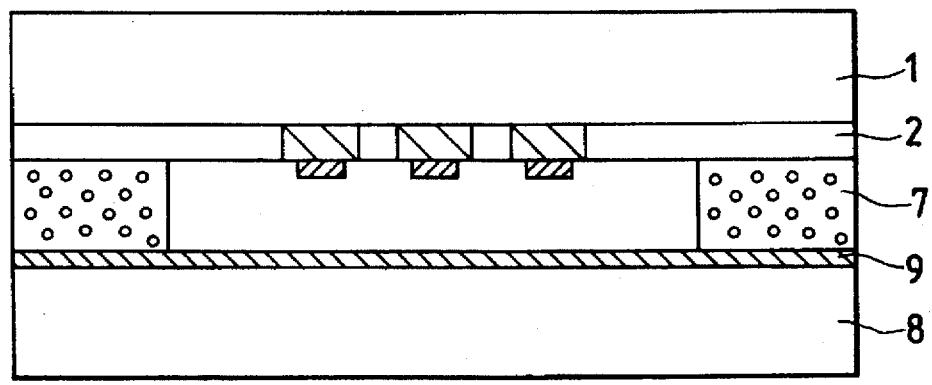
Figure 39C:
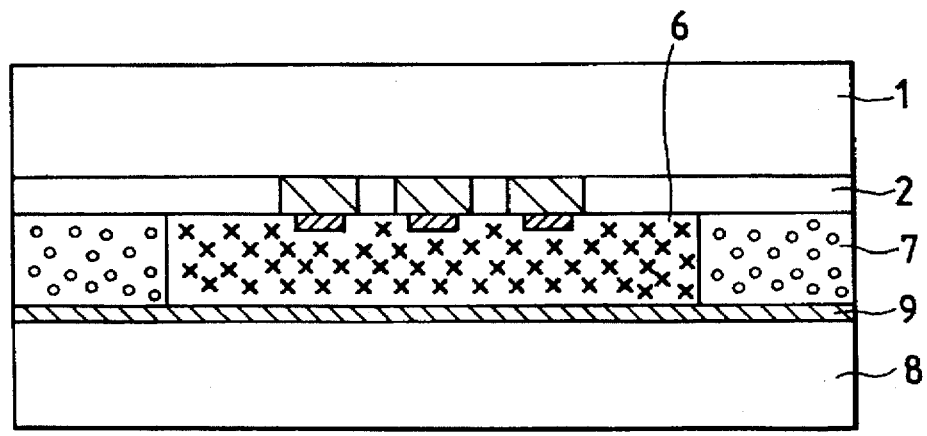

A manufacturing procedure will be described below with reference to FIGS. 39A to 40C. In FIG. 39A, 1 is a substrate having single crystal silicon as the main component which is an SOI substrate or semiconductor substrate, wherein a thin film 2 is formed on the substrate 1. The thin film 2 is comprised of an insulating layer and an active layer of the SOI substrate 1, and a deposited layer formed by the postprocess, within which thin film 2 are formed driving elements 4 and electrodes 5 for driving the liquid crystal. Then, a glass substrate 8 having an opposed electrode 9 is bonded by a seal member 7 (FIG. 39B), and thereafter sealed by transferring a liquid crystal 6 into the gap between both substrates by a well-known method (FIG. 39C).

Figure 40A:
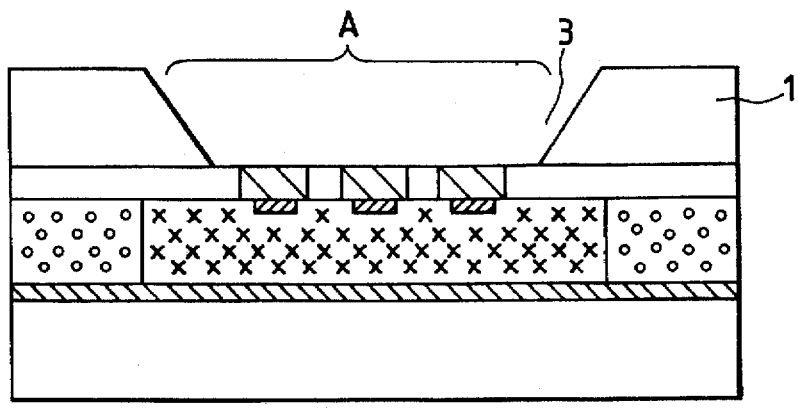
FIGS. 40A to 40C are typical views showing another manufacturing process of the liquid crystal cell of FIG. 36.
Figure 40B:
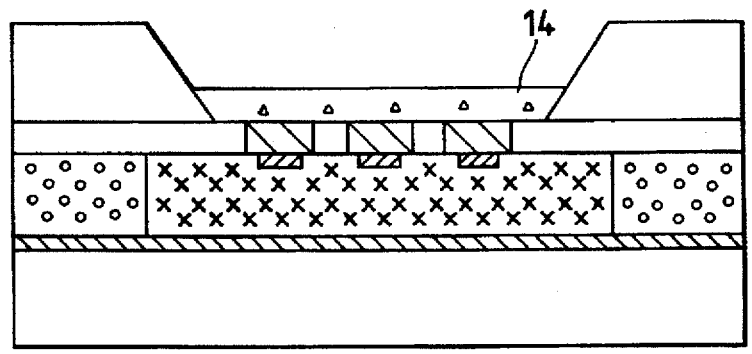

A liquid crystal display portion A is necessary to be transparent, and therefore a single crystal silicon portion of the SOI substrate is removed by anisotropical etching with an alkaline etching solution until the thin film portion 2 is exposed to provide a bored portion 3 (FIG. 40A). Thereafter, transparent potting resin 14 is provided in the bored portion 3 in a desired thickness for the reinforcement (FIG. 40B).

The potting resin 14 may be a gel-type silicon resin such as KJR-9010 made by The Shin-Etsu Chemical Co., Ltd., for example. As the curing agent, multiple micropellets are dropped in the bored portion 3 to have a thickness of about 60 μm after mixing and vacuum degassing. This is because it is necessary to evenly spread a resin liquid of relatively high viscosity over the large area in this example.

Figure 40C:
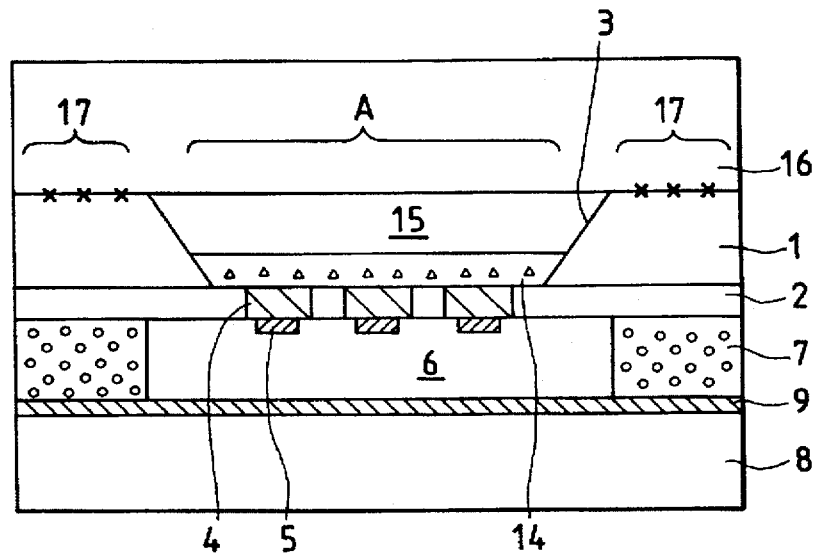
Figure 41:
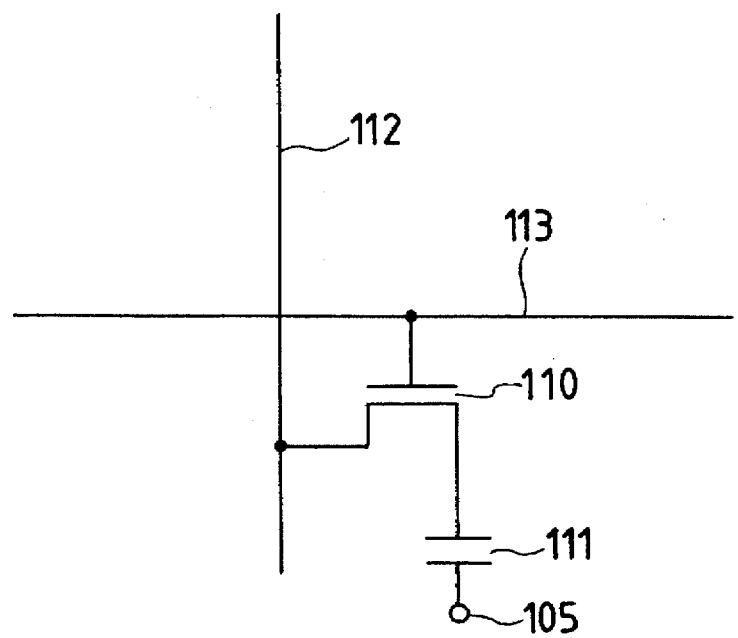
FIG. 41 is an equivalent circuit diagram of a picture element for use in the liquid crystal display device of the present invention.

Thereafter, it is left alone for several days at temperatures near +50° C. which is a practical use temperature for the liquid crystal cell to effect curing. Thereafter, it is bonded with the glass plate 16 in the atmosphere of dry air or dry nitrogen of the semiconductor grade not containing water (FIG. 40C). The adhesive for use may be a UV curable resin usable at the practical use temperatures (epoxy type, unsaturated polyester type, acrylate type, thiol type, salt type) or an instantaneous adhesive of two liquid mixture type. 17 is an adhesive portion.

Thereby, a hollow-type package containing an inert gas in the inside 15 is completed, as shown in FIG. 36.

In this example, the film thickness of the potting resin is as thin as about 60 μm, so that the thermal stress exerted on the thin film 2 can be minimum. Accordingly, no flexure of the thin film 2 occurs, with no locational difference in the gap amount of liquid crystal 6. Also, since the thermal stress exerted on the thin film is small, the driving elements 4 on the thin film undergo only a small thermal stress, so that the variation in characteristic is minimum, and there is no change in the display quality of the liquid crystal.

Also, since the potting resin 14 and the inert gas 15 are of the semiconductor grade, no variation in characteristic for the driving elements 14 occurs due to the mixture of mobile ions. Likewise, there is no risk that water contents may be mixed because of the use of the hollow package of sealed type.

Also, the optical characteristic is substantially ideal because the resin face is smooth and the glass plate is used for the reason as previously described.

A variation of this example which involves improving the method for making a homogeneous resin thin film will be presented below.

First, to facilitate the dropping of liquid, the viscosity of liquid must be lowered, for which it is effective to raise the liquid temperature and reduce the mixture ratio of curing agent. Also, the silicon resin has excellent wettability with respect to silicon and thermal oxide film, but when the bad member is used peripherally, it is necessary to enhance the wettability by washing, vapor treatment or plasma treatment.

Also, in order to spread the dropped liquid more evenly, means of inclining, oscillating or vibrating the cell can be effectively used.

With this example, the resin thin film which is further flat can be obtained.

For the inert gas 15, rare gases such as helium, neon, and argon can be used, because these gases are most stable and used in smaller amount, with only slight increase of the costs for the liquid crystal cell.

The bonding with the glass plate can be made at the highest temperature where the quality of the liquid crystal cell is not degraded, because there is typically a tendency that adhesives usable at low temperature are inferior in the adhesive strength, sealability and reliability. Adhesives usable at high temperature may include a thermosetting epoxy resin. It is effective, from the aspect of not giving rise to any excess pressure, that in effecting bonding, the inert gas in the atmosphere is set at a slightly higher pressure, and when cooled down to the practical use temperature, the filled gas is caused to indicate just one atmospheric pressure.

Also, the adhesion with the glass plate can be made by anodic bonding which requires no adhesive. The anodic bonding is required to be made at high temperature and high pressure due to insufficient investigation concerning its principle in the state of the art, but is a technique promising in the future because the complete intimate adhesion is assured without essentially requiring any excess member.

A pore for adjusting the pressure of gas in the hollow package can be provided in the glass plate. However, it is to be noted herein that with such structure, the internal pressure of gas may fluctuate due to temperature variation outside, and although the effect of pressing on the thin film is eliminated, the clean gas once filled may escape to the outside, causing some degrade in the image quality.

Figure 37:
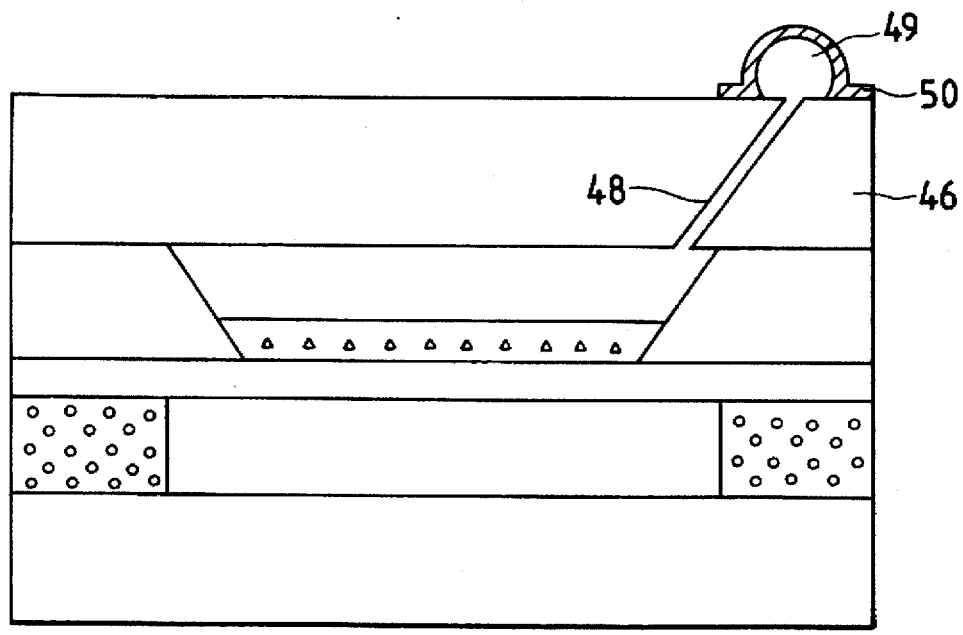
FIG. 37 is a typical cross-sectional view illustrating another liquid crystal cell of the present invention.

Thus, as a further variation, a space 49 for adjusting the volume can be further provided outward of the pore 48 provided on the glass plate 46, as shown in FIG. 37. The space 49 can be readily constructed by attaching a rubber thin film 50 which is easily deformable with the pressure over the pore.

In this example, the liquid level may rise more or less depending on the value of contact angle at which the material such as silicon forming the peripheral wall face makes contact with the resin. In this case, the provision of somewhat smaller liquid crystal display plane accounting for the fluctuation of the liquid level may be necessary from the viewpoint of obtaining the uniform display plane.

This example is not specifically limited to liquid crystal display devices formed by using SOI substrate having single crystal silicon as the main component, but can be readily applied to polysilicon TFTs on the oxide film formed on the single crystal silicon substrate, for example. In this case, the portion corresponding to the thin film is an upper structure of the oxide film, the polysilicon film and other TFTs.

Also, this example can be readily applied to semiconductor substrates other than silicon.

The etching method of removing the silicon for the transparency can be also carried out by isotropic etching. Also, the driving element formed on the thin film is not TFT for use in the active matrix but may be only an electrode of simple matrix.

Also, the method for forming resin on the thin film is only necessary to be capable of forming a thin resin layer, and may be any of atmospheric deposition, vacuum deposition, CVD, plasma deposition, and spin-on method.

The thickness of resin formed is desirable to vary adequately with the Young's modulus. The thin film is spread with a tension of approximately $1\times10^8$ dyne/cm$^2$, so that the permissible stress for the resin is substantially the same amount. Since the internal stress exerted on typical resin package type ICs is said to be equal to roughly 100 MPa ($1\times10^9$ dyne/cm$^2$), the value can be fully accomplished by reducing the thickness of resin film.

The member in the hollow-type package for use with the present invention is not specifically limited to the glass plate, but may be sufficient with any member which is transparent to the light, such as a plastic plate.

Figure 38:
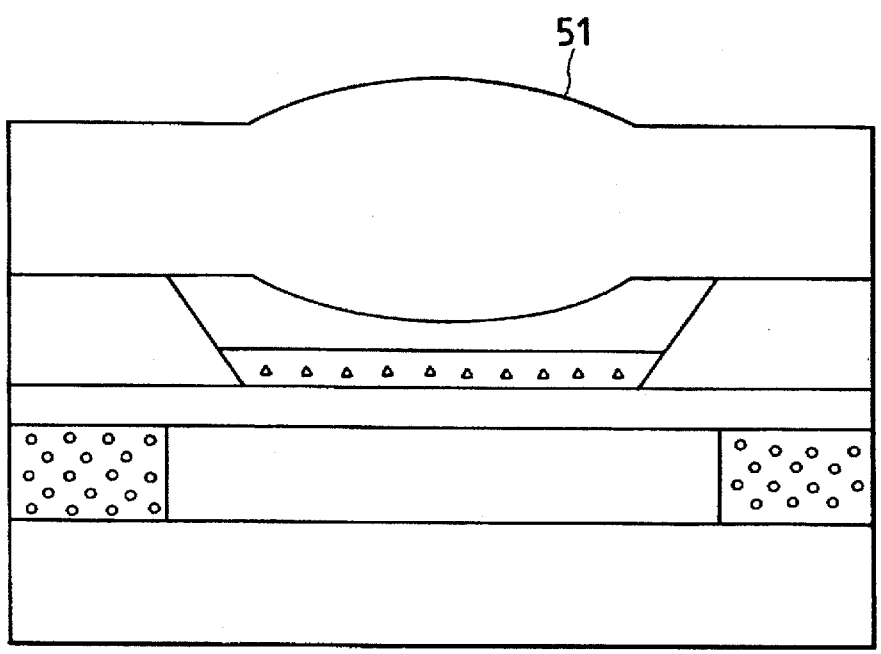
FIG. 38 is a typical cross-sectional view illustrating another liquid crystal cell of the present invention.

As a variation of this example, an optical element such as a lens 51 may be incorporated into the hollow-type package, as shown in FIG. 38. Thereby, the illumination system for use in the liquid crystal cell or the optical system on the visual field side can be simplified, resulting in smaller apparatus and lower costs.

It should be noted that two or more layers of potting resin 14 can be provided.

[Example 20]

Figure 42:
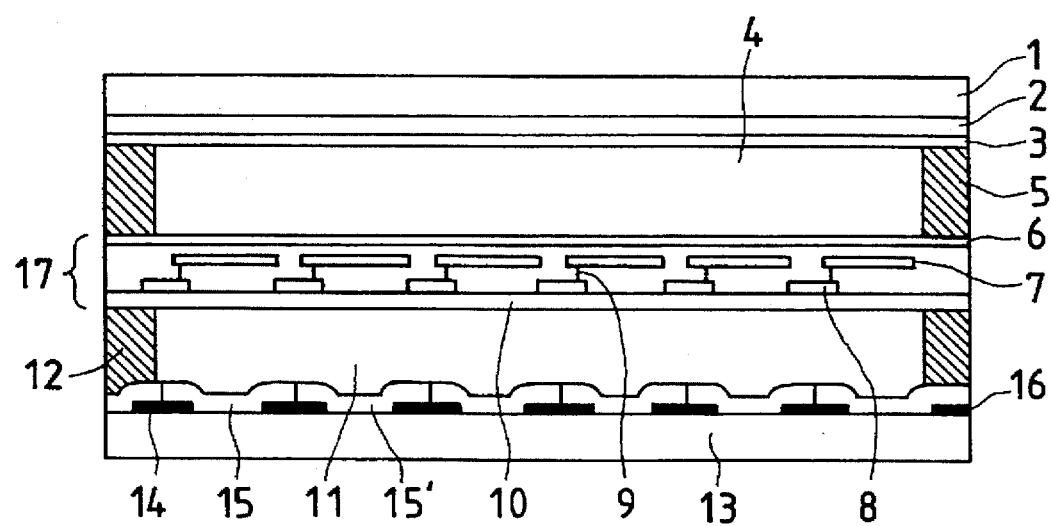
FIG. 42 is a typical cross-sectional view illustrating another liquid crystal display device of the present invention.

Referring to FIG. 42, 1 is a glass plate confining the liquid crystal layer, on the substrate surface of which are provided a transparent electrode 2 which serves as the common electrode and an oriented film 3 for orienting the liquid crystal. The transparent electrode 2 can use an ITO film and the oriented film 3 can use a polyimide film. 4 is a liquid crystal layer, which uses TN type herein, but is not limited thereto, and may be any of STN type, polymer type or ferroelectric type. 5 is a frame member enclosing the liquid crystal layer 4, which is made of epoxy resin (Structbond EH454NF made by Mitsui Toatsu Chemistry). 6 is an oriented film provided over driving thin film transistors 8, whereby the oriented film is sufficiently flat and there is no step causing any orientation disorder of flattening treatment such as an etchback conducted in the TFT process. 7 is a picture element electrode for applying a signal voltage which is connected via a wiring 9 to a TFT. 10 is a transparent thin film having TFTs on the upper surface, which is made of $SiO_2$ or SiN. The composition ratio and the film thickness are set so that the thin film constituted as above of 6 to 10 may be extended without shrinkage. 11 is a flowable material contained on the back side of the thin film, which may be a liquid crystal, polyethylene glycol (polyethylene glycol #200 made by Kanto Chemistry), or silicon (The Shin-Etsu Chemistry Co., Ltd.), or any material as far as it is transparent and causes neither freezing nor boiling in a range from −20° C. to 80° C. Such material has desirably a constant against environmental variation equivalent to that of the liquid crystal 4. 12 is a frame member enclosing the flowable material, which may be equivalent to the frame member 5. 13 is a glass substrate, which is made of AL glass manufactured by Asahi Glass having a thermal expansion coefficient relatively approximating that of silicon, when the thin film transistor is formed of Si. On the glass substrate 13 are provided a light shielding layer 14 and color filters 15, 15'. 16 is an alignment mark for effecting alignment with the thin film layer.

As will be clear from FIG. 42, the liquid crystal layer 4 is carried between substantially complete flat layers, whereby excellent image display was implemented without causing orientation disorder of liquid crystal.

The thin film layer 17 composed of 6 to 10 produced almost no variation in the liquid crystal layer gap 4 due to their substantially equal thermal expansion coefficients, whereby the image was excellently reproduced against the environmental variations.

Next, a forming method for a lower portion structure will be described below.

The liquid crystal driving element layer is opaque to the visible light because it is made on the Si substrate. Thus, the opening portion is hollowed out by etching so that it becomes transparent to the visible light. The etching solution used herein was an aqueous solution of tetramethyl ammonium hydride (TMAH). The etching conditions were 22% TMAH aqueous solution, 90° C. and ten hours. It is desirable to use the silicon substrate of a structure where a thin insulating layer resides on the silicon substrate and a single crystal silicon layer is laid on its upper portion (Silicon On Insulator structure, SOI), because the insulating layer serves as an etching stop layer which is effective for the uniform etching.

Next, a fabrication method of the potting cell portion will be described below.

This method is largely divided into three parts of a frame making process for filling the potting material (flowable material), a potting material transferring process and an inlet port sealing process. In the following, these processes will be described in this order.

The frame making process will be now described. First, an adhesive (frame member) is applied around the opening portion formed by hollowing the Si substrate on the opposite side of the glass substrate. The frame member used was epoxy resin (Structbond EH454NF made by Mitsui Toatsu Chemicals, Inc.). The frame member with adhesive may be formed either by discharging adhesive through the point of needle to trace a pattern, or by squeegee printing. A glass substrate cut into a desired size was laid thereon, and the whole structure was pressurized to have a desired gap, and burned in an oven at 80° C. for two hours to form a potting material filling region. Herein, it is desirable to use the glass substrate made of a material having a thermal expansion coefficient approximating that of silicon, because it is effective to suppress the warpage of the liquid crystal display device. In this example, the glass substrate used was AL glass made by Asahi Glass Co., Ltd., having a thermal expansion coefficient relatively approximating that of silicon (thermal expansion coefficient of $36 \times 10^{-7}$ for Al glass; $32 \times 10^{-7}$ for Si). The gap was controlled by carrying a gap member (glass or needle) having a desired thickness between the glass substrate and the silicon substrate. Also, when a very narrow gap (about 10 μm) is required, the desired gap thickness is attained by mixing beads (Micropeal SP made by Sekisui Fine Chemical) having a diameter of about 10 μm in the epoxy resin.

The display type for use with the present invention may be any of TN type, ST type, ECB type, and ferroelectric type. The flowable material may be preferably a light transparent material which is less foamy, and is less liable to freeze, such as liquid crystal, polyethylene glycol, and silicon oil. As to the thickness, it is necessary that the transmittance may not be below a desired value.

Next, the transfer process for filling the potting material in the frame formed in the above way will be described below. The filling is made by a well-known vacuum transferring method. The potting material is subjected to vacuum degassing (e.g., for twelve hours at $10^{-3}$ Torr) before filling to exclude any mixture of bubbles. The liquid crystal display device (liquid crystal cell) having formed the frame and the potting material placed in a Petri dish are set within a vacuum apparatus to draw a vacuum to a degree of vacuum of about $10^{-3}$ Torr. The time of drawing vacuum is from about one to twenty-four hours after having reached $10^{-3}$ Torr. Thereafter, the liquid crystal cell is immersed in the potting material by placing it in the Petri dish containing the potting material still in vacuum state. The potting material is transferred to some extent into the potting frame owing to capillary phenomenon. After the transfer with the capillary phenomenon has reached an equilibrium state, the vacuum apparatus is gradually leaked for a period from twenty minutes to one hour to sufficiently transfer the potting material into the frame. The potting material is transferred in a vacuum of about $10^{-3}$ Torr as above described. To this end, it is necessary that it has a low vapor pressure and is transparent. Specifically, the potting cell used contained liquid crystal, polyethylene glycol (Polyethylene glycol #200 made by Kanto Chemical), and silicon (Shinetsu Silicon made by The Shin-Etsu Chemical Co., Ltd.).

The sealing of the opening is performed in the following way. The liquid crystal cell is taken out from the vacuum apparatus, and the inlet port is cleanly wiped with acetone and degreased. Then, the sealing of the inlet port for potting material is effected by mounting sealing material. The sealing material used is epoxy resin (Structbond ES280 made by Mitsui Toatsu Chemical) or ultraviolet curable resin when the potting material used is liquid crystal and polyethylene glycol, while it is Silicone Bond (Shinetsu Silicone made by The Shin-Etsu Chemical Co., Ltd.) when the potting material is silicone. The curing is made at room temperature for twelve hours when epoxy resin is used. In the case of silicon resin, the curing is made at 80° C. for two hours. On the contrary, the sealing time for ultraviolet curable resin is as short as one minute to apply ultraviolet radiation, and the sealing is very effectively made in a firm and rapid manner.

[Example 21]

Figure 43:
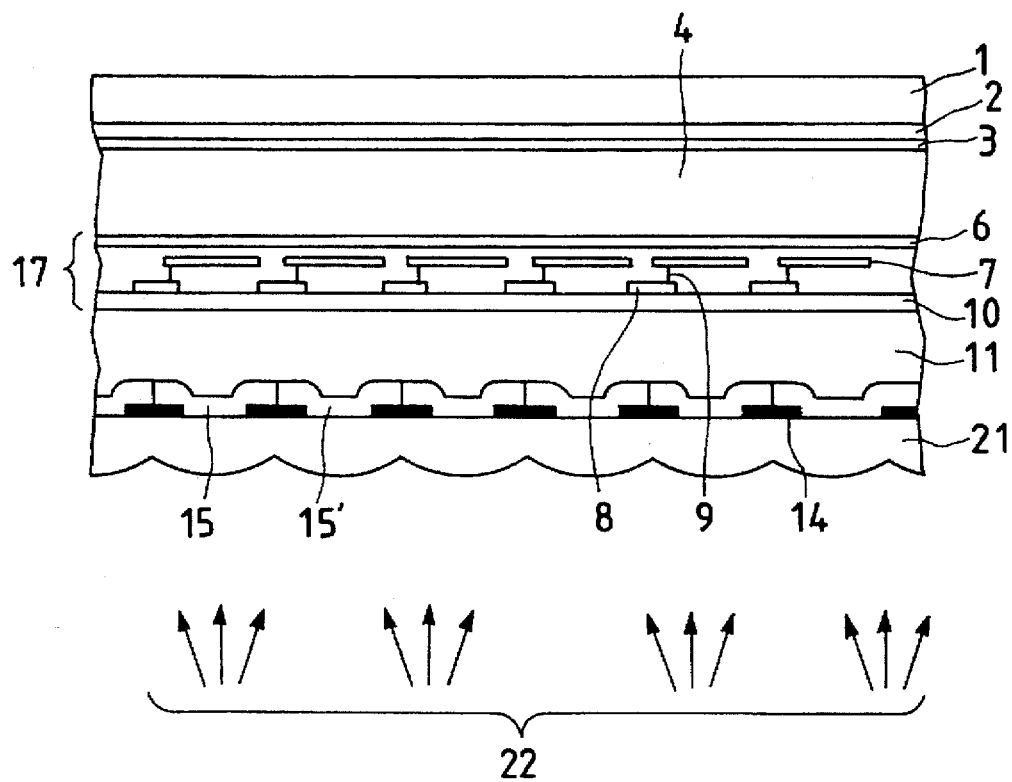
FIG. 43 is a typical cross-sectional view illustrating another liquid crystal display device of the present invention.

Reference is now made to FIG. 43. In this example, like numerals are used to refer to the same parts as shown in example 20, the explanation of which is omitted. The feature of this example resides in that a lens 21 is formed on the glass plane enclosing the flowable material 11. A light source 22, the explanation of which is omitted in the example 20, is provided on the side of the color filters 15, 15' provided.

The light source is a scattered light source to effect uniform illumination, wherein because the scattered light is more effectively collected by the lens 21, the light utilization efficiency is higher and the power of light source can be suppressed. Thereby, the heat generation is reduced, and the problem such as burning of image quality can be eliminated.

[Example 22]

Figure 44:
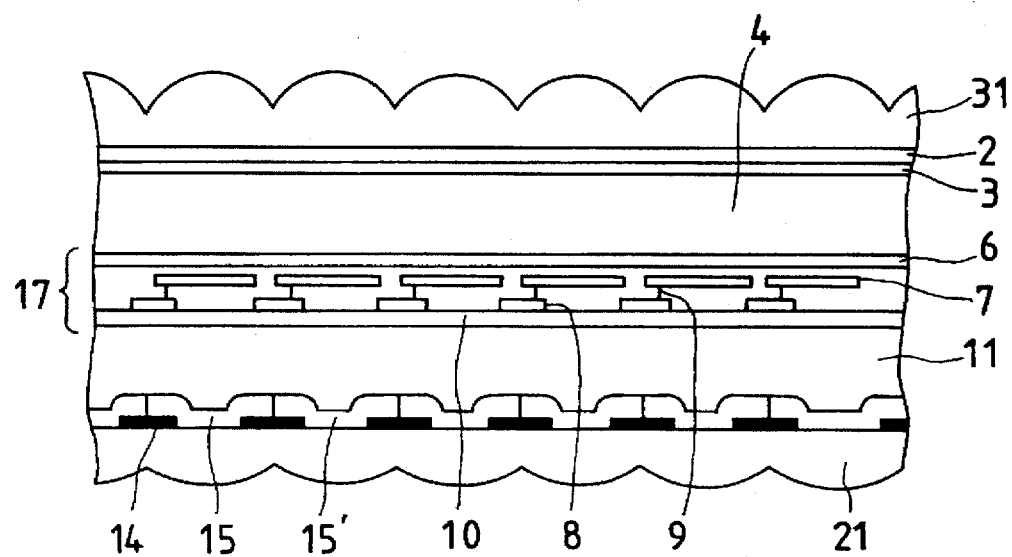
FIG. 44 is a typical cross-sectional view illustrating another liquid crystal display device of the present invention.

FIG. 44 shows an example in which a lens 31 is also provided on the substrate having a common electrode provided. This improves the utilization efficiency, and further the effective opening ratio as the opening portion is enlarged, whereby the bright display can be implemented.

[Example 23]

Figure 45A:
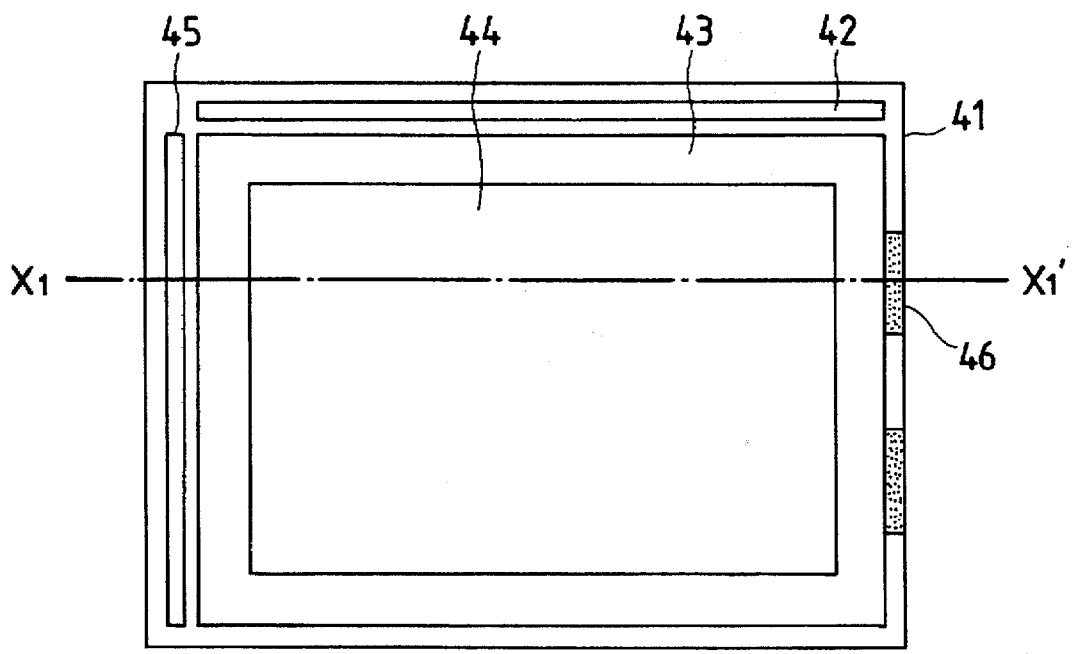
FIGS. 45A and 45B are typical views illustrating another liquid crystal display device of the present invention.
Figure 45B:
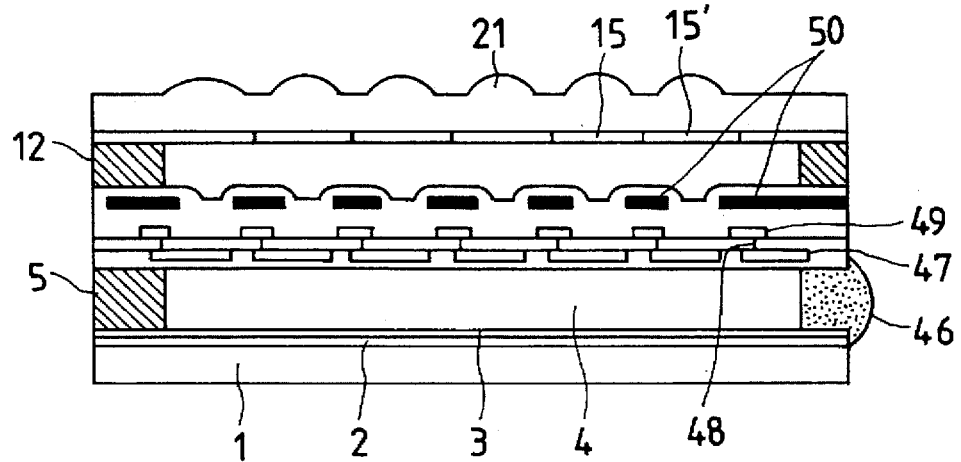

Reference is now made to FIGS. 45A and 45B. FIG. 45A is a plan view and FIG. 45B is a cross-sectional view of FIG. 45A taken along the line $X_1$–$X'_1$. 41 is a thin film layer outer periphery where a picture element portion and a peripheral circuit are provided, 42 is a horizontal shift register, 43 is a picture element peripheral portion, and 44 is a picture element portion where picture element driving transistors are provided. 45 is a vertical shift register and 46 is a liquid crystal inlet port and a sealing port.

47 is a picture element electrode, which is connected from the drain of a thin film transistor 49 via a wiring 48 in a contact hole. As shown in FIGS. 45A and 45B, in this example, the picture element electrode is disposed on the back side of TFT provided, and a light shielding layer 50 is provided on the TFT through the same process.

With this constitution, a layer having a large step is provided on the upper layer portion, and a liquid crystal driving portion is provided in the lower layer, whereby the liquid crystal driving can be implemented in the flatter area. Also, the light shielding layer is provided above the TFT through the same process, whereby owing to its high alignment precision, the opening ratio is raised, and the bright display can be implemented.

[Example 24]

Figure 46A:
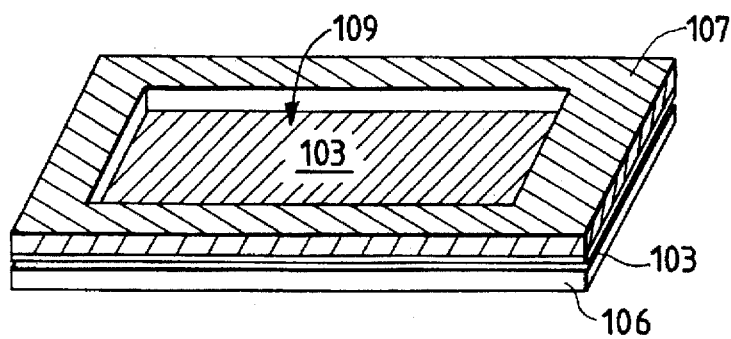
FIGS. 46A to 46C are typical views for illustrating a manufacturing method of the device of the present invention.
Figure 46B:
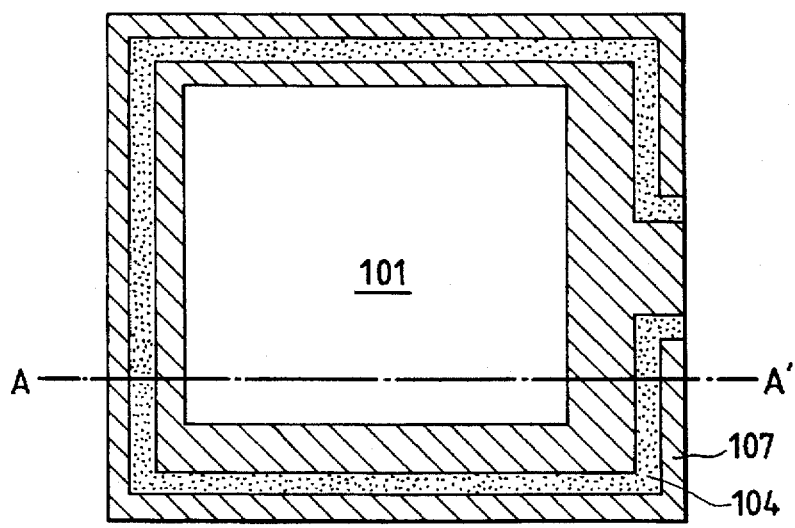
Figure 46C:
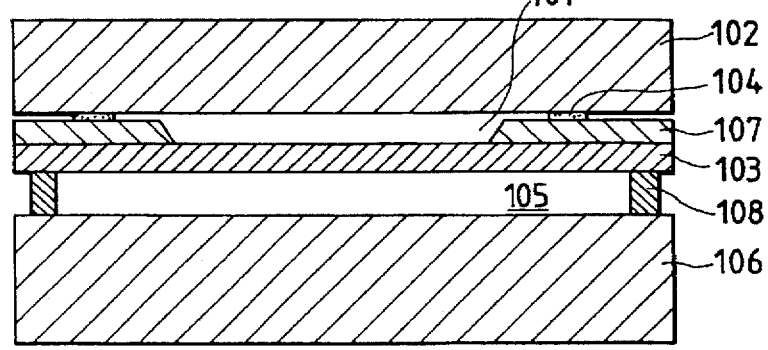

A liquid crystal display device of this example consists of an image display liquid crystal cell portion and a potting cell portion for reinforcement of the liquid crystal cell with the potting material (flowable material) transferred. A fabrication method of this liquid crystal display device will be described below with reference to FIGS. 46A to 46C.

The liquid crystal cell portion is a portion surrounded by a transparent substrate 106, a liquid crystal driving element layer 103 and a frame member 108. The transparent substrate 106 is provided with a light shielding layer for shielding the light between color filters and a transparent electrode for applying a voltage to the liquid crystal. Also, the liquid crystal driving element layer 103 is comprised of a picture element electrode, a thin film transistor (TFT) for applying a signal to the electrode, a signal line for sending the signal to the TFT, a TFT driving line, for each picture element portion, and horizontal and vertical shift registers for driving the picture element TFTs. The liquid crystal layer 105 is enclosed in an interstice between the frame member 108, the transparent substrate 106 and the liquid crystal driving element layer 103.

The liquid crystal driving element layer 103 is opaque to the visible light because it is made on the Si substrate 107.

Thus, the opening portion 109 is hollowed out by etching so that it is made transparent to the visible light. The etching solution used is an aqueous solution of tetramethyl ammonium hydride (TMAH). The etching conditions are 22% TMAH aqueous solution, 90° C. and ten hours. It is desirable to use the silicon substrate 107 having a structure where a thin insulating layer resides on the silicon substrate and a single crystal silicon layer is laid on its upper portion (Silicon On Insulator structure, SOI), because the insulating layer serves as an etching stop layer which is effective for the uniform etching. (Herein, the etching solution may be any solution only if a sufficient selection ratio of Si to $SiO_2$ can be attained such as KOH.)

Next, a fabrication method of potting cell portion will be described below. This process is largely divided into three parts of a frame making process for filling the potting material, a potting material transferring process and an inlet port sealing process. In the following, these processes will be described in this order.

The frame making process will be hereinafter described. First, an adhesive (frame member 104) is applied on the silicon substrate 107 around the opening portion 109 formed by etching the display region of the Si substrate 107. The frame member 104 used is epoxy resin (Structbond EH454NF made by Mitsui Toatsu Chemicals, Inc.). The frame member with adhesive may be formed either by discharging adhesive through the point of needle to trace a pattern, or by squeegee printing. A glass substrate 102 cut into a desired size is laid thereon, and the whole structure is pressurized to have a desired gap, and burned in an oven at 80° C. for two hours to form a potting material filling region. Herein, it is desirable to use the glass substrate 102 made of a material having a thermal expansion coefficient approximating that of silicon substrate 107, because it is effective to suppress the warpage of liquid crystal display device. In this example, the glass substrate 102 used was AL glass made by Asahi Glass Co., Ltd., having a thermal expansion coefficient relatively approximating that of silicon (thermal expansion coefficient of $36 \times 10^{-7}$; Si $32 \times 10^{-7}$). The gap is controlled by carrying a gap member (glass or needle) having a desired thickness between the glass substrate and the silicon substrate. Also, when a very narrow gap (about 10 μm) is required, the desired gap thickness can be attained by mixing beads (Micropeal SP made by Sekisui Fine Chemical) having a diameter of about 10 μm in the epoxy resin.

Next, the transfer process for filling the potting material in the frame 104 formed in the above way will be described below. The potting material is subjected to vacuum degassing (e.g., for twelve hours at $10^{-3}$ Torr) before filling to exclude any mixture of bubbles. The liquid crystal display device (liquid crystal cell) having formed the frame and the potting material placed in a Petri dish are set within a vacuum apparatus to draw a vacuum to a degree of vacuum of about $10^{-3}$ Torr. The time of drawing vacuum is from about one to twenty-four hours after having reached $10^{-3}$ Torr. Thereafter, the liquid crystal cell is immersed in the potting material by placing it in the Petri dish containing the potting material still in vacuum state. The potting material is transferred the pot extent into the potting frame 104 owing to capillary phenomenon. After the transfer with the capillary phenomenon has reached an equilibrium state, the vacuum apparatus is gradually leaked for a period from twenty minutes to one hour to sufficiently transfer the potting material into the frame. The potting material is transferred in a vacuum of about $10^{-3}$ Torr as above described. To this end, it is necessary that the potting material has a low vapor pressure and is transparent. Specifically, the potting cell used contained liquid crystal, polyethylene glycol (Polyethylene glycol #200 made by Kanto Chemical), and silicone oil (Shinetsu Silicone made by The Shin-Etsu Chemical Co., Ltd.).

The sealing of the opening is performed in the following way. The liquid crystal cell is taken out from the vacuum apparatus, and the inlet port is cleanly wiped with acetone and degreased. Then, the sealing of the inlet port for potting material was effected by mounting sealing material. The sealing material used was epoxy resin (Structbond ES280 made by Mitsui Toatsu Chemical) or ultraviolet curable resin when the potting material used was liquid crystal and polyethylene glycol, while it was Silicone Bond (Shinetsu Silicone made by The Shin-Etsu Chemical Co., Ltd.) when the potting material was silicone oil. The curing was made at room temperature for twelve hours when epoxy resin was used. In the case of silicon resin, the curing was made at 80° C. for two hours. On the contrary, the sealing time for ultraviolet curable resin is as short as about one minute to apply ultraviolet radiation, and the sealing is very effectively made in a firm and rapid manner.

The liquid crystal display device of this example as fabricated in the above way makes display on the opening portion 109 by driving the liquid crystal 105 of opening portion 109 by virtue of the liquid crystal driving element as made by the liquid crystal driving element layer 103. The distance (hereinafter referred to the cell gap) between the Si substrate 107 and the liquid crystal driving element layer 103 affects the transmittance of light, whereby it is desirable to have a uniform cell gap over the entire face of the opening portion 109 to effect uniform display over the entire plane. In this example, the thickness of liquid crystal driving element layer 103 is from 3 to 5 μm, and the opening portion is about 15 mm square. Accordingly, the liquid crystal driving element layer 103 is very thin, or a thickness of 1/1000 or less the size of the opening, so that it is easily subjected to deformation, and further crack. Therefore, the structure with reinforcement of the potting as shown in this example is very effective to enhance not only the durability and reliability, but also the image quality, in this liquid crystal display device.

[Example 25]

Figure 47:
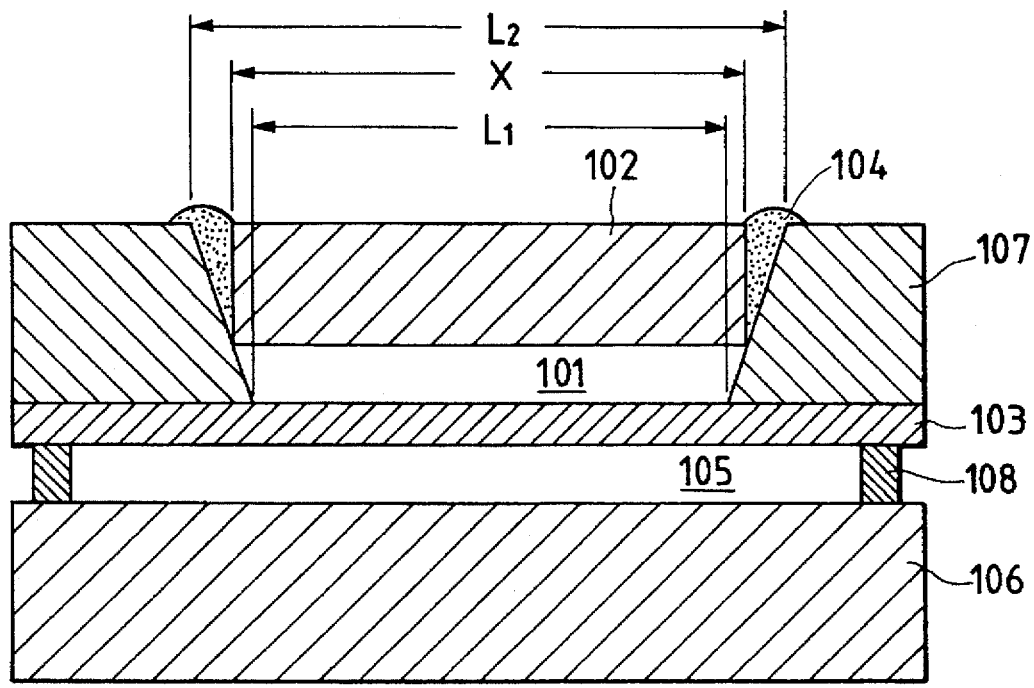
FIG. 47 is a typical cross-sectional view illustrating another liquid crystal display device of the present invention.

Reference is now made to FIG. 47.

The potting material 101 is disposed on the liquid crystal driving element layer 103. A transparent glass 102 is laid on the potting material 101, and fixed by the frame member 104 to enclose the potting material 101. The fabrication method is the same as above described.

In this case, the volume of potting material 101 is equal to or less than that of liquid crystal layer 105. This example has a feature that the volume of potting material 101 is defined by the size of transparent glass 102 and the size of opening portion 109. The height of the frame member 108 is about 10 μm, and the volume of the liquid crystal layer 105 is about 2.3 mm³. Accordingly, considering that the size of opening portion 109 is as large as 10 mm×12 mm, the interval between the transparent glass 102 and the liquid crystal driving element layer 103 into which the potting material 101 is filled is 17 μm or less so that the volume of potting material 101 may be equal to or less than that of liquid crystal layer 105.

Herein, when the size of transparent glass 102 is x, it suffices to satisfy the inequality $L_1 < x < L_2$, where $L_1$ is the opening size of the bottom formed by etching the Si substrate 107 and $L_2$ is the opening size of the top, wherein the above relation can be readily established if the anisotropical etching with TMAH or KOH is conducted on the Si substrate.

[Example 26]

Figure 48:
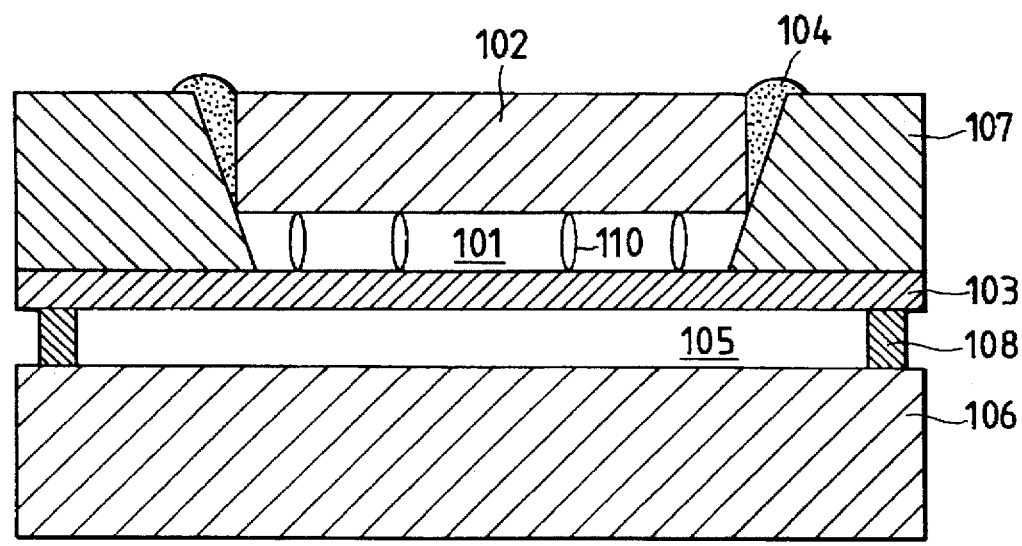
FIG. 48 is a typical cross-sectional view illustrating another liquid crystal display device of the present invention.

Reference is now made to FIG. 48. The potting material 101 is laid on the liquid crystal driving element layer 103. A transparent glass 102 is placed on the potting material 101, and fixed by the frame member 104 to enclose the potting material 101. The fabrication method was the same as above described.

This example has a feature that the transparent gap member (transparent beads) is provided in the potting material 101 in the example 25.

Since the layer thickness of the potting material 101 is uniform owing to the transparent beads 110, there is the effect that the panel having a larger size than that of the example 25 can be easily formed.

Also, by disposing transparent beads of an even size in the potting material 101, the even distance between the transparent glass 102 and the liquid crystal driving element layer 103 means that the distance between the transparent glass substrate 106 on the opposite side and the liquid crystal driving element layer 103, i.e., the liquid crystal cell gap as previously mentioned, is even, which is very effective to enhance the image quality.

Also, in making the opening portion by silicon etching as the potting material inlet port, the potting material introduction port can be made simultaneously. This is effective to simplify the process and desirable.

[Example 27]

Figure 49:
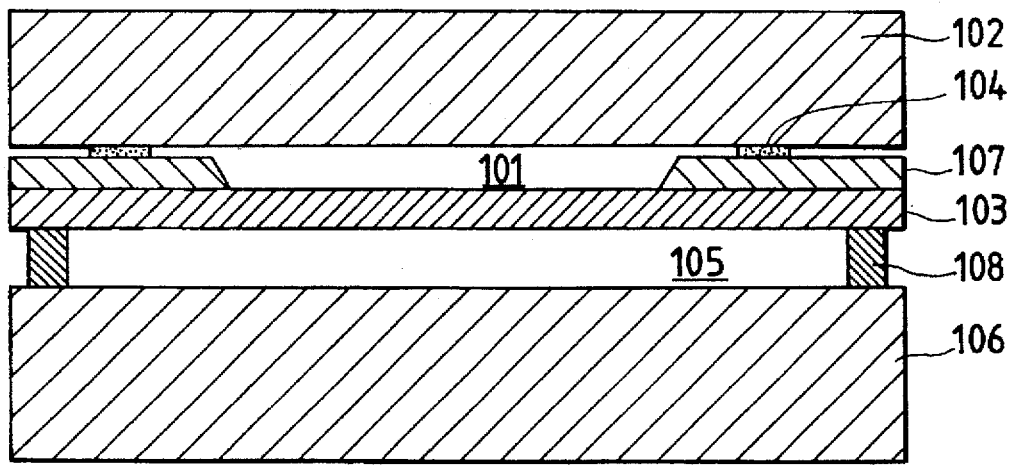
FIG. 49 is a typical cross-sectional view illustrating another liquid crystal display device of the present invention.

Reference is now made to FIG. 49.

The potting material 101 is laid on the liquid crystal driving element layer 103. A transparent glass 102 is placed on the potting material 101, and fixed by the frame member 104 to enclose the potting material 101. The fabrication method was the same as above described, with the exception that the silicon substrate 107 was ground by a grinder to make the film thinner to such an interval between the transparent glass 102 and the liquid crystal driving element layer 103 so that the volume of potting material 101 be equal to or less than the volume of liquid crystal layer 105, immediately before making the opening portion 109 by silicon etching.

This example has a feature that the silicon substrate 107 is made thinner to define the volume of potting material 101 in accordance with the thickness of silicon substrate 107.

The height of the frame member 108 is about 10 μm, and the volume of the liquid crystal layer 105 is about 2.3 mm³. Accordingly, considering that the opening portion 109 was as large as 10 mm×12 mm in size, the silicon substrate 107 was ground to 17 μm or less so that the volume of potting material 101 be equal to or less than the volume of the liquid crystal layer 105.

In the structure as shown in the example, the volume of potting material 101 is defined depending on the thickness of silicon substrate 107, and thus can be fabricated without regard to the size of the glass substrate 102 easily. Also, the thickness of the opening portion 109 by silicon etching is about 17 μm, the etching time is about 20 minutes, and the fabrication time can be shortened.

Also, in making the opening portion 109 by silicon etching as the potting material inlet port, the potting material introduction port can be made simultaneously. This is effective to simplify the process and desirable.

[Example 28]

Figure 50:
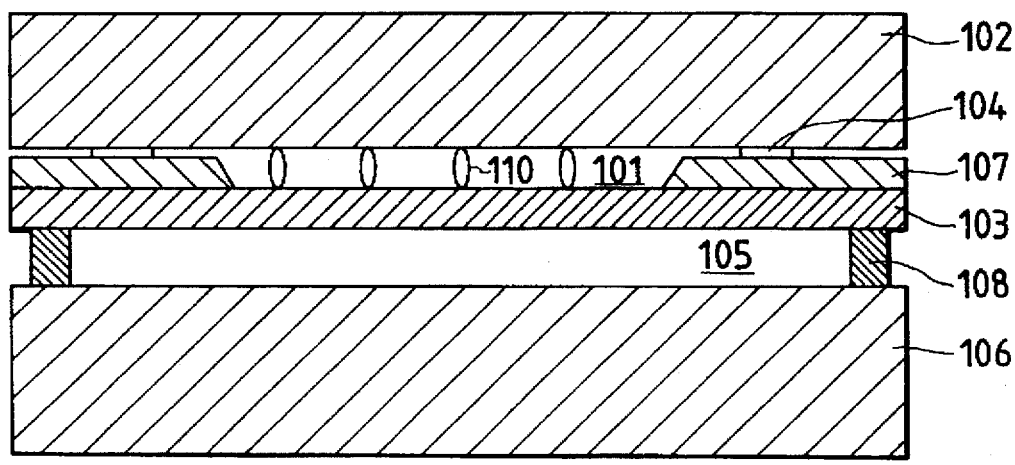
FIG. 50 is a typical cross-sectional view illustrating another liquid crystal display device of the present invention.

Reference is now made to FIG. 50. This example is exactly the same as the example 27, except that transparent beads are disposed in the potting material 101.

By disposing transparent beads of an even size in the potting material 101, the even distance between the transparent glass 102 and the liquid crystal driving element layer 103 means that the distance between the transparent glass substrate 106 on the opposite side and the liquid crystal driving element layer 103, i.e., the liquid crystal cell gap as previously mentioned, is even, which is very effective to enhance the image quality.

Further, when polyethylene glycol was used as the potting material, the thickness of potting material was about 1800 to 2000 Å. This enhanced the transmittance of light at a wavelength of 5500 Å, allowing for the bright display. In this way, the bright display is typically implemented when the refractive index of potting material is n and the thickness of potting material is $(5500/2n)\cdot m$Å (m: a natural number).

Further, it could be understood that in the liquid crystal display device as shown in this example, when the refractive index of flowable material is n, the thickness is d, and the wavelength for use in the display device is λ, it is preferable to satisfy the relation $(\lambda/2n)xm=d$ (where m is a natural number, and λ is normally about 5500 Å at which the human's visibility is highest). The reason is that the transmittance is highest at this wavelength.

The display method of this example may be any of TN type, ST type, ECB type, and ferroelectric type.

[Example 29]

Figure 51:
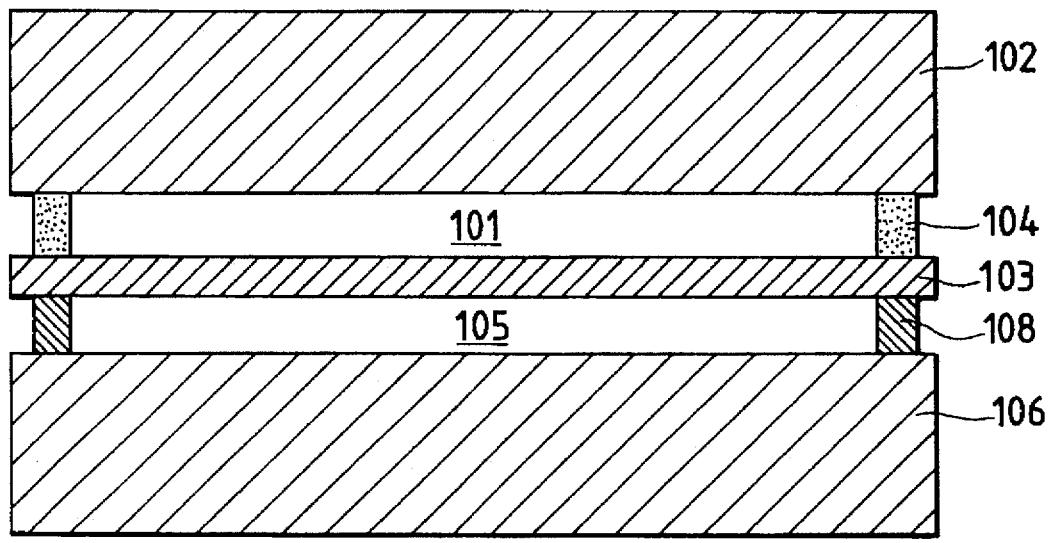
FIG. 51 is a typical cross-sectional view illustrating another liquid crystal display device of the present invention.

Reference is now made to FIG. 51.

The potting material 101 is laid on the liquid crystal driving element layer 103. A transparent glass 102 is placed on the potting material 101, and fixed by the frame member 104 to enclose the potting material 101. The fabrication method was the same as above described, with the exception that the silicon substrate 107 was totally removed by etching normally in the process for making the opening portion 109.

This example has a feature that the silicon substrate 107 is removed by etching to define the volume of potting material 101 by the frame member 104.

The height of the frame member 108 is about 10 μm, and the volume of the liquid crystal layer 105 is about 2.3 mm³. The frame member 104 was disposed directly above the liquid crystal cell frame member 109 so that the film 103 might be deformed. And the height of the frame member 104 was 10 μm so that the volume of potting material 101 might be equal to or less than that of liquid crystal layer 105.

In the structure as shown in the example, the volume of potting material 101 is defined depending on the thickness of frame member 104, and thus can be fabricated without regard to the size of the glass substrate 102 easily. Also, since the silicon substrate 107 is totally removed by etching, the fabrication can be simplified without need of defining the opening portion 109. Also, by using the same material for both the transparent glass substrate 102 and the transparent glass substrate 104, the warpage of the liquid crystal display device can be extremely small. Since an AL glass (made by Asahi Glass) was used as the material for the transparent glass substrates 102, 104 in this example, the warpage amount of the liquid crystal display device was almost 0 μm.

[Example 30]

Figure 52:
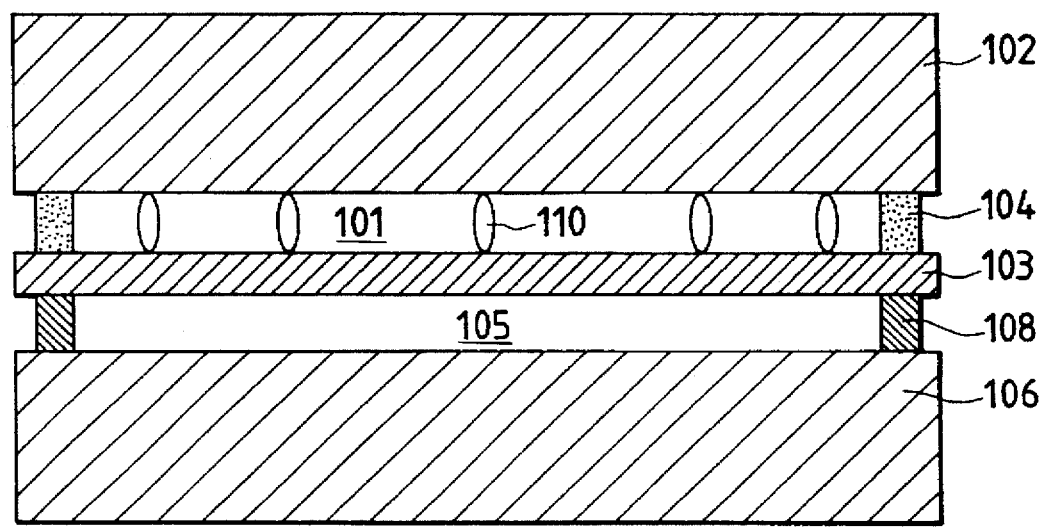
FIG. 52 is a typical cross-sectional view illustrating another liquid crystal display device of the present invention.

Reference is now made to FIG. 52. This example apparatus is exactly the same as that of the example 29, except that transparent beads 110 are disposed in the potting material 101.

By disposing transparent beads of an even size in the potting material 101, the even distance between the transparent glass 102 and the liquid crystal driving element layer 103 means that the distance between the transparent glass substrate 106 on the opposite side and the liquid crystal driving element layer 103, i.e., the liquid crystal cell gap as previously mentioned, is even, which is very effective to enhance the image quality.

Also, by using the same material for both the transparent glass substrate 102 and the transparent glass substrate 104, the warpage of the liquid crystal display device can be extremely small. Since an AL glass (made by Asahi Glass) was used as the material for the transparent glass substrates in this example, the warpage amount of the liquid crystal display device was almost 0 µm.

[Example 31]

Figure 53A:
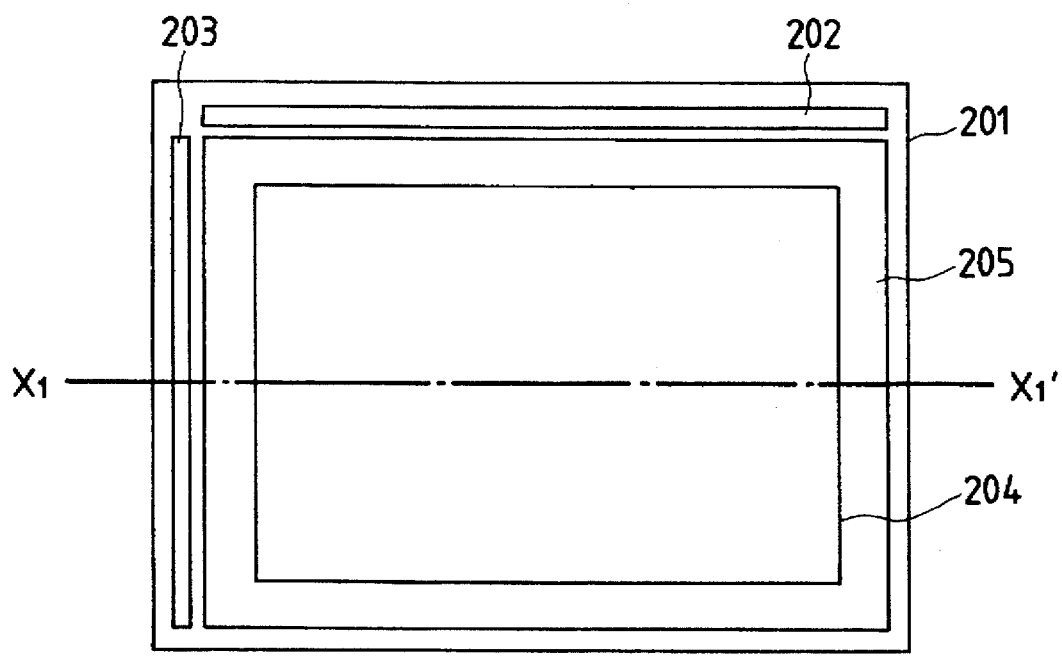
FIGS. 53A and 53B are typical schematic views illustrating another liquid crystal display device of the present invention.
Figure 53B:
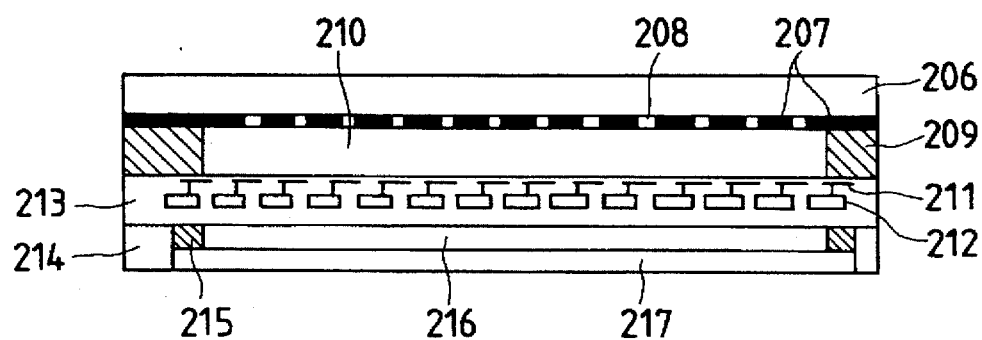

Reference is now made to FIGS. 53A and 53B. FIG. 53A is a plan view of a liquid crystal display device, wherein 201 is a substrate having a liquid crystal driving peripheral circuit and a picture element portion, 202 is a liquid crystal driving horizontal shift register, 203 is liquid crystal driving vertical shift register, 204 is a picture element region, and 205 is a dummy region comprised of a pattern equivalent to the picture element region.

On the other hand, FIG. 53B is a cross-sectional view taken along the line X–X' as shown in FIG. 53A, wherein there are provided an illuminating light source and a polarizing plate in practice, which are omitted in the figure. 206 is a glass substrate, on which there are provided a color filter 208, a light shielding layer 207 for shielding the light between color filters, and a common transparent electrode, not shown, for applying a voltage to the liquid crystal layer. 210 is a liquid crystal of the TN type, for example. 209 is a frame member for forming the liquid crystal cell, 213 is a liquid crystal driving element layer, 211 is a picture element electrode, and 212 is a TFT. 214 is an Si substrate region as described in the above example, 215 is a frame member for confining the potting material, 216 is a potting material, and 217 is a glass plate. The frame member and the potting material may be the same as used in the above example.

The feature of this example resides in a point that a dummy picture element region is provided around the outer periphery of the effective picture element region, and a frame member 209 on the liquid crystal cell side and a frame member 215 on the potting cell side are formed within the dummy picture element region. This relation is satisfied if, though they are formed with a liquid crystal driving element layer therebetween in the same region in the figure, but not necessarily, the liquid crystal cell frame member and the potting cell frame member are overlapped at least in part in the dummy region.

With this structure, pressure is exerted on the layer 213 via the frame members 209, 215 from the upper and lower sides, respectively, unnecessary pressure, stress and strain are not applied on the layer 213, whereby the display device is stable and has higher reliability. Also, like the above example, the volume of potting material 216 is equal to or less than that of liquid crystal layer 210, the variation of potting material due to thermal expansion and air pressure causes no deformation of the liquid crystal cell, whereby the stable display characteristic against the environmental variation was implemented.

[Example 32]

Figure 54A:
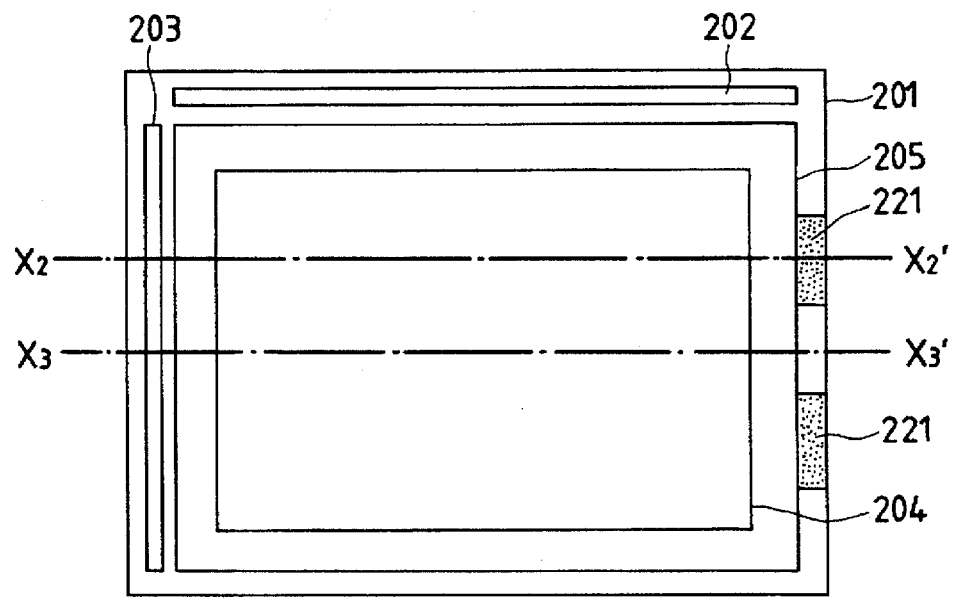
FIGS. 54A to 54C are typical schematic views illustrating another liquid crystal display device of the present invention.
Figure 54B:
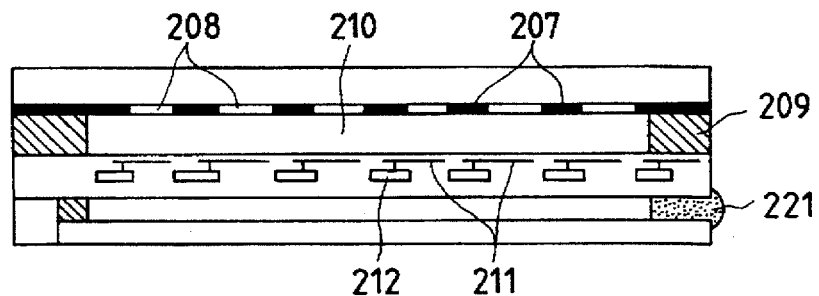
Figure 54C:
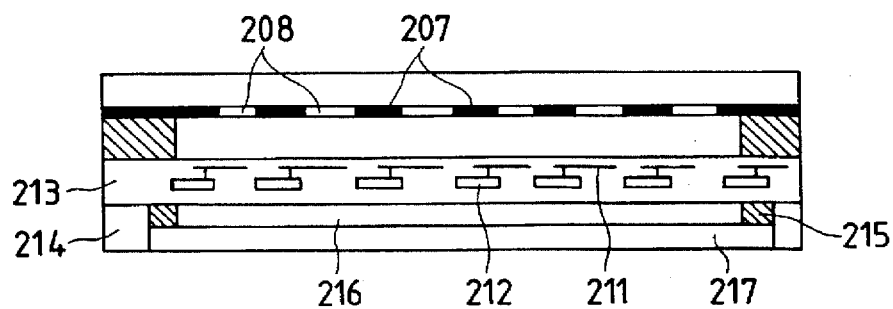

Reference is now made to FIGS. 54A to 54C. In this example, the same parts as used in the example 31 are designated with like numerals, and the explanation is omitted. A first point of this example different from the example 31 is that the inlet port of potting material 216 and the sealing opening are provided. The potting material is transferred by first forming the frame member 215 and drawing a vacuum, whereby the transferring is easily made without mixture of bubbles to provide the good reinforcement.

The potting materials may include a liquid crystal, the process can be shortened by providing the inlet port and the sealing opening corresponding to 221 in the liquid crystal cell portion and transferring the material at the same time with the transferring of materials 210, 216, with the reduced costs.

[Example 33]

Figure 55A:
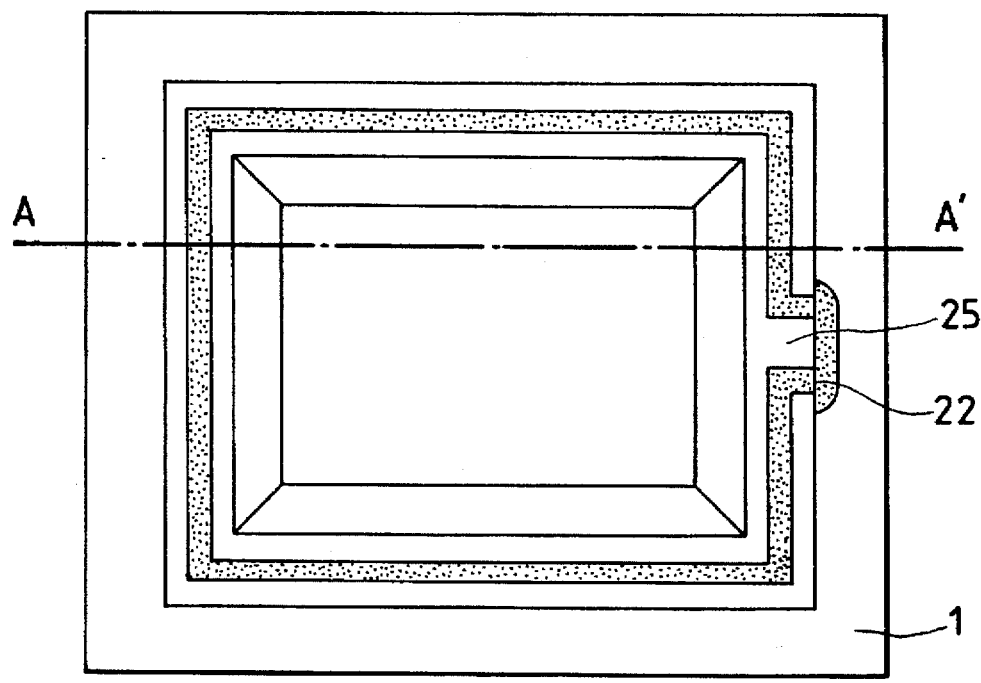
FIGS. 55A and 55B are typical views illustrating another liquid crystal display device of the present invention.
Figure 55B:
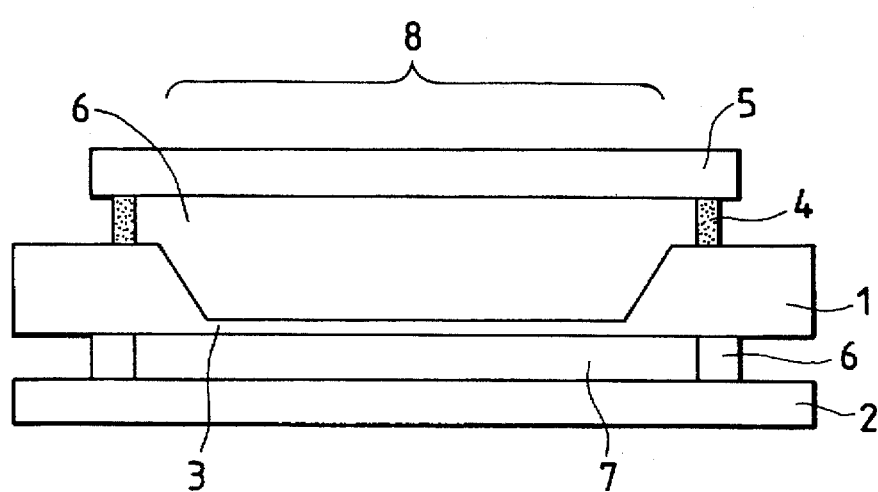

FIGS. 55A and 55B show a liquid crystal display of this example. FIG. 55A is a schematic plan view and FIG. 55B is a cross-sectional view taken along the line A–A'.

The liquid crystal display device of this example consists of an image display liquid crystal cell portion and a potting cell portion for reinforcing the liquid crystal cell portion by transferring the potting material (transparent filler). The liquid crystal cell portion is comprised of a liquid crystal transferred into a portion surrounded by an opposed electrode 2, a liquid crystal driving element layer 3, and frame members 6.

The opposed substrate 2 is provided with color filters, a light shielding layer for shielding light between color filters, a transparent electrode for applying a voltage to liquid crystal, and an orientation control film for orienting the liquid crystal in a fixed direction. Also, the liquid crystal driving element layer 3 is comprised of a picture element electrode for picture element section, a thin film transistor (TFT) for applying a signal to the electrode, a signal line for sending the signal to TFT, a TFT driving line, and horizontal and vertical shift registers for driving the picture element TFT.

The liquid crystal driving element layer 3 is formed of a single crystal Si layer manufactured by a method as shown in FIGS. 35A to 35C. The single crystal Si layer is superior economically, and has significantly less defects over the large area, with the extremely excellent crystallinity which is even and flat. Accordingly, liquid crystal display devices of high performance can be provided in which the semiconductor active element composed of the single crystal Si layer has reduced floating capacity, and is capable of operating at high speeds, with no latch-up phenomenon, superior radiation resistance, and the drive circuit integrated on the same substrate as the display pixels. A manufacturing method of single crystal Si layer according to the present invention will be described below.

First, a porous Si substrate 101 is formed by anodizing a P-type (100) monocrystalline Si substrate having a thickness of 300 µm in an HF solution. The anodization conditions were as follows.

| | |
|---|---|
| Applied voltage: | 2.6 V |
| Current density: | 30 mA · cm$^{-2}$ |
| Anodizing solution: | HF:H$_2$O:C$_2$H$_5$OH = 1:1:1 |
| Time: | 2.4 hours |
| Thickness of porous Si: | 300 μm |
| Porosity: | 56% |

An Si epitaxial layer 102 with a thickness of 1.0 μm was grown on the P-type (100) porous Si substrate 101 thus obtained by low-pressure CVD. Deposition was conducted under the following conditions:

| | |
|---|---|
| Source gas: | SiH$_4$ |
| Carrier gas: | H$_2$ |
| Temperature: | 850° C. |
| Pressure: | 1 × 10$^{-2}$ Torr |
| Growth rate: | 3.3 nm/sec |

Next, (a) a 1000 Å thick SiO$_2$ layer 103 was formed on the surface of the epitaxial layer 102, and (b) on the surface of its SiO$_2$ layer was placed another Si substrate 107 formed with a 5000 Å thick SiO$_2$ layer 104 and a 1000 Å thick Si$_3$N$_4$ layer 105, and the whole structure was then heated at 800° C. in an nitrogen atmosphere for 0.5 hours to firmly join the two substrates to each other.

Thereafter, selective etching was conducted on the bonded substrates in a mixture solution (10:6:50) of 49% hydrofluoric acid, alcohol and 30% hydrogen peroxide solution, without stirring. In 65 minutes, the porous Si substrate 101 was selectively etched with the single-crystal Si as a material for etching stopper and then completely etched, as shown in FIG. 35C.

The etching rate of the non-porous Si single-crystal with the etching solution was extremely low, such that the etching layer was 50 Å thick or less even 65 minutes later, and the selective ratio of the etching rate of the porous layer to that of the non-porous Si single-crystal was as large as 10$^5$ or more. The etched amount in the non-porous layer (several tens angstroms) was practically negligible.

Thus, the Si substrate 101 having a thickness of 200 μm, rendered porous, was removed, and a single-crystal Si layer 102 having a thickness of 1.0 μm was formed on the SiO$_2$ 103. When SiH$_2$Cl was used as the source gas, the growth temperature had to be higher by several tens of degrees. However, high-speed etching characteristic peculiar to the porous Si substrate was maintained.

TFT was formed on the single crystal Si layer 102 to provide a liquid crystal driving element layer 6 of FIGS. 55A and 55B, wherein the liquid crystal driving element layer 6 was made on the Si substrate 1 (corresponding to the Si substrate 107 of FIGS. 35B and 35C), and thus opaque to visible light. Thus, in order to be transparent to visible light, an opening portion 2 for the display is hollowed by etching.

The etching solution used was tetramethyl ammonium hydride (TMAH) aqueous solution. The etching conditions were 22% TMAH aqueous solution, 90° C. and ten hours. It is desirable to use the Si substrate of a structure where a thin SiO$_2$ layer resides on the Si substrate and a single crystal Si layer is laid on its upper portion (Silicon On Insulator structure, SOI structure), the SiO$_2$ layer serves as the etching stop layer to be effective for the uniform etching (for example, a structure in which the SiO$_2$ layer 104 and the Si$_3$N$_4$ layer 105 are omitted in FIG. 4). Herein, the etching solution is not particularly limitative as far as the selection ratio of Si to SiO$_2$ can be sufficiently attained such as KOH.

Next, the fabrication method of potting cell portion will be described below. This process is largely divided into three parts of a potting material filling region making process, a potting material transferring process and an inlet port sealing process, In the following, these processes will be described in this order.

Figure 56:
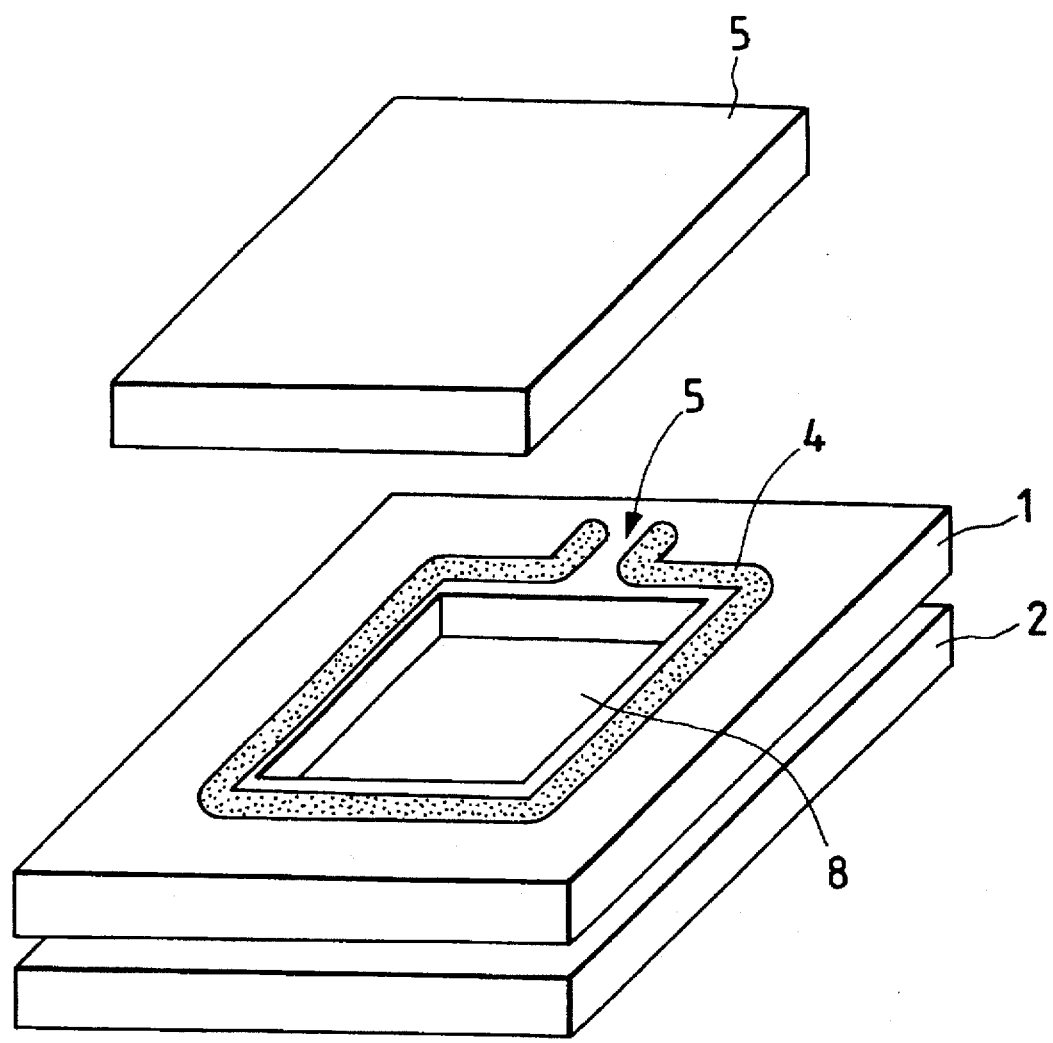
FIG. 56 is a typical view illustrating a process for making the potting material filling region according to the present invention.

FIG. 56 shows the making process for the potting material filling region. A frame member 4 composed of non-flowable elastic adhesive is applied around the periphery of an opening portion 8 hollowed out from the Si substrate 1, except for the potting material inlet port 25. In this example, a silicone adhesive (Toray Silicone SE9150) was used. For the application, a dispenser was used, and adjusted so that the thickness was about 0.5 mm, and a sealing glass substrate 5 was further laid thereon. The whole structure was pressurized to have a desired gap to cure the frame member 4.

In this example, a soda glass was used as the sealing glass substrate 5, with the gap thickness determined by sandwiching a spacer (SUS, t=0.3 mm) between the sealing glass substrate 5 and the Si substrate 1 outside the frame member 4, and the spacer was extracted afterwards.

Next, the potting material transferring process will be described.

The potting material is subjected to vacuum degassing (e.g., for twelve hours at 10$^{-3}$ Torr) before filling to exclude any mixture of bubbles. The liquid crystal display device (liquid crystal cell) having formed the frame and the potting material placed in a Petri dish are set within a vacuum apparatus to draw a vacuum to a degree of vacuum of about 10$^{-3}$ Torr. The time of drawing vacuum was from about one to twenty-four hours after reaching 10$^{-3}$ Torr. Thereafter, the liquid crystal cell is immersed in the potting material by placing it in the Petri dish containing the potting material still in vacuum state. After the transferring with the capillary phenomenon reached an equilibrium state, the vacuum apparatus was gradually leaked from twenty minutes to one hour to sufficiently transfer the potting material into the frame.

The potting material is transferred in a vacuum of about 10$^{-3}$ Torr as above described. And it is necessary to be a liquid which is transparent and neither solidified nor gasified in a temperature range from −20° C. to 80° C. Specifically, the potting cell used contained liquid crystal, polyethylene glycol (Polyethylene glycol #200 made by Kanto Chemical), silicone oil (Shinetsu Silicone made by The Shin-Etsu Chemical Co., Ltd.).

The inlet port sealing process is performed in the following.

The liquid crystal cell is taken out from the vacuum apparatus, and the inlet port 25 is cleanly wiped with acetone and degreased. Then, the sealing of the inlet port 25 is effected by mounting sealing material 22. The sealing material used in this example was a silicone adhesive (Toray silicone SE9150), and the curing was conducted at ordinary temperature for twenty four hours.

The liquid crystal display device of this example has the display in the opening portion 8 by driving the liquid crystal 7 of the opening portion 8 by the liquid crystal driving element fabricated in the liquid crystal driving element layer 3. Since the distance (cell gap) between the opposed substrate 2 and the liquid crystal driving element layer 3 defined by the frame member 6 affects the transmittance of light, it is desirable that the cell gap is uniform over the entire face of the opening portion 8 to effect even display over the entire face.

In this example, the thickness of liquid crystal driving element layer 3 is as thin as one-thousandth or less the opening portion 8, so that the liquid crystal driving element is liable to deformation and further cracks. Therefore, the structure having the reinforcement by potting as shown in this example can enhance durability and reliability in this liquid crystal display device, and is very effective to provide better image quality.

Also, the liquid crystal display device of this example has a structure of absorbing the volume change of potting material with the temperature or atmospheric pressure by virtue of a deformation of elastic frame member, and is strong to variations in environment.

[Example 34]

Figure 57A:
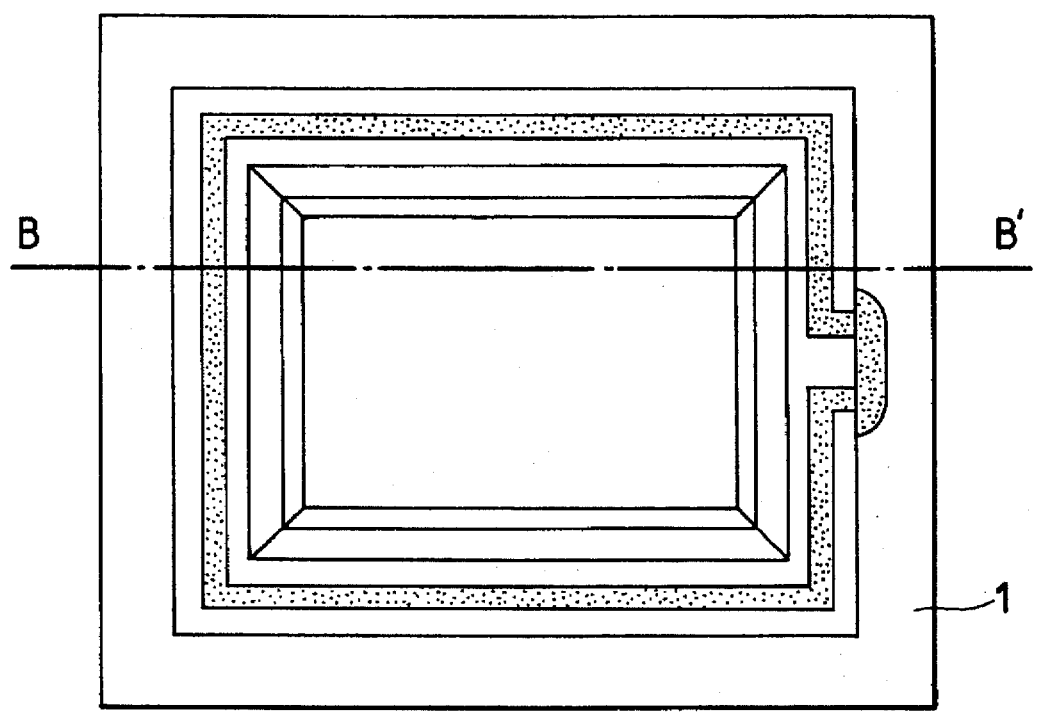
FIGS. 57A and 57B are typical views illustrating another liquid crystal display device of the present invention.
Figure 57B:
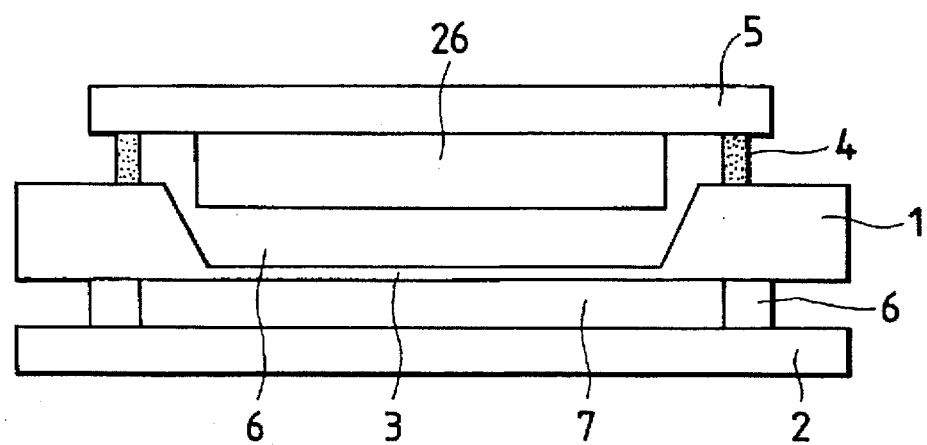

Reference is now made to FIGS. 57A and 57B. FIG. 57A is a schematic plan view and FIG. 57B is a cross-sectional view taken along the line B–B' in FIG. 57A.

A feature of this example is that the potting material having a large thermal expansion coefficient (e.g., polyethylene glycol) is used, and a glass which is less expandable than the liquid is disposed within the sealing glass substrate 5. As a result, the necessary volume of potting solution is reduced, so that the variation in the volume of potting solution is reduced, resulting in smaller gap thickness of the frame member 4.

What is claimed is:

1. A liquid crystal display device comprising:
   a substrate having a plurality of picture element electrodes provided on a first plane of said substrate;
   an opposed electrode oriented opposed to said picture element electrodes; and
   a liquid crystal provided between said picture element electrodes and said opposed electrode,
   said liquid crystal display device further comprising a concave portion formed in a light-translucent region of said substrate corresponding to said picture element electrodes in a second plane opposite said first plane, and said concave portion being sealed by a transparent substrate to form a space, said space having a light transmitting and flowable material enclosed therein.

2. A liquid crystal display device according to claim 1, wherein said light transmitting and flowable material is a resin.

3. A liquid crystal display device according to claim 1, wherein said light transmitting and flowable material is a liquid crystal or a liquid having substantially the same specific gravity as the liquid crystal provided between said picture element electrodes and said opposed electrode.

4. A liquid crystal display device according to claim 1, wherein said light transmitting and flowable material is an inert gas having nitrogen, helium, neon or argon as the main component.

5. A liquid crystal display device according to claim 1, wherein said substrate is single crystal silicon.

6. A liquid crystal display device according to claim 1, wherein said concave portion is formed by partly removing said substrate by etching.

7. A liquid crystal display device according to claim 1, wherein a passive element or an active element for driving said liquid crystal is disposed on the first plane of said substrate.

8. A liquid crystal display device according to claim 1, wherein an optical element is incorporated into said transparent substrate.

9. A liquid crystal display device according to claim 1, wherein said light transmitting and flowable material is sealed by disposing a seal member between said transparent substrate and said substrate.

10. A liquid crystal display device according to claim 9, wherein the volume change of said light transmitting and flowable material with the temperature variation is substantially equal to the volume change of a space defined by said substrate, said seal member and said transparent substrate.

11. A liquid crystal display device according to claim 10, wherein said seal member is mounted in a groove provided on said substrate.

12. A liquid crystal display device according to claim 10, wherein said seal member is mounted within said concave portion.

13. A liquid crystal display device according to claim 10, wherein said transparent substrate for sealing has a convex shape in cross section in which its central portion protrudes toward a hollow portion.

14. A liquid crystal display device according to claim 1, further comprising a region for absorbing the volume change of said light transmitting and flowable material.

15. A liquid crystal display device according to claim 1, wherein the same material as said light transmitting and flowable material is provided in said region for absorbing the volume change.

16. A liquid crystal display device according to claim 14, wherein a gas is enclosed at least partly in said region for absorbing the volume change.

17. A liquid crystal display device according to claim 1, wherein a resin and an inert gas are enclosed within said concave portion.

18. A liquid crystal display device according to claim 17, wherein said resin has a multi-layer arrangement.

19. A liquid crystal display device according to claim 17, wherein the thickness of said resin is 200 µm or less.

20. A liquid crystal display device according to claim 17, wherein said inert gas comprises dry air, dry nitrogen, helium, neon, or argon.

* * * * *